(12) United States Patent
Good

(10) Patent No.: US 8,620,723 B1
(45) Date of Patent: Dec. 31, 2013

(54) SYSTEM AND METHOD FOR GENERATING A COMMUNITY CONTRIBUTION INDEX

(75) Inventor: Bradley Lawrence Good, Pasadena, CA (US)

(73) Assignee: OurGroup, Inc., Pasadena, CA (US)

( * ) Notice: Subject to any disclaimer, the term of this patent is extended or adjusted under 35 U.S.C. 154(b) by 0 days.

(21) Appl. No.: 13/554,951

(22) Filed: Jul. 20, 2012

Related U.S. Application Data

(60) Provisional application No. 61/509,966, filed on Jul. 20, 2011.

(51) Int. Cl.
*G06Q 30/00* (2012.01)

(52) U.S. Cl.
USPC .............................. 705/7.34; 705/39; 705/319

(58) Field of Classification Search
None
See application file for complete search history.

(56) References Cited

U.S. PATENT DOCUMENTS

| | | | |
|---|---|---|---|
| 5,506,010 | A | 4/1996 | Buck et al. |
| 5,887,273 | A * | 3/1999 | Ziarno ............................ 705/39 |
| 8,086,543 | B2 * | 12/2011 | Ghosh et al. .................. 705/319 |
| 2002/0080175 | A1 | 6/2002 | Hautt et al. |
| 2005/0004867 | A1 | 1/2005 | Spector |
| 2005/0198561 | A1 | 9/2005 | McAuley |
| 2005/0228742 | A1 | 10/2005 | McHale et al. |
| 2005/0240433 | A1 | 10/2005 | Schwartz et al. |
| 2005/0256866 | A1 | 11/2005 | Lu et al. |
| 2006/0149650 | A1 | 7/2006 | Dilley |
| 2007/0050238 | A1 | 3/2007 | Carr et al. |
| 2007/0061253 | A1 * | 3/2007 | Nociti ............................. 705/39 |
| 2007/0266342 | A1 | 11/2007 | Chang et al. |
| 2008/0021720 | A1 * | 1/2008 | Glinberg .......................... 705/1 |
| 2008/0244429 | A1 | 10/2008 | Stading |
| 2008/0288277 | A1 * | 11/2008 | Fasciano .......................... 705/1 |
| 2008/0301296 | A1 | 12/2008 | York |
| 2009/0037226 | A1 * | 2/2009 | Radin ............................. 705/4 |
| 2009/0037350 | A1 | 2/2009 | Rudat |
| 2009/0281871 | A1 * | 11/2009 | Tietzen et al. ................. 705/10 |
| 2009/0307762 | A1 | 12/2009 | Cudd, Jr. |
| 2010/0161465 | A1 * | 6/2010 | McMaster ...................... 705/34 |
| 2010/0211518 | A1 * | 8/2010 | Ohnemus et al. ............. 705/348 |
| 2010/0241476 | A1 * | 9/2010 | Fitzpatrick et al. .............. 705/8 |
| 2011/0252103 | A1 * | 10/2011 | Beyer et al. .................... 709/206 |
| 2012/0116958 | A1 * | 5/2012 | Soholt ............................ 705/39 |
| 2012/0310798 | A1 * | 12/2012 | Carter ............................. 705/30 |

OTHER PUBLICATIONS

Liz Moyer, The Most Charitable Companies, Nov. 2005, Forbes.com, http://www.forbes.com/2005/11/11/charities-corporations-giving-cx_Im_1114charity.html.*

Liz Moyer, The Most Charitable Companies, Nov. 2005, Forbes.com, http://www.forbes.com/2005/11/11/charitiescorporations-giving-cx_Im_1114charity.html.*

Nick Ockenden, "Valuing time and money. The real and perceived value of volunteering and giving", 2008, Institute for Volunteering Research.*

(Continued)

*Primary Examiner* — Gurkanwaljit Singh
*Assistant Examiner* — Mehmet Yesildag
(74) *Attorney, Agent, or Firm* — Perkins Coie LLP

(57) ABSTRACT

A system and method for generating a community contribution index (CCI) for organizations and providing reports pertaining to the CCI for one or more organizations is described. The CCI for an organization is calculated based upon monetary donations provided by the organization and the members associated with the organization and the number of volunteer hours provided by the members. The CCI provides a standardized way to measure an organization's contributions to the community.

15 Claims, 69 Drawing Sheets

(56) References Cited

OTHER PUBLICATIONS

Philanthropy50 (Philanthropy 50, Philanthropy.com, Jun. 2010, http://web.archive.org/web/20100623064618/http://philanthropy.com/section/Philanthropy-50/370).*
Chip in, Collect Money Now!, Instant Archive WayBackMachine Beta, http://web.archive.org/web/20070226174520/http.//www.chipin.com Nov. 17, 2012.
International Search Report PCT/US2008/067936 dated Feb. 10, 2009, pp. 1-4.
Written Opinion PCT/US2008/067936 dated Feb. 10, 2009, pp. 1-5.
Co-Pending U.S. Appl. No. 12/144,520 of Good, B.L., filed Jun. 23, 2008.
Co-Pending U.S. Appl. No. 12/479,562 of Good, B.L., et al., filed Jun. 5, 2009.
Co-Pending U.S. Appl. No. 13/553,575 of Good, B.L., et al., filed Jul. 19, 2012.
Co-Pending U.S. Appl. No. 13/758,990 of Good, B.L., filed Feb. 5, 2013.
Restriction Requirement mailed Sep. 29, 2011, in Co-Pending U.S. Appl. No. 12/144,520 by Good, B.L., filed Jun. 23, 2008.
Non-Final Office Action mailed Nov. 25, 2011, in Co-Pending U.S. Appl. No. 12/144,520 by Good, B.L., filed Jun. 23, 2008.
Final Office Action mailed mailed May 21, 2012, in Co-Pending U.S. Appl. No. 12/144,520 by Good, B.L., filed Jun. 23, 2008.
Restriction Requirement mailed Aug. 30, 2011, in Co-Pending U.S. Appl. No. 12/479,562 by Good B.L., et al., filed Jun. 5, 2009.
Non-Final Office Action mailed Oct. 27, 2011, in Co-Pending U.S. Appl. No. 12/479,562 by by Good B.L., et al., filed Jun. 5, 2009.
Final Office Action mailed Apr. 6, 2012, in Co-Pending U.S. Appl. No. 12/479,562 by Good B.L., et al., filed Jun. 5, 2009.
Philanthropy.com, Philanthropy 50, Jun. 2010, http://web.archive.org/web/20106230646l8/http://philanthropy.com/secti n/Philanthropy-50/370.
Non-Final Office Action mailed Jun. 19, 2013, in Co-Pending U.S. Appl. No. 13/758,990 by Good, B.L., filed Feb. 5, 2013.

* cited by examiner

*FIG. 4*

| Welcome, Markus Hagen / LOG OUT | ♡ MY DOCK (3) Messages | ⌘ VISUALIZATION | POWERED BY ⓒⓢ | Search | GO |

United Way of Metropolitan Atlanta

United Way

| Home | Groups | Collaborate | Donate | Volunteer | Sponsor | Grants | Knowledge | Photos | Videos | Control Center |

Start your own SubGroup

Step 1 › Step 2 › Step 3 › Step 4 ›

Invite Group Members

⦿ Yes, I would like to invite people to my group

Upload Members from my existing address book: ▼ Outlook

- [x] Peter Salios
- [x] Dwight James
- [x] Frank Myers
- [x] Natalie Zeth
- [x] Josh Rogan
- [x] Ronaldo Zeis
- [x] Markus Hagen
- [x] Natalie Stevens

ADD TO -MEMBERS INVITATION LIST-

OR Input members one at a time:    First Name: [  ]   Last Name: [  ]   Email Address: [  ]

ADD TO -MEMBERS INVITATION LIST-

Members Invitation List:
- [x] Peter Salios
- [x] Dwight James
- [x] Frank Myers
- [x] Natalie Zeth
- [x] Josh Rogan
- [x] Ronaldo Zeis
- [x] Markus Hagen
- [x] Natalie Stevens

ADD TO -MEMBERS INVITATION LIST-

○ No thanks, I don't want to invite people at this point, remind me later!

[<< Back]                                                                 [Next >>]

Group Membership Settings

I allow my Child to:

● Join only groups with my approval (Recommended)

○ Join only groups without my approval

Note: If your Child wants to join a group, you will automatically receive a Request asking for your approval

---

Communication Settings

My Child can Communicate:

● Only with Validated members within groups I approve (Recommended)

○ with anyone within groups I approve

○ with only Validated members in any group

○ with anyone in any group

Note: If your Child wants to communicate with an individual, you will automatically receive a Request asking for your approval

---

Content Viewing Settings

My Child can View Content Rated:

● OG-G      No violence, inappropriate language or images. (Recommended)

○ OG-PG    Parental guidance should be used. May contain what some parents deem as suggestive language, mildly offensive images, and/or dialogue. Suggested okay for children under age of 12.

○ OG-18    Parental guidance should be used. Material with this rating may contain images, suggestive dialogue, and/or violence that some parent believe is inappropriate. (Suggested okay for children under age of 12 to 17).

○ OG-MA   Unsuitable for audiences under 18. Content may contain graphic, disturbing images and language that even adults might find upsetting.

Learn More about OurGroup Ratings

Invite Bradley to connect with you on OurGroup [X]

How do you know Bradley?

- ◉ Friend
- ○ Colleague
- ○ Partner
- ○ Classmate
- ○ Group Member
- ○ I don't know this individual

Include a personal note (optional):

> I'd like to add you to my Connections on OurGroup
> --
> Markus Hagen

Important: Only connect with individuals you know or who are validated. <u>Find out why</u>.

[ Send Invitation ] [ Cancel ]

*FIG. 19*

```
From:     Bradley Good via OutGroup <member@ourgroup.org>
Subject:  Re: Join my Connections on OurGroup
  Date:   December 21,2010 10:26:02 AM PST
    To:   Bradley Good
```

Re: Connection Invitation  Ourgroup™.org
Change the world today

 Congratulations Markus Hagen:
You and Bradley are now connected!
[View Brad's Profile]

Bradley's Connections (47)                                    See All

 Frank Dibble           Frank Dibble
Sr, Executive Director, Company    Sr, Executive Director, Company
[Connect]                          [Connect]

 Frank Dibble           Frank Dibble
Sr, Executive Director, Company    Sr, Executive Director, Company
[Connect]                          [Connect]

Bradley's Group Memberships

 The United Way of Metropolitan     The YMCA Westchester
Atlanta                                                 [Join]
[Join]

 We Can Solve it                   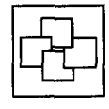 Guide, Inc.
[Join]                                                  [Join]

Groups

A list of all Groups involved in this Group.

| Name | Donations | Volunteering | Sponsoring | Members | Supporters | Ratings | Links |
|---|---|---|---|---|---|---|---|
| The Gateway Center | $582,000 | 8,400 hrs | 170 Projects, 11 Individual | 16,700 | 310 | +++++ (558) | GROUP SITE |
| Campaigns | $53,000 | 3,350 hrs | 3 Projects, 1 Individual | 640 | 67 | +++++ (14) | GROUP SITE |
| High School Homelessness Program | $2,400 | 1,600 hrs | 3 Projects, 1 Individual | 160 | 15 | +++++ (3) | GROUP SITE |
| Lakeside High School | $600 | 400 hrs | 3 Projects, 1 Individual | 40 | 11 | +++++ (14) | GROUP SITE |
| Mrs. Frank's 11th Grade Classes | $150 | 100 hrs | 3 Projects, 1 Individual | 10 | 6 | +++++ (12) | GROUP SITE |
| Team1 | $150 | 100 hrs | 3 Projects, 1 Individual | 10 | 5 | +++++ (5) | GROUP SITE |
| Team2 | $150 | 100 hrs | 3 Projects, 1 Individual | 10 | | +++++ (18) | GROUP SITE |
| Mr. Jones' 11th Grade Class | $600 | 100 hrs | 3 Projects, 1 Individual | 10 | 3 | +++++ (14) | GROUP SITE |
| Mr. Smith's 11th Grade Class | $600 | 400 hrs | 3 Projects, 1 Individual | 40 | - | +++++ (14) | GROUP SITE |
| High School Name2 | $2400 | 400 hrs | 3 Projects, 1 Individual | 40 | 2 | +++++ (18) | GROUP SITE |
| Companies | $250,000 | 1,000 hrs | 3 Projects, 1 Individual | 40 | | +++++ (184) | GROUP SITE |
| Schools | $35,725 | 1,000 hrs | 3 Projects, 1 Individual | 160 | | +++++ (18) | GROUP SITE |
| All Groups (in Alphabetical Order) | $582,000 | 8,400 hrs | 3 Projects, 1 Individual | 160 | 22 | +++++ (14) | GROUP SITE |

*FIG. 23*

Individuals

A list of all Individuals involved in this Group.

| Name | Donations | Volunteering | Sponsoring | Supporters | Friends | Ratings | Links | Profile |
|---|---|---|---|---|---|---|---|---|
| ▷ All Individuals | $582,000 | 15,120 hrs | 28 Projects, 166 Indi... | 12 | 6,897 | +++++ (14) | Individual's Wall | |
| ▷ Campaigns | $53,000 | 3,350 hrs | 3 Projects, 1 Individual | 850 | | +++++ (3) | Individual's Wall | |
| ▽ Supporters | $10,600 | 1050 hrs | 21 Projects, 7 Indi... | 30 | | +++++ (14) | Individual's Wall | |
| Matt Damon | $5,000 | 150 hrs | 3 Projects, 1 Individual | 30 | 30 | +++++ (12) | Individual's Wall | PROFILE |
| Peter Myers | $150 | 150 hrs | 3 Projects, 1 Individual | 30 | 12 | +++++ (5) | Individual's Wall | PROFILE |
| Dwight Jones | $150 | 150 hrs | 3 Projects, 1 Individual | 30 | 12 | +++++ (18) | Individual's Wall | PROFILE |

Events

Welcome, Markus Hagen | LOG OUT | MY DOCK (3) Messages | VISUALIZATIONS | POWERED BY | Search | GO

GATEWAY — 24/7 HOMELESS SERVICES CENTER

Home | Groups | Individuals | Events | Collaborate | Donate | Volunteer | Sponsor | Knowledge | Photos | Videos The Gateway is an official partner of the United Way of Metropolitan Atlanta's Homelessness Network United Way of Metropolitan Atlanta Control Center Main | Terms and Conditions | Frequently Asked Questions Welcome to our Events Center. This is the place, where you can find all our ongoing and past events. Help us make a difference with our work to end homelessness in Atlanta.

Search [ GO ]

VIEWING MODE

| Event | Where | When | For Whom | People Needed | Ratings | More Info |
|---|---|---|---|---|---|---|
| ▽ Upcoming Events | | | | | | |
| Feed the Homeless | 275 Pryor St. SW, Atlanta, GA | 05/15/10, 10:30 am | All Members | at least 10 | +++++ (0) | MORE INFO |
| 2010 Summer Celebrations | 275 Pryor St. SW, Atlanta, GA | 07/20/10, 8:00 am | All Members | 22 | +++++ (0) | MORE INFO |
| ▽ Past Events | | | | | | |
| Spring Cleaning Event | 275 Pryor St. SW, Atlanta, GA | 06/25/10, 11:00 am | All Members | As Many as possible | +++++ (12) | MORE INFO |
| Shoebox Event | 275 Pryor St. SW, Atlanta, GA | 07/20/10, 8:00 am | All Members | As Many as possible | +++++ (5) | MORE INFO |
| Homelessness Awareness Day | 275 Pryor St. SW, Atlanta, GA | 06/25/10, 11:00 am | All Members | As Many as possible | +++++ (18) | MORE INFO |

*FIG. 26*

| Step 1 Donation Amount | Step 2 Choose a Way to Pay | Step 3 Review and Donate |

Donation Amount

Donation goes to: ⓒⓖ The Gateway Center

I want to Donate the following Amount: $500.00

◉ One-Time Donation  ◯ Monthly Recurring Donation

Fees: $5.50

☐ I will cover the Fees of my Donation (not tax-deductible)

Covering the fees will help improve the operational efficiency of the organization you are about to Donate the money to. 100% of your Donation will go to that organization. If you don't want to cover the Fees, they will automatically be deducted from the Donation amount.
Why is there a Fee?

Have a Gift Card Code? [          ]

Total Due: $500.00

[ Next > ]

*FIG. 28*

Feed the Homeless and Hungry

| | | |
|---|---|---|
| Who? | The Gateway Center | Group Site |
| Where? | 275 Pryor St. SW, Atlanta, GA 30303 | Map |
| When? | This is an ongoing opportunity | |
| For Whom? | Teens, 55+, Groups | |
| Volunteers Needed | 12 | |
| Clearance | Anybody can Apply | |
| Rating | +++++ (10 Reviews) | |

Volunteer Opportunity Description

The primary volunteer opportunity is to help serve the six-course daily buffet meal. Other opportunities include picking up food donations, helping prepare donated food in the newly-remodeled kitchen, helping load the truck to transport food to our open-air distribution site (two blocks away), helping re-load the truck to return to the kitchen, and helping wash up.

The meal is served from 6:15pm to about 7:30pm daily. You decide when you can come and how long you can stay! When you're ready, please sign up for your first shift online. Thank you!

Skills Required

You already have everything you need: the desire to volunteer for an hour or two, to get along with your fellow volunteers, and to give unreservedly of yourself to those in serious need. (Drivers also need a valid drivers' license.) It's fun and rewarding!

About this Group

To feed the homeless and hungry of our community a hot, fresh, and nutritious meal every day, seven days a week, throughout the year. To do it in such a way as to give back to the people we serve a sense of their own dignity, and to restore their confidence in being able to resume their place in society with the rest of us, as productive citizens - in short, to treat them like individual human beings in temporary distress, instead of as untouchables.

Apply Now

Message

000/031

Volunteer Videos

Volunteer Day 2010 consectetur adipiscing Eslo idaffacgad
*****

250 clients served this week consectetur adipiscing elit, set Eslo idaffacgad
*****

Other Volunteer Opportunities from this Group

06/04/10  Feed the Homeless and Hungry
05/26/10  Mentor our homeless youth
05/14/10  Weekly cleanup of our facility
05/07/10  Annual neighborhood reachout party

*FIG. 31*

Welcome, Markus Hagen | MY DOCK (3) Messages | VISUALIZATIONS | POWERED BY | Search | GO

GATEWAY
24/7 HOMELESS SERVICES CENTER

The Gateway is an official partner of the United Way of Metropolitan Atlanta's Homelessness Network United Way of Metropolitan Atlanta Control Center Home | Groups | Individuals | Events | Collaborate | Donate | Volunteer | Sponsor | Knowledge | Photos | Videos

Sponsor

Main | Subcategory1 | Subcategory2 | Subcategory3 | Subcategory4

Sponsor an Individual

| Individual Name | City | State | Country | Sponsor |
|---|---|---|---|---|
| Frank Delaarosa | Los Angeles | CA | USA | SPONSOR |
| Peter Samplename | Los Angeles | CA | USA | SPONSOR |
| Stacey Noritama | Los Angeles | CA | USA | SPONSOR |
| Thomas Kermath | Los Angeles | CA | USA | SPONSOR |
| Frank Delaarosa | Los Angeles | CA | USA | SPONSOR |
| Peter Samplename | Los Angeles | CA | USA | SPONSOR |
| Stacey Noritama | Los Angeles | CA | USA | SPONSOR |
| Thomas Kermath | Los Angeles | CA | USA | SPONSOR |
| Frank Delaarosa | Los Angeles | CA | USA | SPONSOR |

Sponsor a Project

| Project | City | State | Country | Sponsor |
|---|---|---|---|---|
| Gateway Shuttle Bus | Los Angeles | CA | USA | SPONSOR |
| Healthy Babies | Los Angeles | CA | USA | SPONSOR |
| Responsible Teen Drivers | Los Angeles | CA | USA | SPONSOR |
| Rebuild Youth Hall | Los Angeles | CA | USA | SPONSOR |
| Drugfree Downtown LA | Los Angeles | CA | USA | SPONSOR |
| Healthy Babies | Los Angeles | CA | USA | SPONSOR |
| Responsible Teen Drivers | Los Angeles | CA | USA | SPONSOR |
| Rebuild Youth Hall | Los Angeles | CA | USA | SPONSOR |
| Drugfree Downtown LA | Los Angeles | CA | USA | SPONSOR |

The Latest

Filter By ▽

164

| Post a Quick Message | Post a Whole Story |

The WE Campaign just launched the next phase of its online campaign: The Repower Wall. Check out George Pelecanos, he is truly inspiring. ⌐ 4210

Add a Link   4230                                    4220

Rate this message: ○ OG-G  ⊙ OG-PG  ○ OG-PG14  ○ OG-MA                   👁▽   [ Share ]

---

Markus Hagen ✓ says:
The WE Campaign just launch
campaign: The Repower Wall
he is truly inspiring.
http://www.youtube.com/repowerwall/georg
Posted 1 min ago | OG-G | Share | Report Abuse | C Markus Hagen ✓ says:
Criminal justice is our social s
everything else is falling apar
Posted 2 hrs ago | OG-G | Share | Report Abuse | C Markus Hagen ✓ says:
Very interesting story on soci
http://cnn.com/2010/09/criminal-justice-is-ou
Posted 2 hrs ago via CNN | OG-MA | Share | Repor Markus Hagen ✓ says:
How the Gateway helped two
homelessness!
Posted 2 hrs ago | OG-G | Share | Report Abuse | C

Share on:

Individuals
[X] My Profile
[X] All My Followers Profiles

Connections
○ All my Connections' Profiles
⊙ Custom                    [Edit]

Groups
[X] spcaLA
[X] Youth & Government Westchester

Umbrellas
[X] Generation Empathy

Third Party Sites
[X] Facebook
    LinkedIN           [Link Account]
[X] Twitter Note: Quick Messages you share on OurGroup Group and Umbrella Sites might be shared with others

[ Save ]  [ Cancel ]

---

Show More

*FIG. 42*

Posted 2 hrs ago via YouTube | Like (16) | Share | Report Abuse | Comments (1)

Carole Myers says:
Lorem ipsum dolor sit amet, consectetur adipiscing elit, set eiusmod tempor incidunt et labore. Eslo idaffacgad gef trenz beynocguon quiel ba trenz itoms alung gith cakiw.
45 min ago | Like | Report Abuse Write a Comment

OurGroup Report Card
[Save] [Print]

Certificate of Volunteering

Issued to: Markus Hagen    OurGroup Member since: 01/01/2008
123 Main St.
Springfield, CA 12345

Period: 01/01/2010 - 12/31/2010

OurGroup is proud to acknowledge the above named individual to have volunteered the following amount of hours. The volunteer amount of hours have been verified by the organizations the individual has volunteered for.

Volunteer Hours Total (2010): 50

Itemized Volunteer Hours

2010

 YMCA Westchester:  25

 United Way of Atlanta:  5

 Guide, Inc.:  10

 We Can Solve it:  10

Verified by:

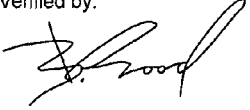

Bradley Good, CEO, OurGroup, Inc.
Pasadena, CA 91206

©OURGROUP™.ORG

Tell your Friends about the Tribute Page

Email Message

> My Mother Ida has been a strong supporter to end homelessness all of her life. So I thought it is only fitting to make a donation to the Gateway on her behalf. I encourage you, if you want to make a contribution (in lieu of flowers), to do the same thing. That's what she would have wanted and would make her happy.

[ Preview Email ]

Send Email to these people

Upload emails from existing address book: ▽ | Outlook

- [X] Peter Salios
- [X] Dwight James
- [X] Frank Myers
- [X] Natalie Zeth
- [X] Josh Rogan
- [X] Ronaldo Zeis
- [X] Markus Hagen
- [X] Natalie Stevens

[ Add to Email List ]

Or input members one at a time:

[ Email Address ]

[ Add to Email List ]

Email List:
- [ ] Peter Salios
- [X] Dwight James
- [ ] Frank Myers
- [ ] Natalie Zeth
- [ ] Josh Rogan
- [ ] Ronaldo Zeis
- [ ] Markus Hagen
- [ ] Natalie Stevens

[ Remove ]

[ < Back ]    [ Send Email ]

Invites

- Invites
- Sent
- Drafts
- Deleted

Individuals
- Accepted
- Not accepted yet (16)
- Not Delivered (16)
- Deleted

[Resend]  [Settings]

Sent by: Markus Hagen
Invite: Invitation – 006
Date: Friday, November 04, 2011 03:34 PM Dear (Group Name) Members, I wanted to invite you to join us on OurGroup. I think this will help us grow our cause and get more people involved Cheers, Markus

| Recipient | Delivered | Accepted | Sender | Date Accepted |
|---|---|---|---|---|
| borchert@sbcglobal.net | Yes | Not Yet | Markus Hagen | |
| mdailey@andersondailey.com | Yes | Yes | Markus Hagen | Friday, November 04, 2011 03:34 PM |
| bg212@hotmail.com | No | Not Yet | Markus Hagen | |
| borchert@sbcglobal.net | Yes | Yes | Markus Hagen | Friday, November 04, 2011 03:34 PM |
| mdailey@andersondailey.com | Yes | Yes | Markus Hagen | Friday, November 04, 2011 03:34 PM |
| borchert@sbcglobal.net | Yes | Yes | Markus Hagen | Friday, November 04, 2011 03:34 PM |
| mdailey@andersondailey.com | Yes | Yes | Markus Hagen | Friday, November 04, 2011 03:34 PM |
| bg212@hotmail.com | Yes | Yes | Markus Hagen | Friday, November 04, 2011 03:34 PM |
| borchert@sbcglobal.net | No | Not Yet | Markus Hagen | |

*FIG. 59*

Stories

How The Gateway helped two brothers overcome homelessness!

Posted by Markus Hagan 2 hrs ago
OG-G | Share  Report Abuse

Tags: Homelessness, Philanthropy, Atlanta

About roughly 3 years ago Bradley Good introduced me to his vision of what he wanted to accomplish with this company call "OurGroup". At the time I was working at NBC and was responsible for the design of some of the show websites, which accompanied the NBC shows. It was an exciting time, since the websites evolved into mch more than just accessories to the shows and they took on their own lives, most notably the "Heroes" website or better said, the "Heroes Evolutions" web experience. It was clear that Re-Share   Edit   Delete Share a New Story

Drafts
OG-G | Share  Report Abuse
How I met with Real Medicine for the first time

Shared Stories
How The Gateway helped two brothers overcome homelessness!
How The Gateway helped two brothers overcome homelessness!
How The Gateway helped two brothers overcome homelessness!
How The Gateway helped two brothers overcome homelessness!
How The Gateway helped two brothers overcome homelessness!
Lorem ispem denn gerit ihret hatten seinert
Durlesk binnert seinertuisk

|   |   | Alpha — 6401 | Beta — 6402 | Gamma — 6403 |
|---|---|---|---|---|
| 1 |   |   |   |   |
| 2 | Total organization donations | $6,500,000 | $6,750,000 | $8,025,000 |
| 3 | Total member donations | $1,000,000 | $1,250,000 | $950,000 |
| 4 | Total donations | $7,500,000 | $8,000,000 | $8,975,000 |
| 5 | Volunteer hours | 750,000 | 350,000 | 370,000 |
| 6 | Country's average hourly earnings | $23 | $23 | $23 |
| 7 | Estimated value of volunteer hours | $17,250,000 | $8,050,000 | $8,510,000 |
| 8 | Weight volunteer hour value (1.5x) | $25,875,000 | $12,075,000 | $12,765,000 |
| 9 | Total organization points | 33,375,000 | 20,075,000 | 21,740,000 |
| 10 | Total members | 34,400 | 71,000 | 294,000 |
| 11 | CCI | 970 | 283 | 74 |

*FIG. 64*

SYSTEM AND METHOD FOR GENERATING A COMMUNITY CONTRIBUTION INDEX

CROSS-REFERENCES TO RELATED APPLICATIONS

This application claims the benefit of and incorporates by reference in its entirety U.S. Provisional Application No. 61/509,966, entitled "COMMUNITY CONTRIBUTION INDEX", filed Jul. 20, 2011.

BACKGROUND

The financial services company Bloomberg gathers and tracks sustainability data on companies and offers environmental, social, and governance (ESG) analysis. In particular, the social component of the analysis includes information such as whether a company's community spending is greater than 1% of pre-tax profit and whether the company has a policy to protect the rights of all people with whom it works. However, many organizations, for example, multi-national corporations provide philanthropic support of communities through volunteer efforts of its employees, and this type of information is not tracked by Bloomberg.

BRIEF DESCRIPTION OF THE DRAWINGS

Examples of a system for generating a community contribution index (CCI) are illustrated in the figures. The examples and figures are illustrative rather than limiting.

FIG. 4 shows an example home page for a validated umbrella group.

FIG. 7 shows an example screenshot where the head of the sub-group can import names of individuals to invite for joining the sub-group.

FIG. 8 shows an example screenshot of a page where the head of the sub-group can create the invitation message to be sent to the previously selected individuals.

FIG. 10 shows example parental controls settings.

FIG. 13 shows an example online registration form.

FIG. 19 shows an example screenshot of queries asked by the system when attempting to connect with a member of the online platform.

FIG. 20 shows an example email sent by the system to a user who requested a connection with a member of the online platform who agreed to the connection.

FIG. 22 shows an example landing page for a registered group.

FIG. 23 shows an example groups center web page.

FIG. 24 shows an example individuals center web page.

FIG. 25 shows an example supporter page.

FIG. 26 shows an example events center page where upcoming and past events are listed.

FIG. 28 shows an example screenshot for a first step in making a donation.

FIG. 31 shows an example listing with more information about a volunteer opportunity.

FIG. 32 shows an example sponsor center web page.

FIG. 34 shows an example knowledge center page.

FIG. 35 shows an example of a general landing page that has not been customized.

FIG. 37 shows an example control center web page listing the available tools for managing a group.

FIG. 38 shows an example control center web page with statistics pertaining to funds and revenue for a group.

FIG. 40 shows an example screen shot where a user is prompted regarding the sites he wishes to share content with.

FIG. 42 shows part of an example profile page where the member is posting a message to his activity feed.

FIG. 44 shows an example comment with a feedback bar.

FIG. 45 shows an example dock with unread email messages shown in a dropdown format.

FIG. 46 shows an example dock with new notifications shown in a dropdown format.

FIG. 47 shows an example of a notifications page.

FIG. 48 shows an example dock with new requests shown in a dropdown format.

FIG. 49 shows an example of a requests web page.

FIG. 50 shows an example volunteer summary page.

FIG. 51 shows an example report card itemizing a member's volunteer hours with various groups.

FIG. 52 shows an example donations listing page.

FIG. 54 shows an example screenshot for querying an individual setting up a tribute page.

FIG. 55 shows an example screenshot used to email information about a tribute page.

FIG. 56 shows an example of a tribute page.

FIG. 57 shows a content review webpage.

FIG. 58 shows an example summary of invitations sent by a group administrator.

FIG. 59 shows a listing of recipients to whom a particular invitation was sent.

FIG. 60 shows an example of a stories page for an individual.

FIG. 61 shows an example of a crisis center page for the online platform.

FIG. 64 shows an example spreadsheet that illustrates how the CCI is calculated.

DETAILED DESCRIPTION

A system and method for generating a community contribution index (CCI) for organizations and providing reports pertaining to the CCI for one or more organizations is described. The CCI for an organization is calculated based upon monetary donations provided by the organization and the members associated with the organization and the number of volunteer hours provided by the members. The CCI provides a standardized way to measure an organization's contributions to the community. The CCI can be used to make philanthropic comparisons of organizations and to track philanthropic trends.

Various aspects and examples of the invention will now be described. The following description provides specific details for a thorough understanding and enabling description of these examples. One skilled in the art will understand, however, that the invention may be practiced without many of these details. Additionally, some well-known structures or functions may not be shown or described in detail, so as to avoid unnecessarily obscuring the relevant description.

The terminology used in the description presented below is intended to be interpreted in its broadest reasonable manner, even though it is being used in conjunction with a detailed description of certain specific examples of the technology. Certain terms may even be emphasized below; however, any terminology intended to be interpreted in any restricted manner will be overtly and specifically defined as such in this Detailed Description section.

Figure 1A:
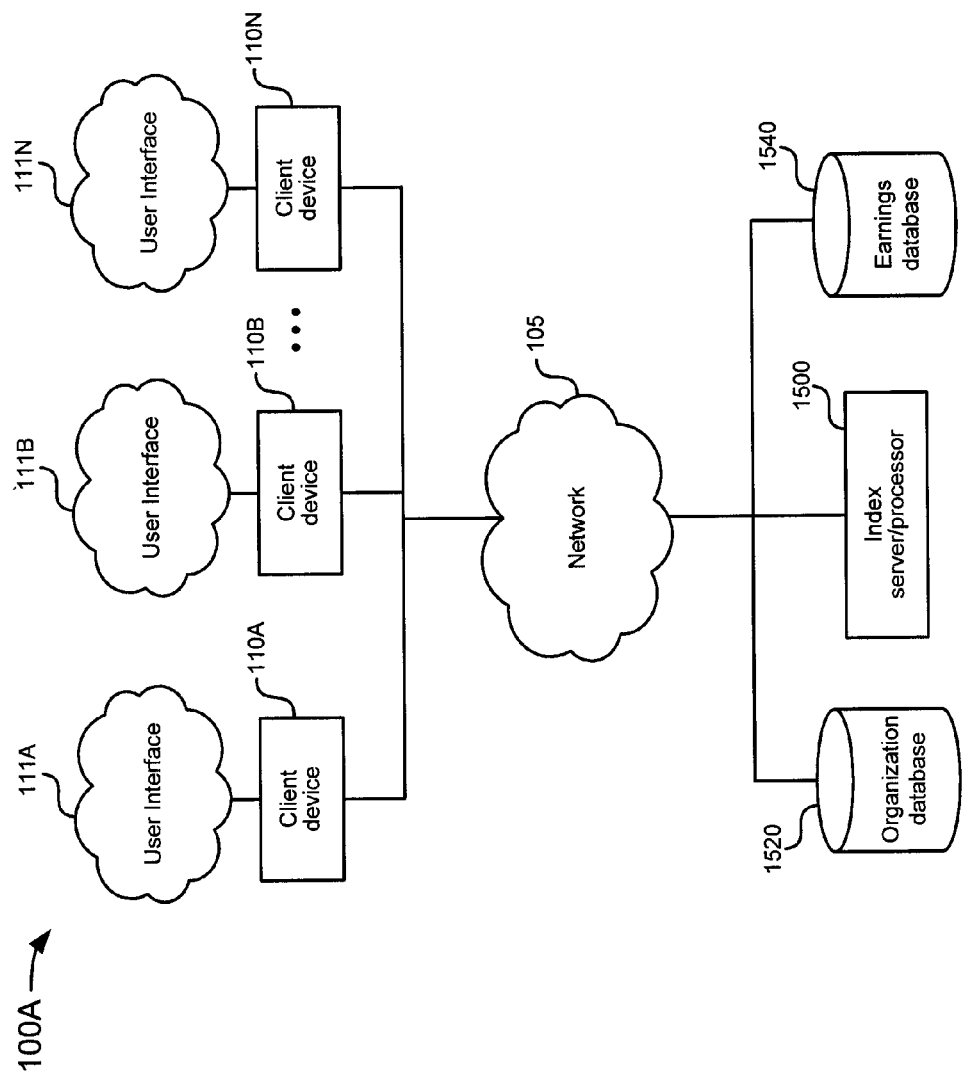
FIG. 1A illustrates a diagram of an example system where an index server generates a CCI for organizations and responds to queries pertaining to the CCI.

FIG. 1A illustrates a block diagram of a general environment in which an index server 1500 generates a community contribution index (CCI) for organizations and responds to queries pertaining to the CCI for organizations. Example client devices 110A-N with user interfaces 111A-N, an index server 1500, an organization database 1520, and an earnings database 1540 are coupled via a network 105, according to one embodiment. More than one index server 1500 can be coupled to the network 105, however, only one index server is shown in FIG. 1A for clarity.

The client devices 110A-N can be any system and/or device, and/or any combination of devices/systems that is able to establish a connection with another device, a server and/or other systems. The client devices 110A-N typically include display or other output functionalities to present data exchanged between the devices and the index server 1500 to a user. For example, the client devices can be, but are not limited to, a server desktop, a desktop computer, a computer cluster, a mobile computing device such as a notebook, a laptop computer, a handheld computer, a mobile phone, a smart phone, a PDA, a BlackBerry™ device, a Treo™, and/or an iPhone, etc. In one embodiment, the client devices 110A-N are coupled to a network 105. In some embodiments, the client devices may be directly connected to the index server 1500.

The network 105, to which the client devices 110A-N and index server 1500 are coupled, may be a telephonic network, an open network, such as the Internet, or a private network, such as an intranet and/or the extranet. For example, the Internet can provide file transfer, remote log in, email, news, RSS, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc.

The network 105 may be any collection of distinct networks operating wholly or partially in conjunction to provide connectivity to the client devices, index server, and may appear as one or more networks to the serviced systems and devices. In one embodiment, communications to and from the client devices 110A-N may be achieved by, an open network, such as the Internet, or a private network, such as an intranet and/or the extranet. In one embodiment, communications may be achieved by a secure communications protocol, such as secure sockets layer (SSL), or transport layer security (TLS). In addition, communications can be achieved via one or more wireless networks.

The client devices 110A-N can be coupled to the network (e.g., Internet) via a dial-up connection, a digital subscriber loop (DSL, ADSL), cable modem, and/or other types of connection. Thus, the client devices 110A-N can communicate with remote servers (e.g., web server, index server, mail server, instant messaging server) that provide access to user interfaces of the World Wide Web via a web browser, for example.

The organization database 1520 and the earnings database 1540 store information utilized by parts of the index server 1500 for operation. The organization database 1520 and the earnings database 1540 can be managed by a database management system (DBMS), for example but not limited to, Oracle, DB2, Microsoft Access, Microsoft SQL Server, PostgreSQL, MySQL, FileMaker, etc.

The databases 1520, 1540 can be implemented via object-oriented technology and/or via text files, and can be managed by a distributed database management system, an object-oriented database management system (OODBMS) (e.g., ConceptBase, FastDB Main Memory Database Management System, JDOInstruments, ObjectDB, etc.), an object-relational database management system (ORDBMS) (e.g., Informix, OpenLink Virtuoso, VMDS, etc.), a file system, and/or any other convenient or known database management package. An example set of data to be stored in the organization database 1520 and the earnings database 1540 is further illustrated in FIGS. 1C and 1D.

In one embodiment, data stored in the organization database 1520 can be collected from external sources, for example, each organization can be requested to provide the information. However, the information provided by the organization can be incomplete and may not be verifiable.

Figure 1B:
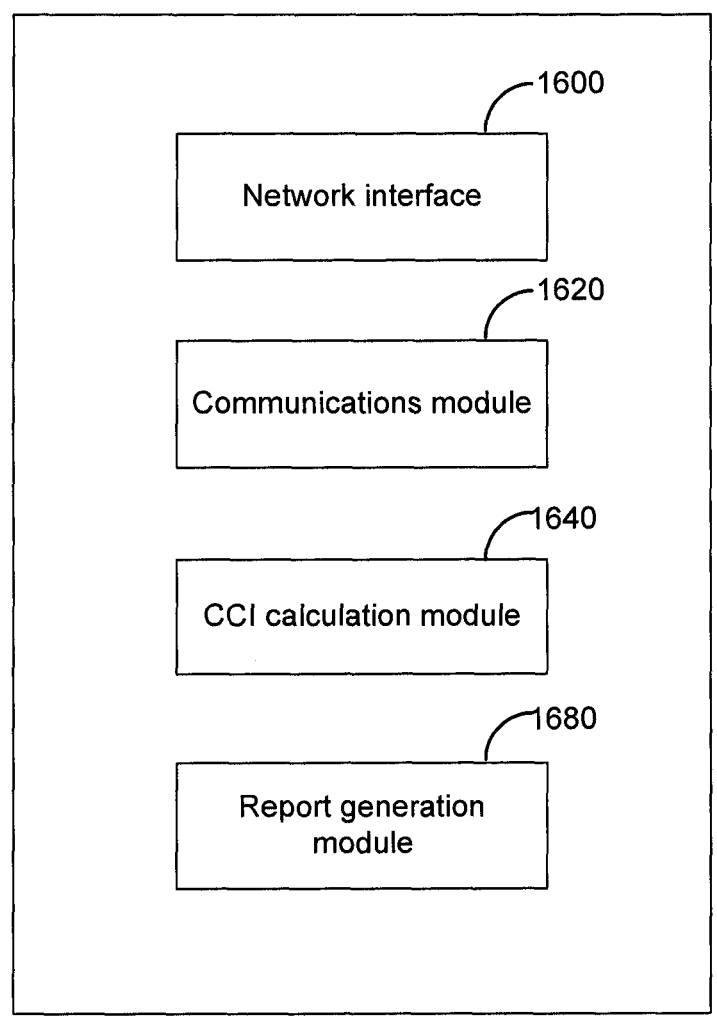
FIG. 1B depicts a block diagram illustrating an example of components in the index server.

As an alternative, in one embodiment, a host server 120 that runs an online platform providing software tools for organizing groups and facilitating communications among group members can gather the relevant data to compile the information for storing in the organization database 1520. FIG. 1F depicts a block diagram illustrating an example of components of the host server 120, FIG. 1G depicts a block diagram illustrating an example of databases accessed by the host server 120, and FIG. 1E illustrates an example diagram of an environment where a host server 120 provides tools for organizing groups and facilitating communications among group members. U.S. application Ser. No. 13/553,575, entitled "SYSTEM AND METHOD FOR PROVIDING SOFTWARE TOOLS WITHIN AN ONLINE PLATFORM FOR ORGANIZING GROUPS AND COMMUNICATING WITH GROUP MEMBERS", filed Jul. 19, 2012, describes the host server 120 in more detail and is hereby incorporated by reference. The host server 120 is also described in more detail below.

The index server 1500 can be any combination of software agents and/or hardware modules for calculating a CCI for an organization or preparing a report related to community contribution indices for particular organizations. FIG. 1B is a block diagram illustrating an exemplary architecture of a CCI server or processor 1500. In the illustrated embodiment, the index server 1500 includes a plurality of functional modules, each of the functional modules configured to perform a function of the index server 1500. The various functional modules can be implemented by using programmable circuitry programmed by software and/or firmware, or by using special-purpose hardwired circuitry, or by using a combination of such embodiments. In some instances, the functional modules are implemented as units in a processor of the index server.

In the example of FIG. 1B, the index server 1500 includes a network interface 1600, a communications module 1620, a CCI calculation module 1640, and a report generation module 1680. Additional or fewer modules may be included. The index server 1500 may be communicatively coupled to the organization database 1520 and/or the earnings database 1540 as illustrated in FIG. 1A. In some embodiments, the organization database 1520 and/or the earnings database 1540 are partially or wholly internal to the index server 1500.

As used herein, a "module," or an "engine" includes a general purpose, dedicated or shared processor and, typically, firmware or software modules that are executed by the processor. Depending upon implementation-specific or other considerations, the module or engine can be centralized or its functionality distributed. The module or engine can include general or special purpose hardware, firmware, or software embodied in a computer-readable (storage) medium for execution by the processor. As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

In the example of FIG. 1B, the network interface 1600 can be one or more networking devices that enable the index server 1500 to mediate data in a network with an entity that is external to the host server, through any known and/or convenient communications protocol supported by the host and the external entity. The network interface 1600 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

One embodiment of the index server 1500 includes the communications module 1620 which is configured to request and receive information from a user, such as the organizations that a user wishes to compare using the CCI. Other information that the communications module 1620 can receive from a user include, but is not limited to, a request for the information that is used to derive the CCI; a request to compare one or more specified organizations; a request to compare one or more specified organizations with other organizations within the same industry, a state, a country, or a region; and a request for a particular CCI-related report. The communications module 1620 is also configured to send the requested CCI information to the user.

In one embodiment, the communications module 1620 can request and receive data for one or more organizations from the organization database 1520, a server, such as the host server 120, or any other source that can provide information needed for CCI calculations.

In one embodiment, the index server 1500 periodically and automatically calculates CCI values for one or more organizations and sends the updated CCI values to subscribers. In this situation, the communications module 1620 periodically requests and receives updated data used for calculating the CCI for one or more organizations from a source, such as organization database 1520, the host server 120, or an online database. After updating the CCI values, the communications module 1620 sends the updated CCI values to requesting users who may be subscribers to a CCI service provided by the index server 1500.

The host server 120 can automatically track donations and volunteer hours when an organization and its members (e.g. a company and its employees), use the online platform for organizing groups and communicating with group members that is provided by the host server 120. The online platform may allow the company to input information regarding monetary donations made by the company if the information is accompanied by substantiating documents. Information pertaining to total company employees can be taken from a company's annual report filings, and companies may be required to add relevant information that is not included in the company's annual report, such as the number of contractors or freelancers working for the company, and whether they work full-time or part-time. In one embodiment, the information tracked by the host server 120 can be stored in the organization database 1520.

One embodiment of the index server 1500 includes the CCI calculation module 1640 which can process information pertaining to charitable donations made by an organization and members/employees of the organization, volunteer hours performed by members of the organization, and the total number of members of the organization to calculate the CCI. CCI values calculated by the CCI calculation module 1640 are stored in the organization database 1540. The CCI calculation module 1640 performs the process shown in FIG. 63 and described below.

One embodiment of the index server 1500 includes the report generation module 1680. The report generation module 1680 can access the calculated CCI values stored in the organization database 1540. The report generation module 1680 can use the industry classification codes for companies to logically compare CCI values by industry. Alternatively or additionally, the report generation module 1680 can compare CCI values for companies by geographic region, or using any other criteria specified by a user requesting the CCI report.

Figure 1C:
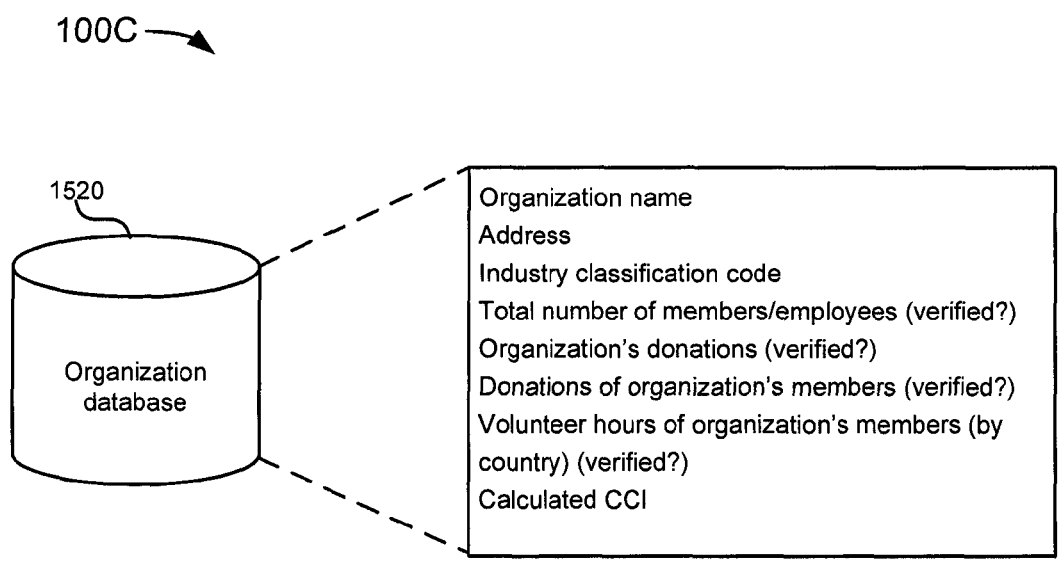
FIG. 1C depicts a block diagram illustrating an example of an organization database that stores organization information.

FIG. 1C depicts a block diagram illustrating an example of an organization database 1520 that stores organization information, according to one embodiment. The organization information includes data related to organizations including, but not limited to, the name of the organization; address; the industry classification code for the organization; the total number of employees and whether the number has been verified; the organization's total monetary donations for a specified time period, such as for a month, a year, or a number of years, and whether the donations have been verified; the monetary donations of the organization's members/employees for a specified time period, and whether the donation amount has been verified; the number of volunteer hours provided by the organization's members broken down by country and for a specified time period, and whether the information has been verified; and the calculated CCI for the organization. The organization information can be periodically updated, for example, month by month, or year by year, and stored for each time period to analyze trends.

Further, the organization database 1520 can also maintain data generated by the index server 1500 that pertain to CCI statistics by region, for example, in North America or Alameda County in California; by state; by country; by industry; etc.

Figure 1D:
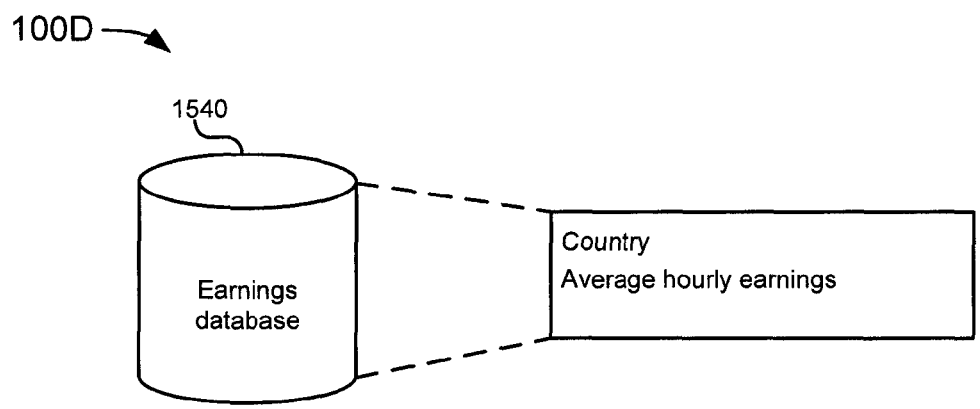
FIG. 1D depicts a block diagram illustrating an example of an earnings database that stores earnings information.
Figure 1E:
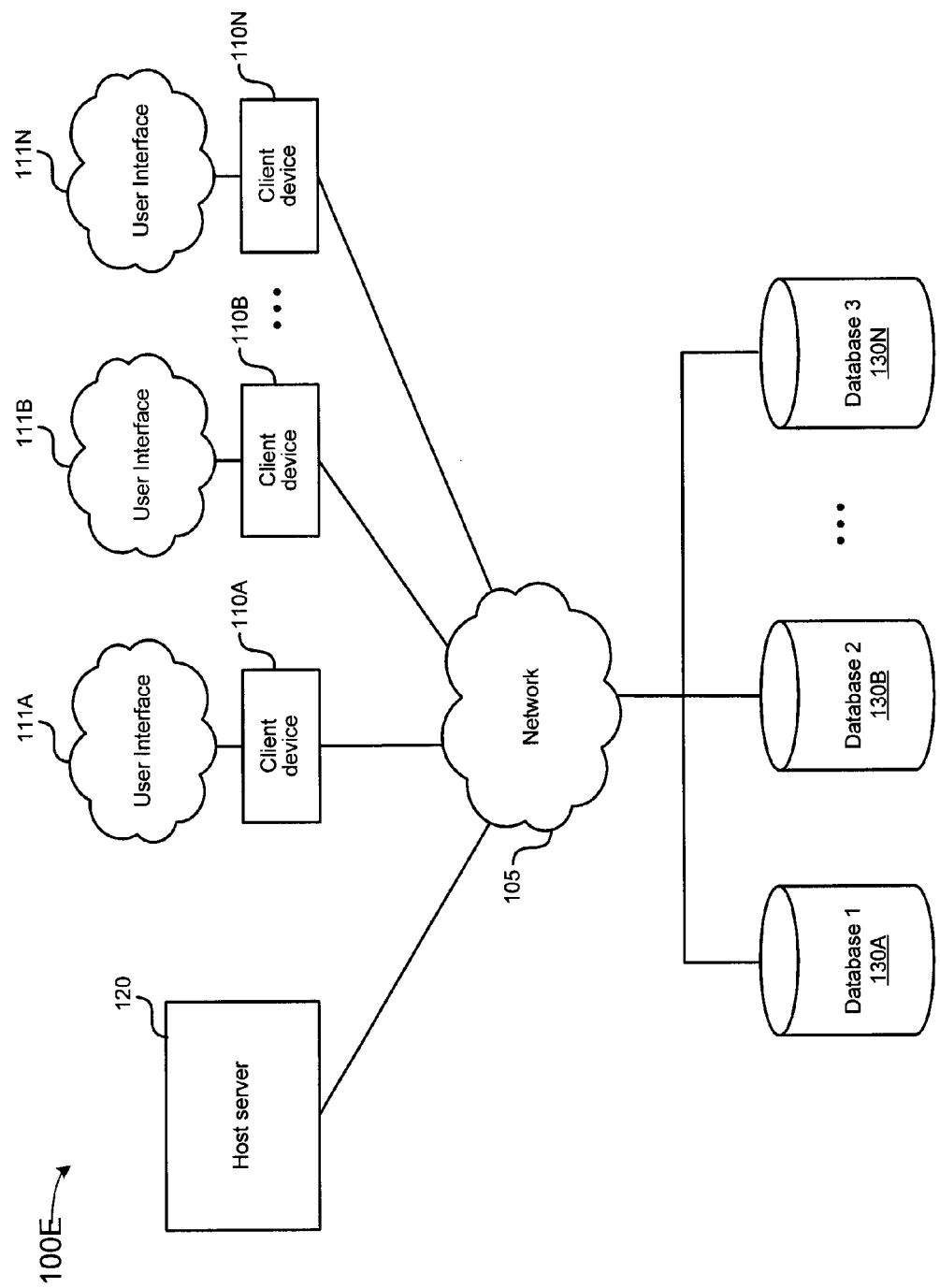
FIG. 1E illustrates a diagram of an example system where a host server provides tools for organizing groups and facilitating communications among group members.
Figure 1F:
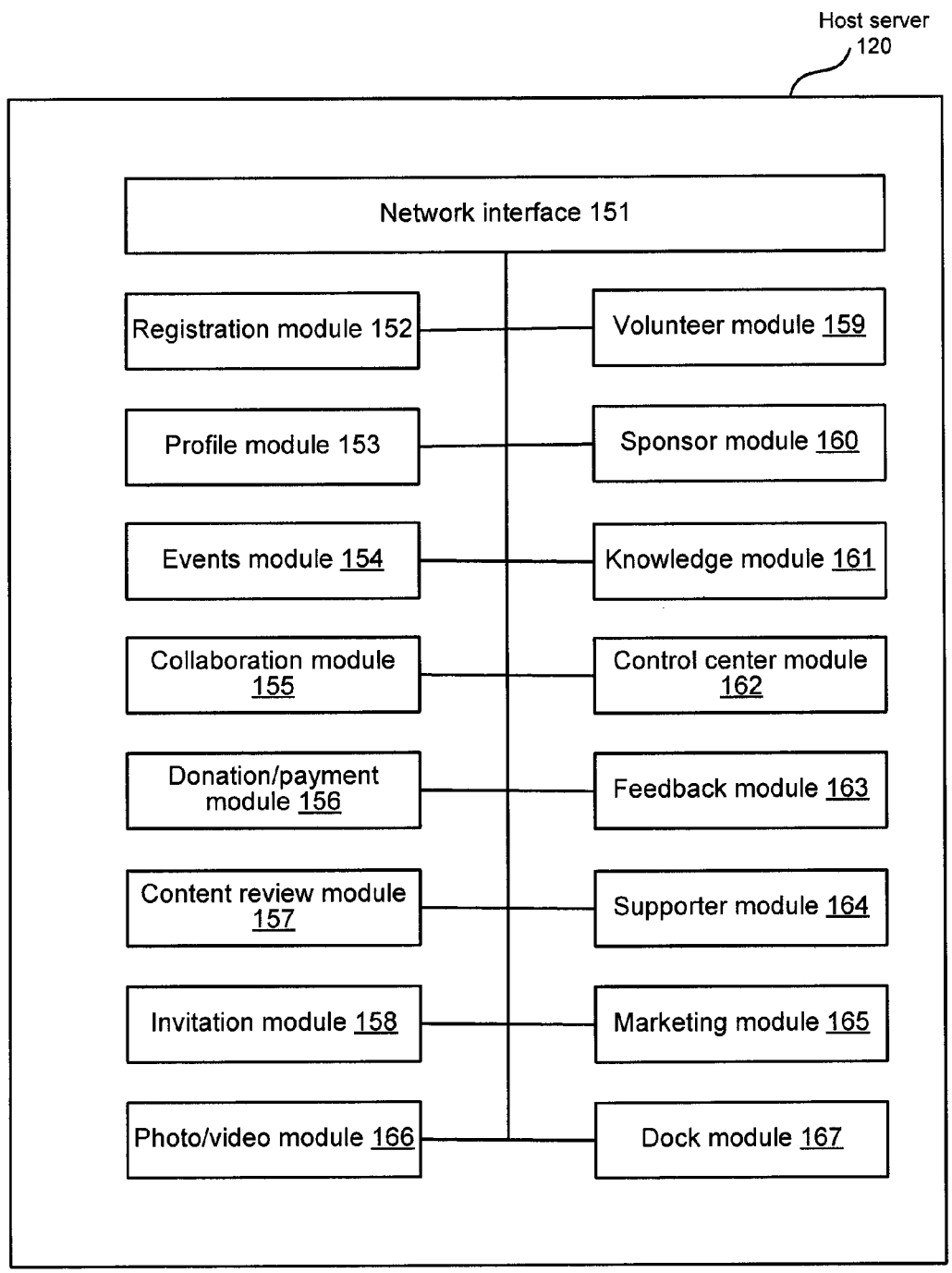
FIG. 1F depicts a block diagram illustrating an example of components of the host server.
Figure 1G:
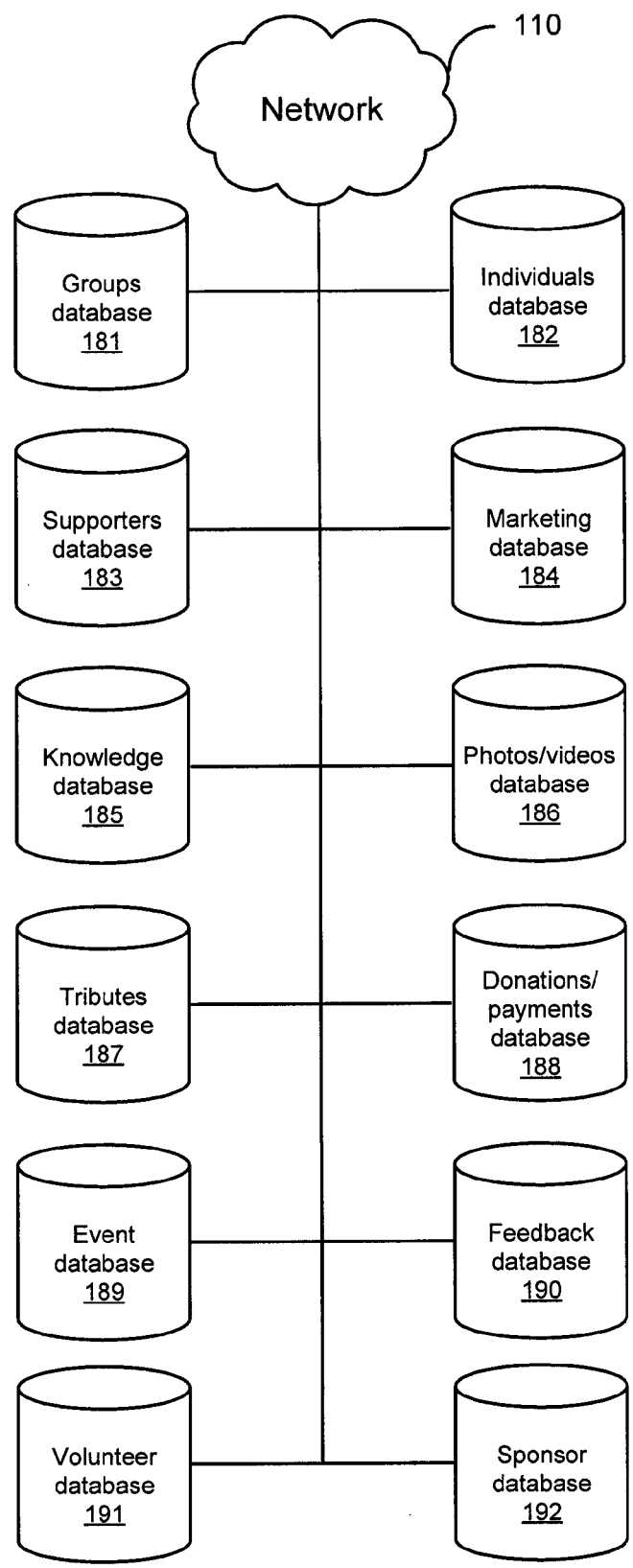
FIG. 1G depicts a block diagram illustrating an example of databases accessed by the host server.

FIG. 1D depicts a block diagram illustrating an example of an earnings database 1540 that stores earnings information, according to one embodiment. The earnings information includes, but is not limited to, a country identifier and an average amount that a worker earns for an hour of work.

Figure 53:
FIG. 53 shows an example report card itemizing a member's donations to various groups.
Figure 63:
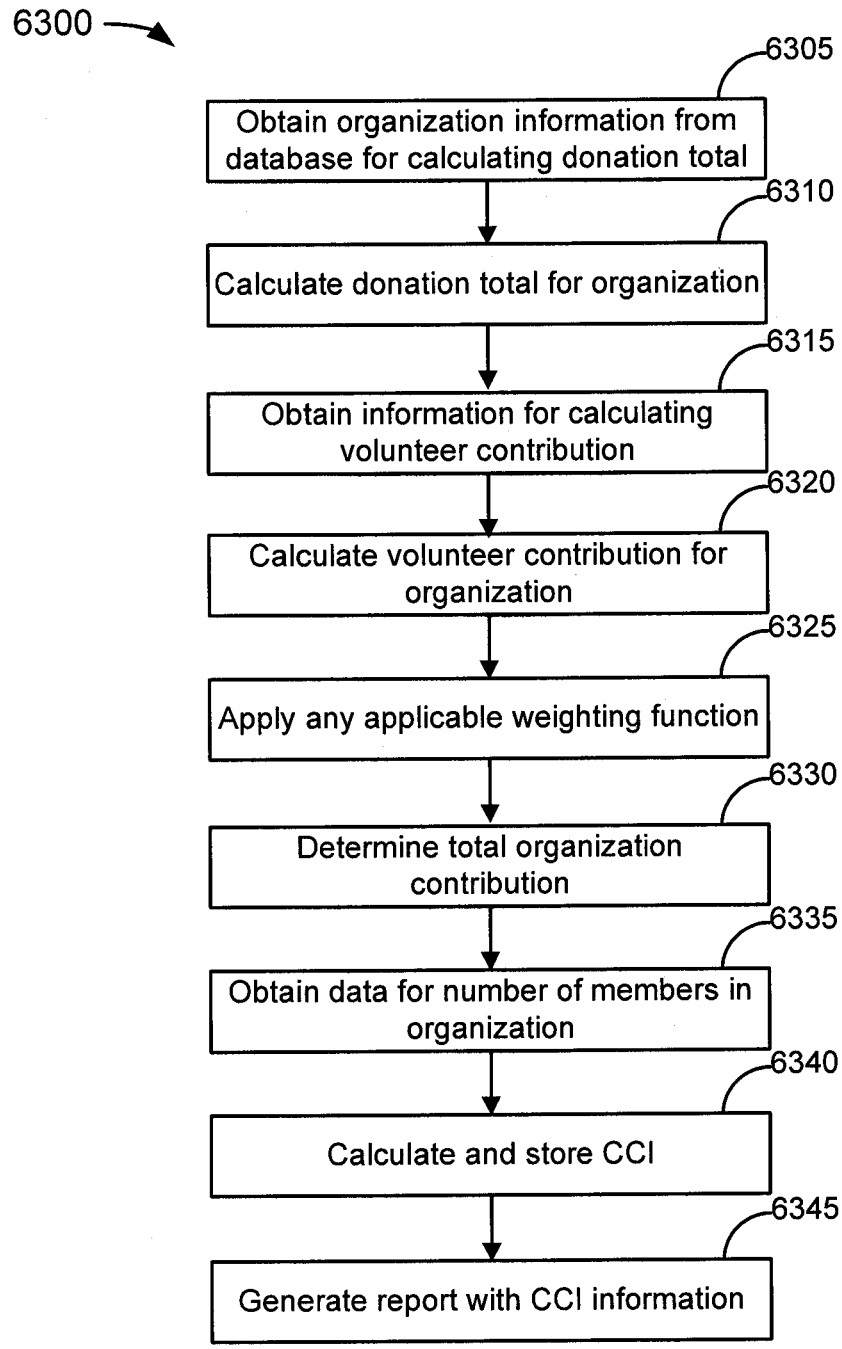
FIG. 63 is a flow diagram illustrating an example process of calculating the CCI for an organization.

FIG. 63 is a flow diagram illustrating an example process of calculating a CCI for an organization and CCI-related reports. At block 6305, the system obtains from the organization database 1520 organization information used to calculate an organization's total monetary donations. The information includes the total amount of donations that the organization has donated to charity and philanthropic efforts and the total amount of donations that members of the organization have donated. Donations can be made to charitable organizations, community events, and other philanthropic causes. In one embodiment, the host server 120 verifies the donations made by the organization and the members of the organization. FIG. 53 shows an example of donations by the online platform provided by the host server 120.

FIG. 64 shows an example spreadsheet that illustrates how the CCI is calculated. The spreadsheet includes information for calculating the CCI. Line 1 shows the names of three example organizations, Alpha, Beta, and Gamma, and the CCI calculation values for each of the organizations are shown in columns 6401, 6402, and 6403, respectively. For example, line 2 shows the total amount of monetary donations contributed by each organization, and line 3 shows the total amount of monetary donations contributed by the members/employees of each organization. The information in lines 2 and 3 are obtained at block 6305.

Then at block 6310, the system calculates the monetary donation total for the organization by adding together the total amount of the organization's donations and the total amount of donations of its members. Thus, for example, lines 2 and 3 in FIG. 64 are added together at block 6310, and the result is shown in line 4 of FIG. 64.

At block 6315, the system obtains information needed to calculate volunteer contributions that can be attributed to an organization, for example, from the organization database 1520. The information includes the total number of volunteer hours provided by members/employees of an organization, with the information broken down by country in which the volunteer lives and volunteers, if applicable. For example, if a corporation has employees in both the United States and Mexico, the organization database 1520 should be able to provide separate values for the total number of volunteer hours performed by employees in the United States and the total number of volunteer hours performed by employees in Mexico. Volunteer hours performed by employees in the United States for the three example organizations in FIG. 64 are shown in line 5. Volunteer hours performed by members/employees of the organizations in other countries are not accounted for in FIG. 64. In one embodiment, the host server 120 tracks and verifies the volunteer hours performed by members of the organization, for example, as shown in FIG. 51 and described in the accompanying text.

At block 6315, the system also obtains data for the average hourly earnings rate for the countries in which the organization has employees who have contributed volunteer hours, for example, from the earnings database 1540 or another source. This information is shown, for example, in line 6 in FIG. 64.

Then at block 6320, the system calculates the estimated value of the volunteer time provided by the members of the organization by multiplying the total number of hours of volunteer time performed by members of the organization by the average hourly earnings rate in the country in which the volunteer effort took place. Then the product for each represented country is summed up to obtain the total estimated value of volunteer time provided by the organization's members. For example, in FIG. 64 the values in line 5 and line 6 are multiplied together in each column to obtain in line 7 the estimated value of volunteer hours attributable to each organization.

At block 6325, any applicable weighting functions are applied to the monetary donations and/or the estimated value of contributed volunteer time. In one embodiment, the weighting function can more heavily weight the estimated value of total volunteer contributions as compared to the monetary donations provided by the organization and its members. For example, the estimated value of volunteer contributions can be weighted 1.5 times as much as the dollar amount of monetary donations. An example weighting of 1.5 times the values in line 7 for the estimated value of volunteer hours is shown in line 8 of FIG. 64.

Then at block 6330, the total number of points earned by each organization is calculated by adding the total monetary donations and the weighted estimated value of volunteer time. For example, lines 4 and 8 in FIG. 64 are added together, and the sum is shown in line 9.

Next, at block 6335, the data for the number of members associated with or employed by each organization is obtained, for example, from the organization database 1520. The total number of members associated with the organizations is shown, for example, in line 10 of FIG. 64.

Then at block 6340, the system calculates the CCI for the organization by dividing the total number of points earned by an organization (calculated at block 6330) by the number of members associated with the organization (obtained at block 6335). For example, the value in line 9 of FIG. 64 is divided by the value in line 10 to obtain the CCI for each organization, as shown in line 11. The calculated CCI is stored in the organization database 1520.

In one embodiment, the CCI can be calculated by any algorithm that uses as input the information obtained at blocks 6305, 6315, and 6335, namely, total monetary donations contributed by an organization, total monetary donations contributed by members of the organization, and total volunteer hours, and total members/employees associated with the organization.

In the example calculations shown in FIG. 64, even though organization Gamma has donated more money than either Alpha or Beta, Gamma's CCI is much lower than both Alpha and Beta. Thus Beta and Gamma had a larger overall contribution to the community. Alpha's CCI is the highest due to the large number of volunteer hours performed by members/employees of the organization. Also, the total number of members/employees associated with Alpha is much smaller than that of Beta and Gamma, thus the average number of volunteer hours/member is higher for Alpha than for either Beta or Gamma.

Optionally, at block 6345, the system can generate a customized report with CCI information as specified by a user. For example, a user could request information on how the CCI for a particular organization compares to other organizations in, for example, the same region, state, country, industry, etc. Further, philanthropic trends can also be tracked over time.

In one embodiment, the host server 120 can track an industry classification code for each company or organization, and this information can be used by the index server 1500 to provide comparisons among companies and organizations. For example, the index server 1500 can compare the average CCI of attorneys in the state of New York to the average CCI of attorneys in the state of California, or compare the CCI of competitors within the same industry, such as FedEx Office and DHL Express, or compare the CCI of companies on a country by country basis.

In one embodiment, the index server 1500 can periodically calculate a CCI for all companies and organizations tracked by the host server 120 and store the calculated CCI values in the organization database 1520. The CCI for the companies and organizations can be grouped by one or more criteria, such as by industry and region. The index server 1500 can also periodically send out CCI updates to requesting users, such as subscribers to a CCI service.

In one embodiment, at each block where the system obtains information from the organization database 1520, the system checks whether the information has been verified. If any of the information has not been verified, the CCI can still be calculated with the available information, however, the use of the calculated CCI is noted, for example with an asterisk, in any reports or requests for CCI that the information used to obtain the value has not been verified. In one embodiment, if any of the information in the organization database 1520 has not been verified, the system will not calculate a CCI for the organization to prevent unverified information from impacting the CCI index.

Because the information used to calculate the CCI can be tracked and verified, and has relevance to all companies, the CCI can be expected to be of interest to investors and the corporate community.

Host Server

FIG. 1E illustrates a block diagram of a general environment in which an online platform that provides tools for organizing groups and facilitating communications among group members can be implemented. Example client devices 110A-N with user interfaces 111A-N, a host server 120, and various databases 130A-N are coupled to a network 105. More than one host server 120 can be coupled to the network 106. Only one host server is shown in FIG. 1E for clarity.

The client devices 110A-N can be any system and/or device, and/or any combination of devices/systems that is able to establish a connection with another device, a server and/or other systems. The client devices 110A-N typically include display or other output functionalities to present data exchanged between the devices and the host server 120 to a user. For example, the client devices 110 A-N can be, but are not limited to, a server desktop, a desktop computer, a computer cluster, a mobile computing device such as a notebook, a laptop computer, a handheld computer, a mobile phone, a smart phone, a PDA, a BlackBerry™ device, a Treo™, and/or an iPhone, etc. In one embodiment, the client devices 110A-N are coupled to a network 105. In some embodiments, the client devices may be directly connected to the host server 120.

The host server 120 can be any combination of software agents and/or hardware modules for running the online platform, either individually or in a distributed manner with other host servers 120. The online platform organizes groups hierarchically using the concept of umbrella groups. The online platform provides a home page that resides at the top of the hierarchy and functions as the overarching umbrella under which all other groups, charities, organizations, companies, and individuals are established. All groups that register with the online platform are associated with one or more umbrella groups that reside below the root umbrella.

Figure 2:
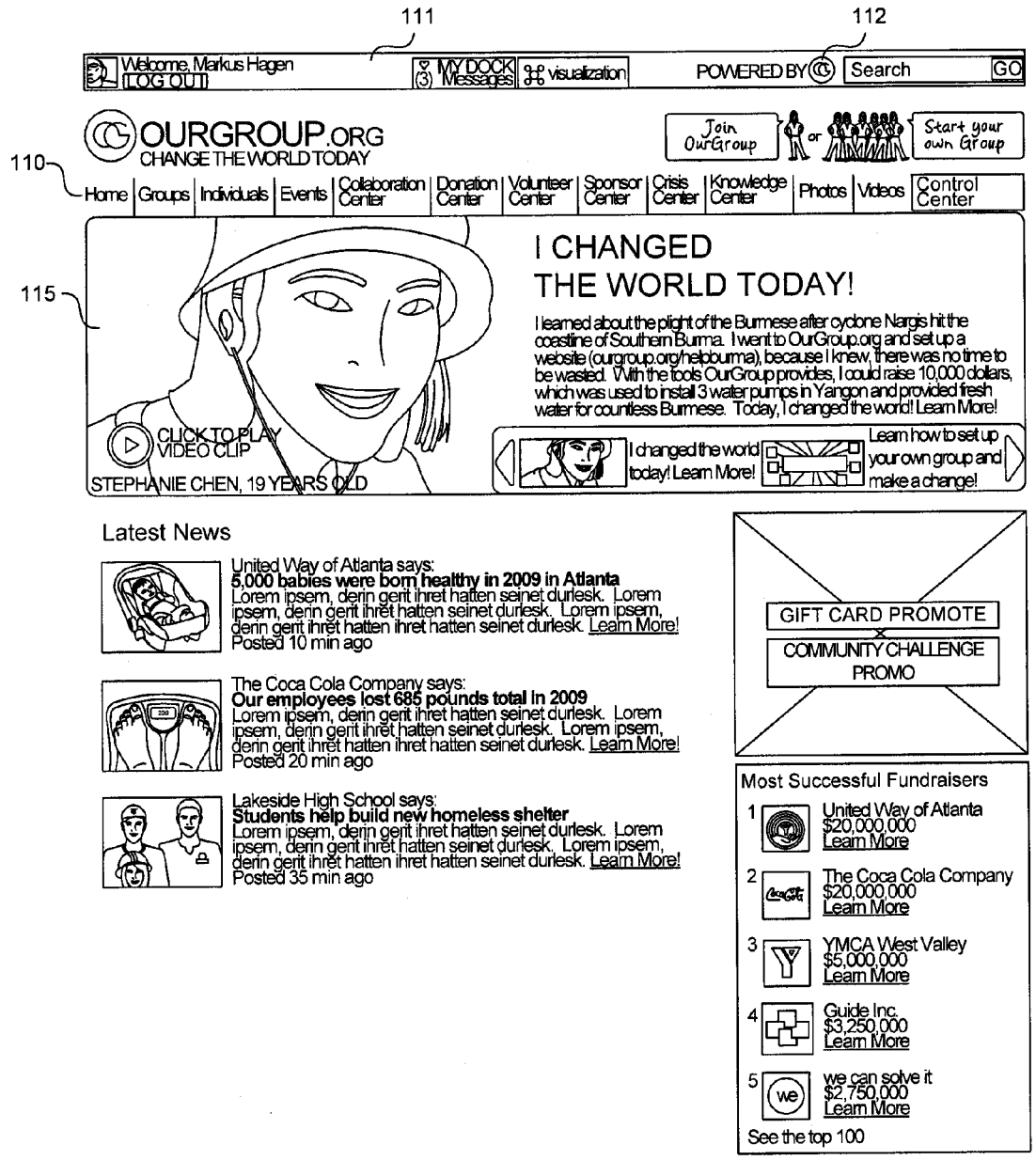
FIG. 2 shows an example platform home page.

FIG. 2 shows an example platform home page where any of the groups associated with the online platform can be accessed. Near the top of the home page, is a bar 110 with links to web pages that provide information associated with registered groups and registered individuals. Below the bar 110 on the home page is an area 115 that can be used to highlight a particular individual or group. In one embodiment, on the left side of the bottom of the home page in the example of FIG. 2, the latest news from groups registered with the online platform is listed in a sortable format, and shown as a dynamic newsfeed, while on the right side, advertisements from an associated group can be shown as well as a listing of the most successful fundraisers. Essentially, the home page provides an index to the latest happenings associated with groups and individuals associated with the online platform.

Figure 3:
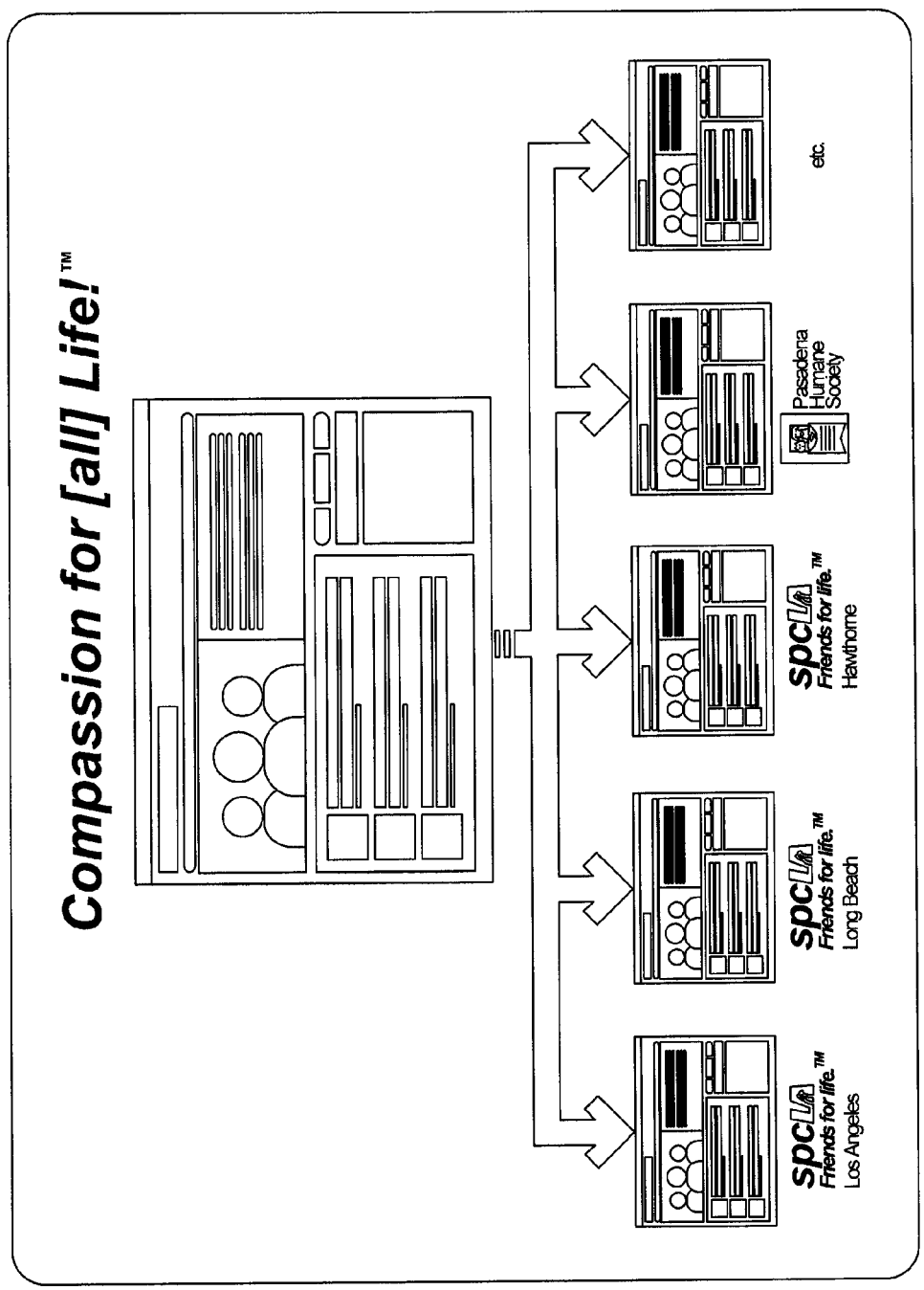
FIG. 3 shows an example of an umbrella organization relative to organizations situated within the umbrella group.

Umbrella groups that are situated at the first level beneath the root umbrella are validated by the system and/or an administrator of the system and can be used to categorize other groups. Some examples of umbrella groups that can be situated at the first level beneath the root umbrella include animal-related organizations such as the Humane Society and organizations for veterans. In some embodiments, the first-level umbrella group can be an existing organization, such as the United Way which is a non-profit organization that works with other charitable organizations to pool efforts in fundraising to serve the community. In some embodiments, an administrative umbrella group can be formed to organize other groups focused on similar goals. The first level umbrella groups are validated by the administrator of the online platform, and subsequent groups that wish to join under a first level umbrella group can be selected and validated by the administrator of the first level umbrella group. FIG. 3 shows an example of an umbrella organization relative to organizations situated under or within the umbrella group. At the top is the first level umbrella group, and five second level groups are shown below. Each of the second level groups can each be an umbrella group for other, third level groups, and so on for subsequent levels of groups.

Figure 4:
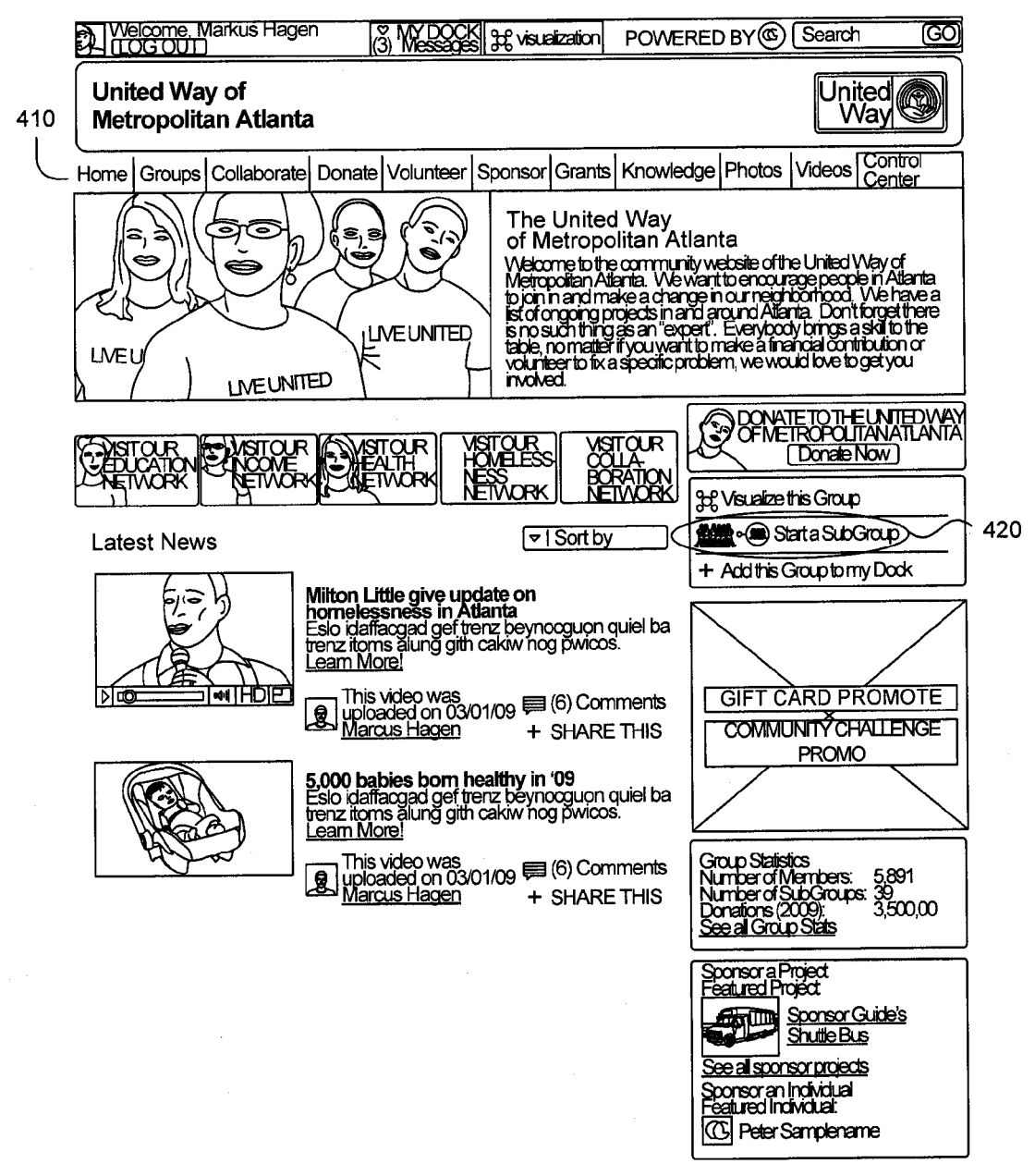

A group that falls under a higher level umbrella group has the advantage of being associated with marketing initiatives and campaigns spearheaded by the higher level umbrella group. Each higher level umbrella group has a group home page or landing page that is similar to the home page for the online platform. FIG. 4 shows an example home page for the United Way of Metropolitan Atlanta. Similar to the online platform's home page, there is a bar 410 near the top of the page that provides access to sub-groups under this umbrella group and sections on the page where the latest news from any of the organizations that are grouped under the United Way of Metropolitan Atlanta as well as information pertaining to those groups, such as group statistics. The use of the online platform's tools and hierarchical organization of groups are particularly useful for highly fragmented charity sectors.

The online platform is suitable for use by any type of group, including charitable organizations, religious groups, and political groups. In one embodiment, to provide a high level of confidence to companies and individuals that the online platform permits only credible charities to register with the platform, the services of a reputable third party vendor, such as Dun & Bradstreet, can be commissioned to certify charities that apply to register with the online platform. Charities can be ranked using different criteria. For example, category 5 can correspond to the highest rating for a most validated charity, and category 4 can correspond to a reputable but unvalidated charity that is reviewed by Charity Navigator, recognized by the government as a 501(c)(3) nonprofit organization, has a reasonable operational expense ratio, and received good volunteer reviews. In one embodiment, umbrella organizations can pay to obtain a review and certification by Dun & Bradstreet, and umbrella groups who do not obtain certification will receive a lower rating. By becoming validated as a 501(c)(3) nonprofit organization, individuals who donate money to the organization will know that their donations are tax-deductible.

Alternatively or additionally, GuideStar can be commissioned by umbrella organizations to monitor its sub-groups on a regular basis to ensure that the umbrella group is credible.

Further, the online platform's administrators, such as a Board of Directors, can engage reputable third parties to conduct annual audits on its own security, finance, and member information confidentiality. The audits can be published to assure clients and donors that the online platform is trustworthy.

The online platform also offers an integrated set of tools for organizing groups, such as targeting a philanthropic goal or running a fundraising campaign with a simple way to attract supporters to help raise money for charity. Functions and techniques performed by the host server 120 are described in detail with further reference to the example of FIG. 1F.

The network 105, to which the client devices 110A-N and host server 120 are coupled, may be a telephonic network, an open network, such as the Internet, or a private network, such as an intranet and/or the extranet. For example, the Internet can provide file transfer, remote log in, email, news, RSS, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc.

The network 105 may be any collection of distinct networks operating wholly or partially in conjunction to provide connectivity to the client devices, index server, and may appear as one or more networks to the serviced systems and devices. In one embodiment, communications to and from the client devices 110A-N may be achieved by, an open network, such as the Internet, or a private network, such as an intranet and/or the extranet. In one embodiment, communications may be achieved by a secure communications protocol, such as secure sockets layer (SSL), or transport layer security (TLS). In addition, communications can be achieved via one or more wireless networks.

The client devices 110A-N can be coupled to the network (e.g., Internet) via a dial-up connection, a digital subscriber loop (DSL, ADSL), cable modem, and/or other types of connection. Thus, the client devices 110A-N can communicate with remote servers (e.g., web server, host server, mail server, instant messaging server) that provide access to user interfaces of the World Wide Web via a web browser, for example.

The databases 130A-N store information utilized by components of the host server 120 for operating the online platform. The databases 130A-N can be managed by a database management system (DBMS), for example but not limited to, Oracle, DB2, Microsoft Access, Microsoft SQL Server, PostgreSQL, MySQL, FileMaker, etc.

The databases 130A-N can be implemented via object-oriented technology and/or via text files, and can be managed by a distributed database management system, an object-oriented database management system (OODBMS) (e.g., ConceptBase, FastDB Main Memory Database Management System, JDOInstruments, ObjectDB, etc.), an object-relational database management system (ORDBMS) (e.g., Informix, OpenLink Virtuoso, VMDS, etc.), a file system, and/or any other convenient or known database management package. The databases are described in detail with reference to the example of FIG. 1G.

FIG. 1F depicts a block diagram illustrating an example of components of the host server 120. The host server 120 can include, for example, a network interface 151, a registration module 152, a profile module 153, an events module 154, a collaboration module 155, a donation/payment module 156, a content review module 157, an invitation module 158, a volunteer module 159, a sponsor module 160, a knowledge module 161, a control center module 162, a feedback module 163, a supporter module 164, a marketing module 165, a photo/video module 166, and/or a dock module 167. Additional or fewer components or modules can be included in the host server 120 and each illustrated component.

FIG. 1G depicts a block diagram illustrating an example of databases accessed by the host server.

The databases can include, for example, a groups database 181, an individuals database 182, a supporters database 183, a marketing database 184, a knowledge database 185, a photos/videos database 186, a tributes database 187, a donations/payments database 187, an event database 189, a feedback database 190, a volunteer database 191, and/or a sponsor database 192. Although these databases are identified as separate databases, in some embodiments, all or some of each of these database can be combined with other databases and/or separated out into separate databases.

The network interface 151 can be a networking module that enables the host server 120 to mediate data in a network with an entity that is external to screen host server 120, through any known and/or convenient communications protocol supported by the host and the external entity. The network interface 151 can include one or more of a network adaptor card, a wireless network interface card (e.g., SMS interface, WiFi interface, interfaces for various generations of mobile communication standards including but not limited to 1G, 2G, 3G, 3.5G, 4G, LTE, etc.), Bluetooth, a router, an access point, a wireless router, a switch, a multilayer switch, a protocol converter, a gateway, a bridge, bridge router, a hub, a digital media receiver, and/or a repeater.

One embodiment of the host server 120 includes the registration module 152 which can request and receive registration information to register groups and individuals with the online platform.

Registering a Group Under an Existing Umbrella Group

Figure 5:
FIG. 5 shows example sub-group registration form.

In one embodiment, an umbrella group's administrator can require that a group seeking to be categorized under the umbrella group register and be validated by the umbrella group's administrator prior to being permitted to be associated with the umbrella group. The example of FIG. 4 shows a button 420 on the home page of the United Way of Metropolitan Atlanta umbrella group that is linked to a sub-group registration form. An example sub-group registration form is shown in FIG. 5. In this example, a user desiring to start a sub-group under the United Way of Metropolitan Atlanta umbrella group enters a desired group name and contact information. The registration module 152 sends the information to the administrator of the United Way of Metropolitan Atlanta umbrella group who follows up with the user to determine whether the user's sub-group should be validated. Criteria that can be used by the administrator for validation can include goals of the sub-group and whether the sub-group's goals are compatible with the umbrella group's goals.

Figure 6:
FIG. 6 shows a screenshot where example basic sub-group information is entered.
Figure 8:
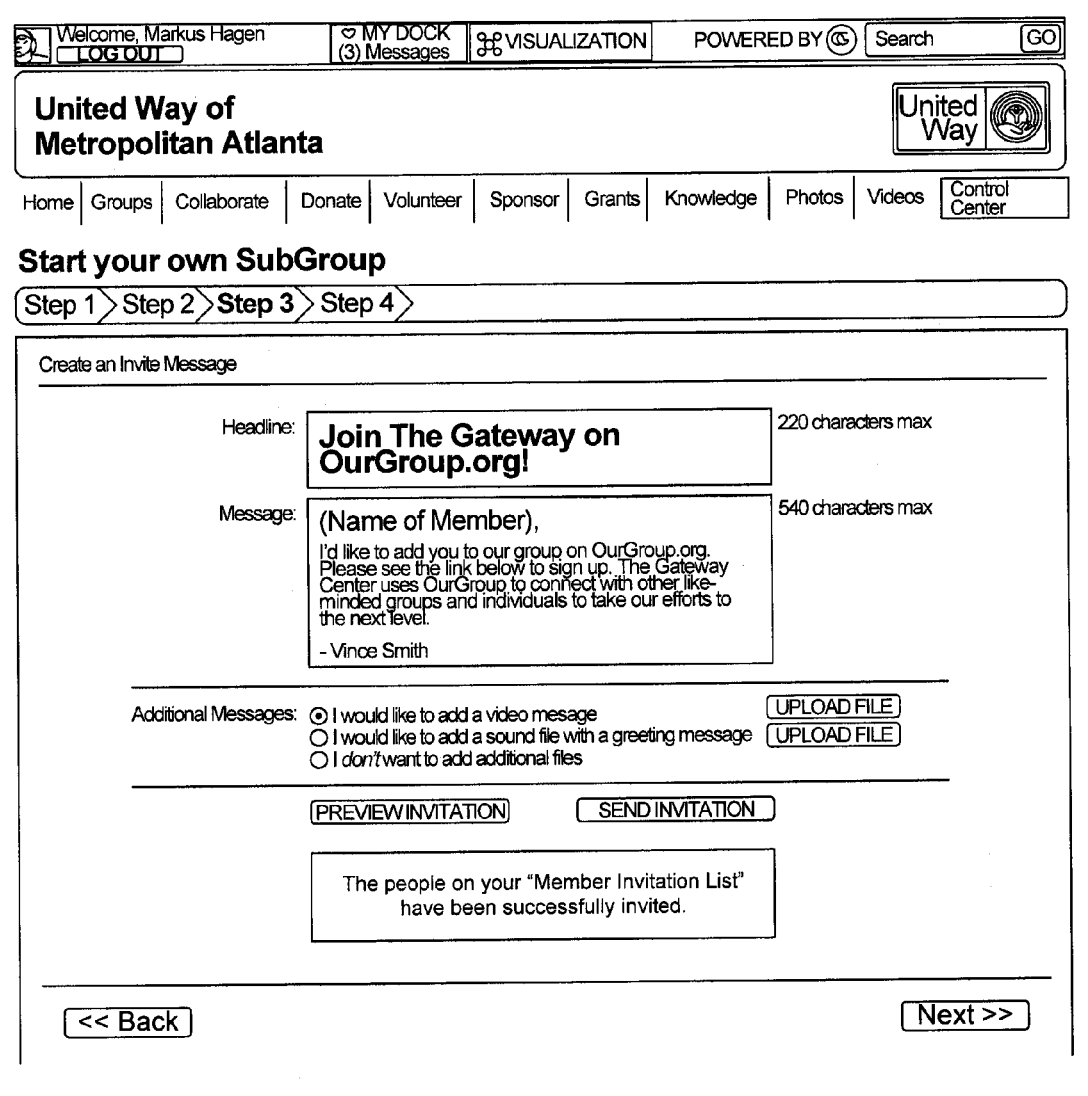

Once approval has been granted by the administrator of the umbrella group, the head or administrator of the sub-group can be provided a link by the system that requests information about the sub-group. The example of FIG. 6 shows a screenshot where basic sub-group information is entered, such as the group name, a web address name, an administrator or head of the sub-group, and a password. The example of FIG. 7 shows a screenshot where the head of the sub-group can import names of individuals to invite for joining the sub-group. Names can be imported from an email address book. The example of FIG. 8 shows a screenshot of a page where the head of the sub-group can create the invitation message to be sent to the previously selected individuals. The invitation can include a customized headline, written text message, video message or sound file with a greeting message. In one embodiment, information pertaining to all registered groups is stored in the groups database 181.

Group Landing Page

Figure 22:
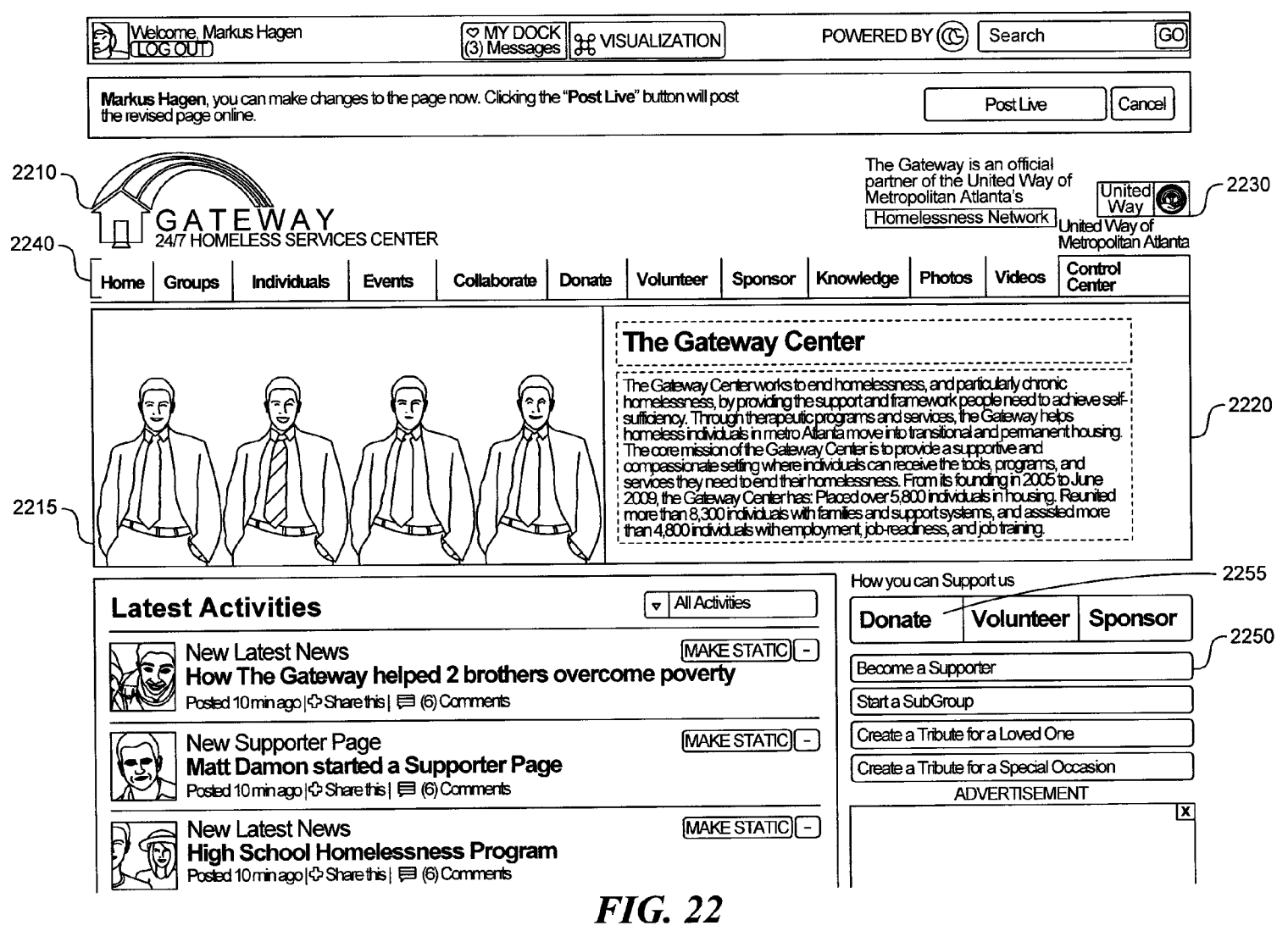

Once a group has been registered, the administrator of the newly registered group can immediately set up and customize a landing page for the group, using the standardized platform provided by the online platform. As shown in the example of FIG. 22, the administrator can enter a logo 2210, pictures 2215, and a group description 2220 for display on the landing page for the group. Other non-limiting examples of ways that the landing page can be customized include selecting a color scheme that includes a color for the text and a background color. No technical knowledge is needed for the administrator to establish the customized landing page.

In the example of FIG. 22, the sub-group name is The Gateway, and this group has been formed under the umbrella of United Way. The United Way logo 2230 is automatically placed by the online platform on the home page of the sub-group when the sub-group is authorized. The umbrella logo indicates to users viewing The Gateway's webpage that the group is associated with the umbrella group United Way. In most instances, the umbrella group will be better known than the sub-group. Thus, the umbrella group's logo may serve to lend an aura of authenticity and reliability to the sub-group.

A standard set of tools are available on each group's landing page. The toolbar 2240 on the home page provides access to a set of tools. If the user clicks the 'Home' button on the left of the toolbar 2240 from anywhere within the group's webpages, it will bring the user back to the landing page of the group.

Clicking on the 'Group' button on the toolbar 2240 takes the user to a groups center web page that shows the sub-groups authorized under The Gateway. Thus, if The Gateway is an umbrella group for sub-groups, those sub-groups will be shown in the groups center, and the activity within those sub-groups roll up to The Gateway. The example of FIG. 23 shows groups center web page that includes a listing of the sub-groups under The Gateway, categorized under headings such as campaigns, companies, schools, or uncategorized. Each sub-group under The Gateway can have its own sub-groups. For example, the sub-Group High School Homelessness Program has several sub-groups, Lakeside High School, High School Name2, High School name3, and High School Name4. Next to each sub-group and each of the sub-groups under those sub-groups, is a listing of information associated with the group, such as total donations, number of volunteer hours, sponsorship, members, supporters, ratings, and links that are associated with that particular group. Each of the sub-groups also has access to the same tools as the umbrella group.

Clicking on the 'Individuals' button on the toolbar 2240 takes the user to an individuals center web page for a group that lists all members involved with the group or sub-groups under that group, where the listed members have elected to be listed. The example of FIG. 23 shows a listing of the individuals who are members of The Gateway and categorized by all individuals, campaigns, and supporters. The center also lists information associated with the member, such as donations, volunteer hours, projects and individuals sponsored by the member, number of supporters, number of friends, ratings, links to the member's supporter page, tribute page, and/or profile page. The web page can also provide a way to search for individuals associated with the group.

The toolbar 2240 lists other clickable buttons including events, collaborate, donate, volunteer, sponsor, knowledge, photos, and videos. Also, a group's landing page includes a clickable button 'Become a supporter' 2250 in FIG. 22. By clicking on this button, anyone can become a supporter and create a supporter page on the online platform using a supporter page template. The functionality of each of these buttons will be described below.

Registering a Group by an Individual

Figure 15:
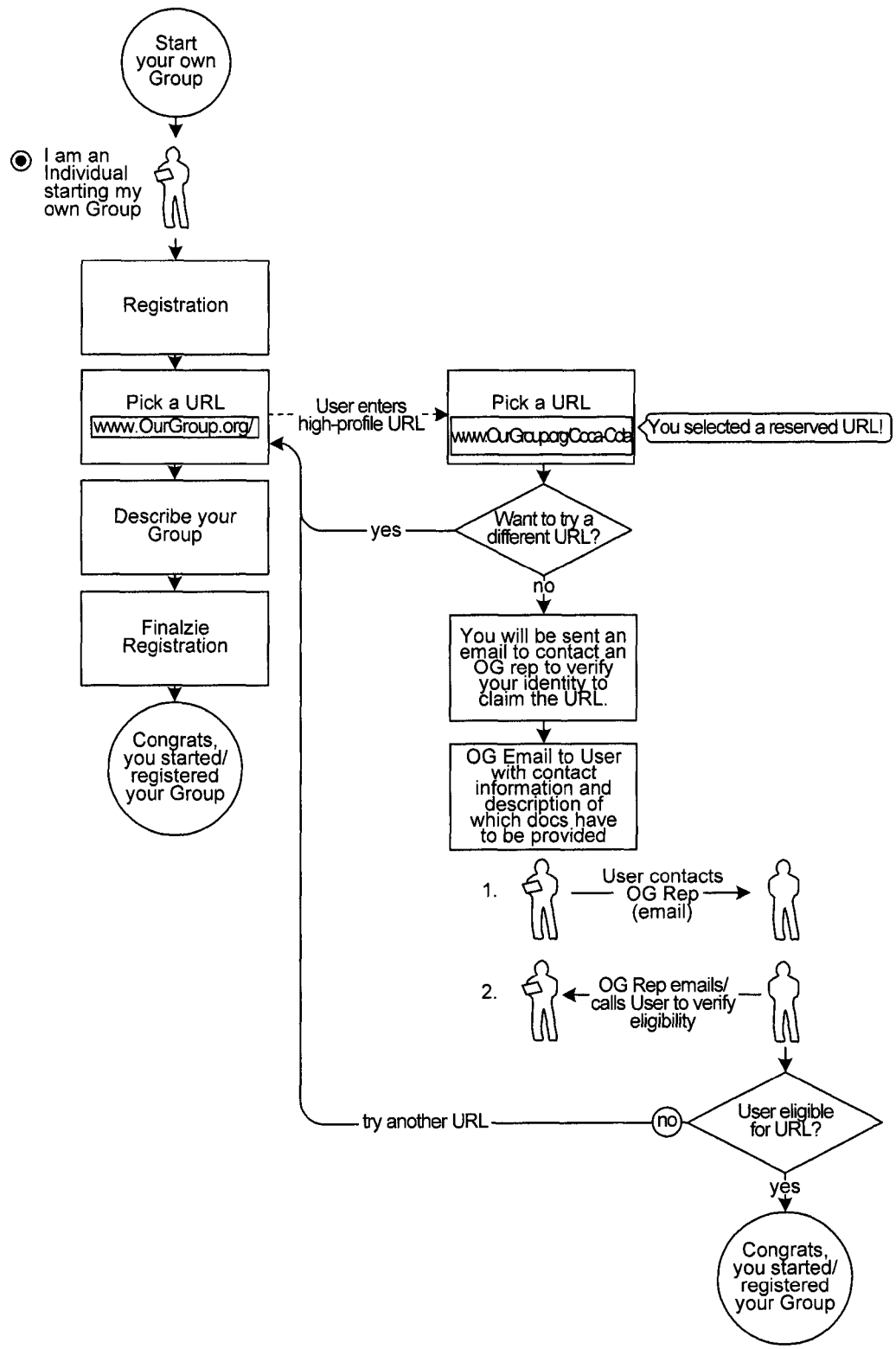
FIG. 15 is a flow diagram illustrating an example process for registering a group by an individual.

FIG. 15 is a flow diagram illustrating an example process for registering a group by an individual. The individual registering the group must be logged in to the online platform, using the person's registered username and password, to interact with the registration module 152 to start a group. However, the person does not need to be a validated member. A registered group can be associated with an umbrella group, or it can choose to not be associated with any umbrella group. Groups that choose to be associated with an umbrella group must be approved by the umbrella group, as discussed above.

Figure 16:
FIG. 16 shows an example screenshot for a first step in registering a group by an individual.

The first step in registering a group, as shown in FIG. 16, is for the registrant to indicate the kind of group that is being registered, for example, a charity/non-profit, a company, an individual starting his own group, or other.

Figure 17:
FIG. 17 shows an example screenshot for a second step in registering a group by an individual.

Next, basic information for the group is requested, as shown in FIG. 17, for example. The name of the group and a URL are selected by the individual. In one embodiment, the URL indicates the overarching umbrella organization of the online platform. If the individual registering the group selects a high-profile URL, such as the name of a large corporation, for example Coca-Cola, the registration module 152 will indicate that the URL is reserved for the organization that is associated with that name. Further, the registrant will also be informed that he will need to contact an administrator of the online platform to claim the particular URL that is requested to finalize registration of the group. Otherwise, the registrant can select another URL.

The registration module 152 also requests during registration whether the group will be a public group or a private group. With a public group, everyone can access the group to see information about the group and what the group did, and everyone can join the group. With a private group, no one can see or search for the group, members can only join by invitation, and the group does not appear in members' profiles. During registration, a group administrator and a group head are selected. The group administrator can log into the group's account, and the group head manages the group. Additional administrators can be added later, and the group head can also be changed later.

Finally, the group's mission is selected from a list of choices, such as animal related; arts, culture and humanities; civil rights, social action and advocacy; community improvement and capacity building; crime and legal-related; employment; diseases, disorders and medical disciplines; education; environment; food, agriculture and nutrition; foreign affairs and national security; health care; housing and shelter; human services; medical research; mental health and crisis intervention; mutual and membership benefit; philanthropy, volunteerism and grantmaking foundations; public and societal benefit; public safety, disaster preparedness and relief; recreation and sports; science and technology; social science; youth development; or other.

After providing the above information to the registration module 152, the registration module 152 stores the group information in the groups database 181, and the group is registered. At this point, the group registrant can use the online platform and perform activities such as edit the group site, invite group members, adjust account settings.

The Home Page for the Online Platform

When a user of the online platform clicks on the platform logo 112, shown for example in FIG. 2, the user will be taken to the online platform's home page which is the overarching umbrella under which all other groups that register with the online platform fall. The information from the other groups flow up to the home page, for example, members' group membership information, posted content, donations made, volunteer hours provided, etc. FIG. 2 shows an example online platform home page.

Clicking on the 'groups' button on the online platform home page takes the user to a groups center web page that provides information about umbrella groups and sub-groups registered with the online platform, for example the top groups, e.g., the group that received the most total donations or the group that has the largest number of volunteers, the fastest growing groups in members and/or donations, the largest groups, the groups with the most members, the groups that have been searched the most, etc. Similarly, clicking on the 'individuals' button on the home page takes the user to an individuals center page that provides information about individuals registered with the online platform, for example, members with the most contacts, members who have contributed the most donations and/or volunteer hours, etc. Groups on the groups center web page and individuals on the individuals center web page can both be searched.

Clicking on the 'events' button on the home page takes the user to an events center web page that provides information about events listed with the online platform by umbrella groups and sub-groups. Individuals can search for any event by country, city, topic, date, etc. The online platform also coordinates groups to enhance their prominence during special events or days, for example, global earth day and AIDS day. Further, the events center page lists information about events, such as the top events, fastest growing events, largest events, the events with the most participation, and top searched events.

Figure 61:
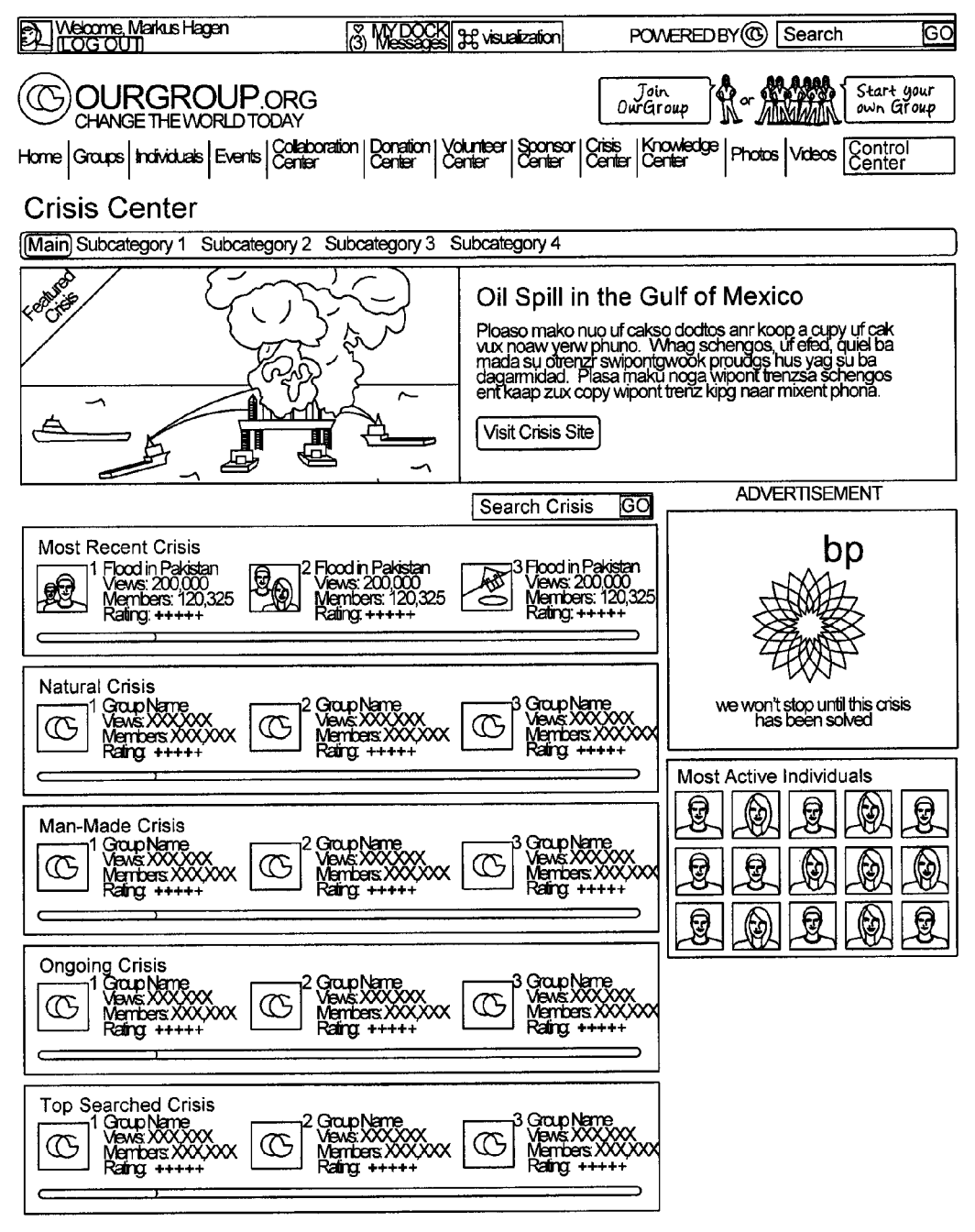

The online platform home page is the only entity within the online platform that has a clickable 'crisis center' button, located, for example, towards the middle of the toolbar 110 of FIG. 2. When a crisis occurs anywhere in the world, the registration module 152 makes the most credible groups highly visible on the online platform crisis center page, as shown, for example, in FIG. 61. Further, the registration module 152 will notify various news agencies that individuals can visit the online platform's crisis center page to help out the people impacted by the crisis. The crisis center page also lists information about crises, such as the most recent crisis, natural crisis, man-made crisis, ongoing crisis, and top searched crisis.

The registration module 152 can also register individuals for the online platform. Different categories of registration are available including: child under 14 years of age, child between 14 and 18 years of age, and adult.

Registering an Adult as a Member

Figure 12:
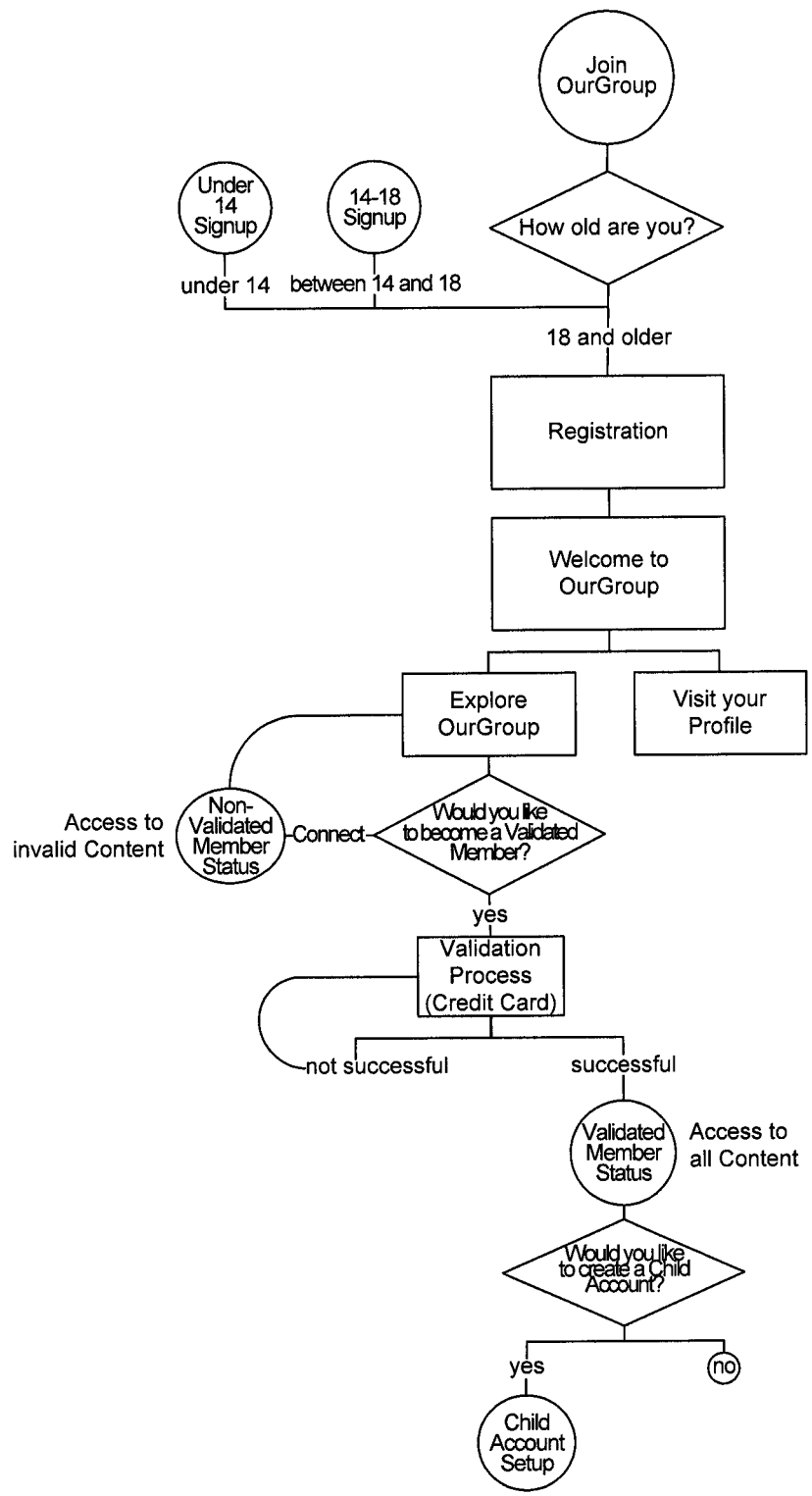
FIG. 12 is a flow diagram illustrating an example process for registering an adult as a member of the online platform.
Figure 13:
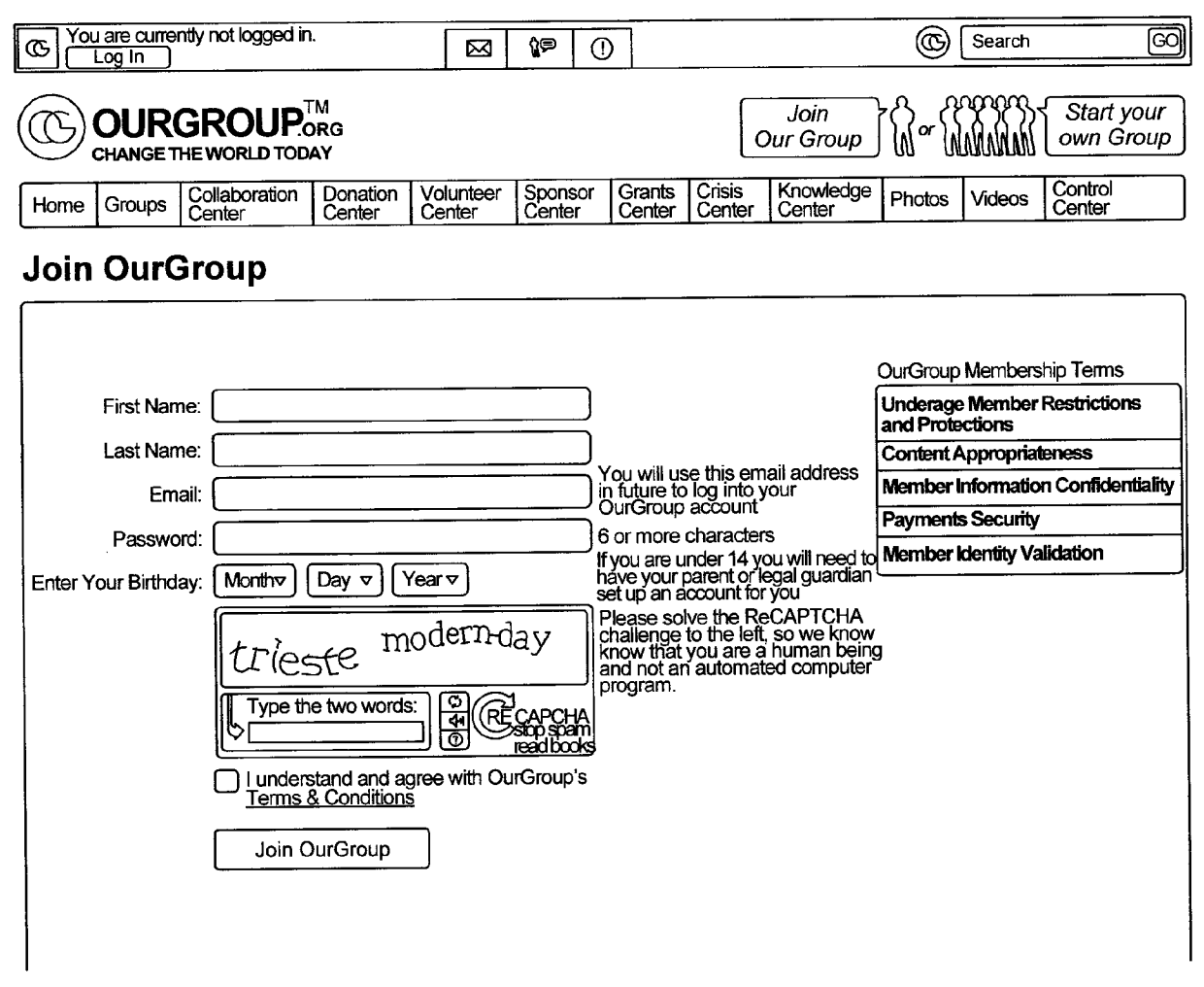

FIG. 12 is a flow diagram illustrating an example process for registering an adult as a member of the online platform. The registration module 152 presents the registering person with the online registration form, an example of which is shown in FIG. 13. For example, the registration module 152 can request that the person provide his first name, last name, an email address to be used as a username for logging in to the person's account on the online platform, a password, and his birth day. The birth day information is used for age verification purposes. If the person is under 18, there are different registration requirements to ensure that minors accessing the online platform are protected. Children under the age of 14 need parental consent to start an account. Individuals between the ages of 14 and 18 can set up an account, but they are asked to review terms of use with their parents or legal guardian.

Once the registrant submits the information requested, he will be prompted to check his email. The registration module 152 sends an email to the person at the email address provided to ensure that the email is real and working. The email prompts the person to finalize his registration. In one embodiment, the email includes a final registration button that the person can click on to complete registration. Upon finalizing registration, the person becomes a member of the online platform, and the member can enter information into his profile, as described below.

When the member logs in to the online platform, the member can go through a validation process to become a validated member. The online platform is designed to create a safe environment, where users can trust that people are who they say claim to be. In one embodiment, a member can become a validated member by providing a first and last name, a valid credit card number, and billing address information to the registration module 152. The registration module then charges the credit card a nominal amount and reimburses the charged amount to the user immediately. By charging the credit card, the registration module 152 is able to cross reference the registration information provided by the member to validate the member. Validation lasts as long as the credit card is valid. Alternatively, a member can be validated by providing a first and last name, the last four digits of his social security member, and answering one or more security questions, such as the name of the street that the member grew up on.

Once a member is validated, the member can upload content to the online platform (along with an age appropriateness rating of the content), the member has access to all content posted on the online platform rated up to (R) rating, and there will not be any limitations on joining or following any groups. Non-validated members only have access to (PG)-rated content and may be limited in joining and/or following groups and connecting with people. The validation process keeps minors safe within the online platform, and the system only provides age-appropriate content to them.

Further, validation of a member allows that member to collect money through the online platform.

Registering a Child Under 14 Years Old

Figure 9:
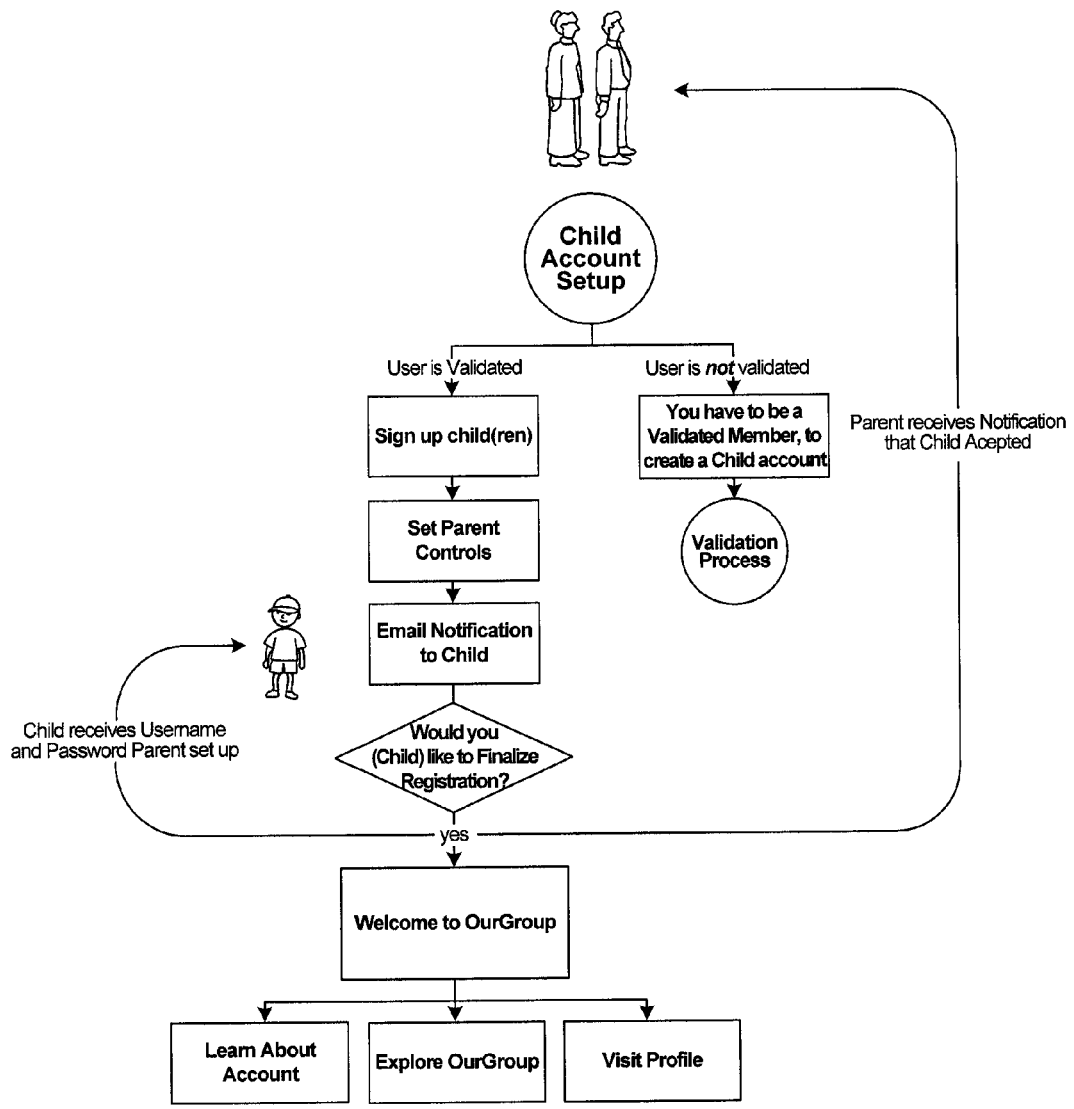
FIG. 9 is a flow diagram illustrating an example process for registering a child under 14 years old.

FIG. 9 is a flow diagram illustrating an example process for registering a child under 14 years old and creating a child account on the online platform. To help ensure the child's safety, the child must be registered by an adult who is a validated member of the online platform and is either the child's parent or legal guardian. The adult controls the content the child has access to, which groups the child can join, and who the child can interact with on the online platform. In one embodiment, the adult can immediately initiate registration of the child if the adult is a validated member of the online platform.

In one embodiment, if the child tries to register himself, he will not be permitted to if he is under 14 years of age, but he can be given the option to have an email sent to his parent or legal guardian requesting that they register him. If the child chooses to do so, he enters the name of his parent or legal guardian. The registration module 152 can search the database of registered users to determine if the name is an existing member of the online platform and also whether the member is a validated member. If the named adult is not a member, the child is requested to enter an email address for the adult, and the adult is sent an email on behalf of the child requesting that a child account be set up for him; the adult is also provided information on how to become a validated member of the online platform as only validated members can register a child. If the adult is a member, the registration module 152 can enter the email address on file and send the email request on behalf of the child.

If the adult is not a validated member, when the adult tries to register the child, the adult will be prompted to become validated, as described above. If the adult is a validated member, the adult is requested by the registration module 152 to provide the child's name, the child's email address which will be used as the child's username in the online platform, and a password. The adult must also indicate his relationship (parent or legal guardian) to the child being registered.

During the registration process, the adult also selects parental control settings. FIG. 10 shows example parental controls that the registration module 152 requests. For group membership settings, the adult can permit the child to join only groups with the adult's approval or join any group without the adult's approval. For communications settings, the child can be permitted to communicate only with validate members within groups approved by the adult, communicate with anyone within groups approved by the adult, communicate with only validated members in any group, or communicate with anyone in any group. For content viewing settings, the child can be permitted to view content rated G (general audiences), PG (parental guidance suggested), 18 or R (content that may not be appropriate for audiences younger than 18), or MA (unsuitable for audiences under 18).

Once parental controls have been established, an email notification is sent to the child by the registration module 152 on behalf of the parent that an account has been created for the child. The email notification includes the username and password set up by the adult, and the child completes the final registration of the account. In one embodiment, the email includes a final registration button that the child can click on to complete registration. Upon completion of registration by the child, the parent is informed by email, and the child becomes a member of the online platform. A child can also be validated using a similar process used to validate an adult member.

In one embodiment, the above description can apply to children under any designated age, not just 14 years old.

Registering a Child Between 14 and 18 Years Old

Figure 14:
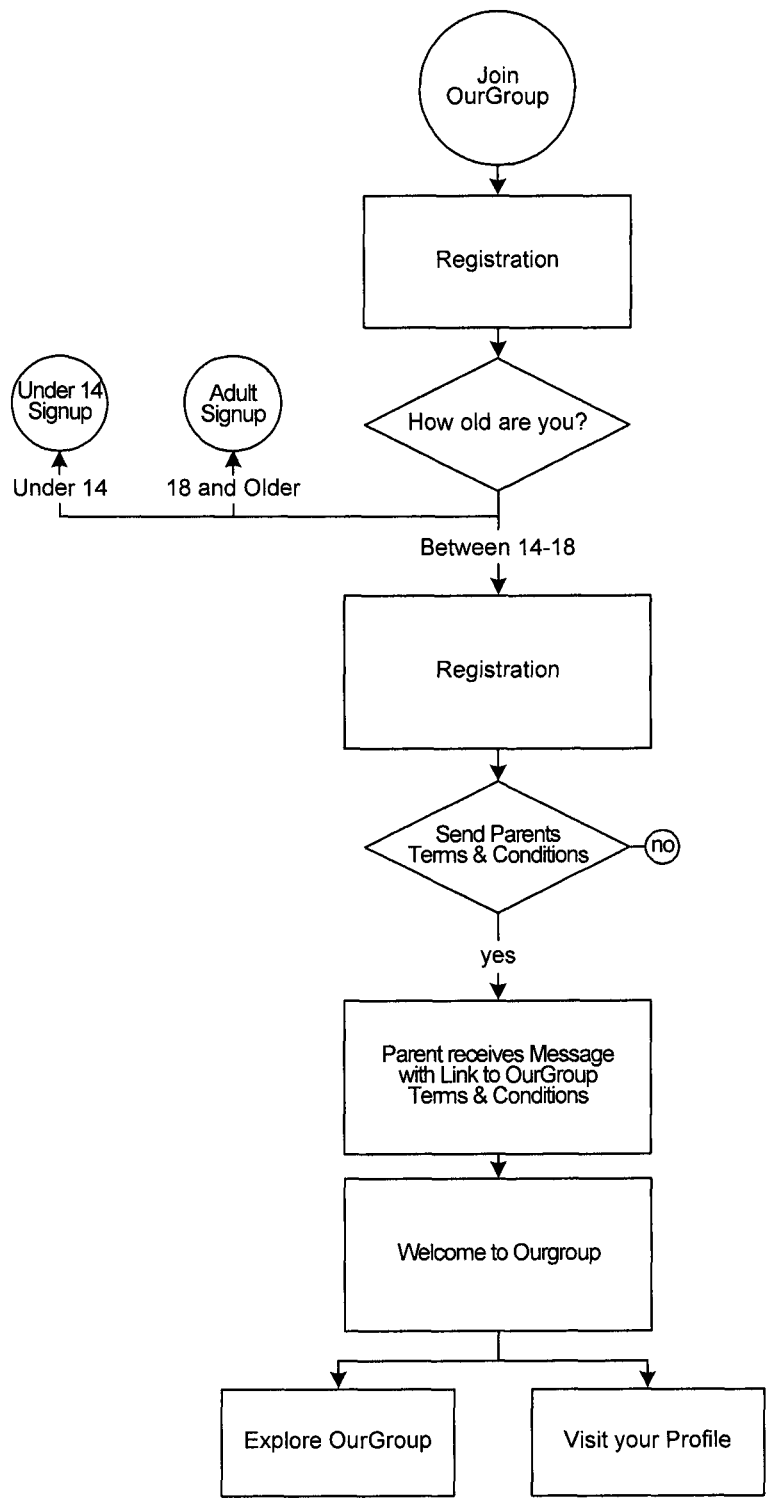
FIG. 14 is a flow diagram illustrating an example process for registering a child under between 14 and 18 years old.

FIG. 14 is a flow diagram illustrating an example process for registering a child under between 14 and 18 years old and creating a child account on the online platform. In one embodiment, when the child tries to register himself, the child will be asked his birthday, as shown in the example registration form in FIG. 13. If the child is between 14 and 18 years old, he is prompted to send the terms and conditions associated with becoming a member of the online platform by email to his parent or legal guardian and advised to review the terms and conditions together. The registration module 152 requests the first and last name of the adult and an email address if the adult is not a member of the online platform. The registration module 152 then sends the email to the adult with a message that recommends that the adult review the online platform's terms and conditions with the child. As another option, the child can choose to ignore the recommendation. In either case, the registration module 152 sends an email to the child at the email address provided during registration to ensure that the email is real. The email prompts the child to finalize his registration. In one embodiment, the email includes a final registration button that the child can click on to complete registration. Upon finalizing registration, the child becomes a member of the online platform, and the member can enter information into his profile, as described below.

In one embodiment, the above description can apply to children in any designated age range, not just between 14 and 18 years old.

Child Protection Controls

In addition to the above requirements for registering a child under the age of 18, the online platform uses a number of child protection controls and safeguards. For example, children under the age of 18 need parental consent to create a profile and chat on the online platform; administrators of the online platform will automatically scan sites for inappropriate content, such as inappropriate language or inappropriate pictures; users can report abuse on sites throughout the platform, and inappropriate content can be deleted by site administrators; groups can determine the level of openness of the group and who is permitted to chat with whom, e.g., depending upon whether a member is validated, or the age of the member; the online platform can ensure groups are familiar with useful and free monitoring software, such as Windows Live Family Safety Setting or Zephyr; the online platform can enforce strict adherence to the Children's Online Privacy Protection Act (COPPA) by informing parents and legal guardians about how personal information is collected, used, and disclosed; and professional monitoring services can be made available to monitor websites, emails, and messaging for inappropriate material, and remove user profiles of known offenders.

User Profiles

Figure 18:
FIG. 18 shows an example screenshot of account information maintained by the online platform that can be entered and/or edited by the member.

One embodiment of the host server 120 includes the profile module 153 which queries and accepts information about an individual who is registered with the online platform. FIG. 18 shows an example screenshot of account information maintained by the online platform that can be entered and/or edited by the member. For example, the profile module 153 can maintain, but is not limited to, the following information in an individuals database 182: name; URL; address; email address; password; phone number and country for receiving short message service texts (SMS); a selected security question; and whether the member wants to deactivate his account.

Figure 35:
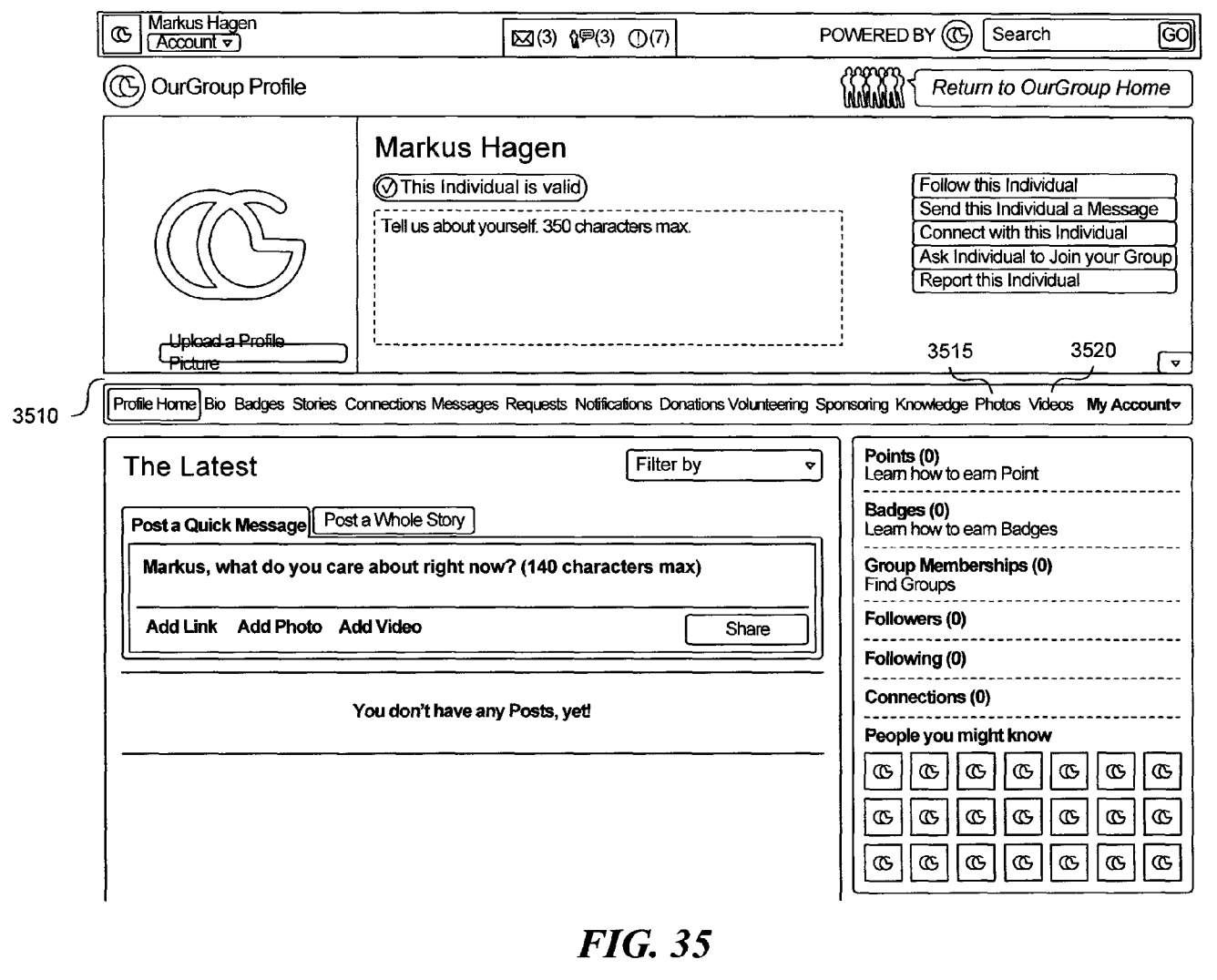

The first time a member visits his URL within the online platform, the landing page will look like the example of FIG. 35. Actions that the member can take include uploading a profile photo, adding a statement about himself, finding groups, and posting a message. The message can include a link, a photo, and video.

The example of FIG. 42 shows part of a profile page where the member is in the process of posting a message 4210 to his activity feed. By clicking on the eye icon button 4220, the member is prompted by the profile module 153 to select where the message should be posted for sharing. For example, the prompt can include selections such as the member's own profile and his followers' profiles; the member's connections' profiles; the landing page for groups that the member has joined; the umbrella groups for the groups that the member has joined; and third party sites such as social networking sites Facebook, LinkedIn, Twitter, and others. Before the message is posted, the member also needs to enter a rating 4230 for his message, as for all content posted to the online platform. The member's message is subsequently reviewed for an appropriate content rating by an administrator of the online platform or of the group page where the member wishes to post his message via the content review module 157.

The member can upload a profile photo by clicking on the 'upload a profile picture' button and selecting a picture file to upload. In one embodiment, the member has the option to crop the uploaded photo. The member is also asked to rate his profile picture as, for example, G, PG, 18, or MA (mature audiences). Finally, the member must certify that he has the rights to use the photo before the profile picture will be saved to the individuals database 182.

The member can also upload photos and videos by clicking on the 'photos' button and 'videos' button, respectively. The process is described more below.

Account information associated with the member and stored in the individuals database 182 can include privacy settings that can be edited. Information maintained by the profile module 153 in the individuals database can include: people permitted to see the member's posts (including status updates, stories, photos, and videos), although privacy settings of a group to which a story is posted may override the member's privacy settings; people permitted to see the member's connections list, where the connections list allows the member to connect with people based on common friends; people permitted to see the member's bio, where the bio can help connect the member with classmates and colleagues as well as discover new professional opportunities; people permitted to see the member's current city, where the city can help the member get in touch with friends and old neighbors as well as find volunteer opportunities in the area; people who can see content that the members 'likes', where 'likes' express the member's interest and experiences as well as connect with people who like the same things; people who can see the member's volunteer hours; people who can see the member's donations; people who can see the member's group memberships; people who can see the member's badges; people who can search for the member on the online platform; people who can send the member connection requests; people who can send the member messages, where the messages can help identify a person before adding the person as a connection; people who can send the member invites to join their group; and people who can comment on the member's profile. Some options for the privacy settings include permitting everyone, just the member's connections, or nobody (just the member) to perform an action.

The stored account information provides information on any active child accounts, the ability to modify settings for an active child account, and the ability to create a new child account.

Further, the account information can include the member's active memberships with the option to click a button to cancel each membership. The information can also include canceled memberships with the option to click a button to re-join each group.

Payment information, such as credit card information or bank account with bank routing number, can also be maintained and edited in the account information for a member. By having payment information on file, a donation can be made to any group registered with the online platform with the click of a button.

The member's account information also include notification options. For example, the member can select to be notified by either email or SMS when the member successfully makes a donation/payment, successfully uploads a video/ stories, successfully joins a group, gets his volunteer hours confirmed.

The member can select to be notified by either email or SMS when someone, for example, comments on one of the member's stories/videos, comments on a story/video in the member's profile, comments on the member's links, comments on the member's profile, comments after the member on someone else's link, comments after the member on someone else's profile story, comments after the member on someone else's video, comments on a post that the member was tagged in, confirms a connection request, tags the member in a video, tags one of the member's videos, tags the member in a post, suggests a friend the member might know, has a birthday coming up, joins the online platform after the member's invite.

The member can also select to be notified by either email or SMS when, for example, a group approves the member's request to join the group, changes the name of one of the member's groups, asks to join a group the members is the administrator for, makes the member group administrator, and changes the privacy setting of one of the member's groups.

The member can select to be notified by either email or SMS when the online platform has a new feature update or has a group to recommend, and a new celebrity, athlete, or musician joins the online platform, or a disaster occurs.

A member's account can also have an editable follower setting, where the member can allow either everyone or just the member's connections to follow him. When a first member follows a registered user, the first person receives status updates and stories from the registered user. A member can also 'un-follow' a specific user. Once a person is un-followed, that person no longer receives status updates and stories from the member. If the un-followed person is one of the members' connections, the connection status remains unaffected. It is also possible to un-follow a group so that the member will no longer receive status updates or stories from that group. If the member is a member of that group, the group membership remains unaffected.

Account information can also include users or groups that are blocked. Once a user is blocked, that person can no longer be the member's connection or interact with the member. Similarly, once a member blocks a group, that group can no longer interact with the member.

The profile module 153 also maintains a bio in the individuals database 182 for each member. Example bio information includes basic information, such as sex and city of residence; contact information, such as email and America Online Instant Messenger (AIM); education and work information, such as profession, employer, college, and high school; a biography; interests, and favorite quote. A member can select whether to share each of the portions of the bio with everyone, just the member's connections, or no one.

In one embodiment, the profile module 153 maintains a stories page for each member, where the member can upload stories, as shown in the example of FIG. 60. The member can upload photos and/or videos in conjunction with a story and add tags to the story. As with all other content uploaded to the online platform, the member must rate the content. The content may also undergo review by the administrator of the group and/or the administrator of the online platform.

In one embodiment, information pertaining to all registered individuals is stored in the individuals database 182.

Badges

In one embodiment, the profile module 153 awards badges and maintains badge information in the individuals database 182 pertaining to badges that a member has earned within the online platform. Badges are viewable by other members of the online platform. For example, a validation badge can be awarded after the platform cross-checks the member's information with his credit card information. The validation badge can indicate to other members that the badge holder is who he claims to be. As another example, a first time donor badge can be awarded to a member upon his first donation made on the online platform.

Awards

The online platform can issue awards and hold a ceremony to bestow the awards on a regular basis, for example annually. Non-limiting examples of awards include the most effective charity, the person who volunteered the greatest number of hours for a particular time period, the most successful supporter, the platform's "I Changed The World Today!" award for extraordinary acts of service, etc.

Connections

In one embodiment, the profile module 153 maintains connections for each member in the individuals database 182 and supports the ability of members to connect. In one embodiment, a 'connect with individual' button is provided on each member's profile page. As shown in the screenshot example FIG. 19, when a user clicks on the button to initiate a connection with a member, the user may be asked how he knows the member, with possible selections including: friend, colleague, partner, classmate, group member, and the user does not know the member. The user can include a personal note before sending the invitation via the invitation module 158 to the member. The invited member receives an invitation email from the user requesting a connection, and the member is provided with clickable buttons in the email to either accept or ignore the invitation. In one embodiment, if the member accepts the invitation, the user is sent a return email indicating that the user and the member are now connected. Further, as shown in the example of FIG. 20, the email can include information from the member's bio, for example, some of the member's other connections and some of the member's group memberships.

In one embodiment, the invitation module 158 tracks the status of invitations sent by each member or group head or administrator, such as whether an invitation was accepted, has not yet been accepted, as not delivered, or was deleted. Then, the member can select invitations according to the status of the invitation. For example, a member can select all people whose invitations that have not yet been accepted, and re-send the invitations to just those people.

Figure 21:
FIG. 21 shows an example screenshot of the connections of a member.

In the member's profile, the profile module 153 maintains a connections list for the member in the individuals database 182. For example, as shown in FIG. 21, all of the other members of the online platform to which the member is connected to are listed with information such as location, phone number, number of group memberships, notes/comments, and tags. Tags provided by the online platform, such as friend, colleague, partner, classmate, group member, can be used. The member can also create his own tags for other connected members, such as my buddies, fun people, work folks, Los Angeles folks. Additionally, there are clickable tabs to add a new connection, send a message to a selected connection, or delete a connection. Connections can also be searched by tags and filtered. Examples of filters include location, interests, any tag word, animals, children, cancer research, and common friends.

Events

One embodiment of the host server 120 includes the events module 154 which tracks events listed by groups or organizations. An administrator of a registered group can enter information about an upcoming event, and the events module 154 stores the event information in an event database 189. Information that can be provided and stored in the event database 189 and listed in the event center include the name of the event, where and when the event will take place, who the event is for, the number of people needed, and any other information the event organizer wishes to provide. Additionally, after the event, people who attended the event can rate the event and upload photos/videos from the event to share.

Figure 27:
FIG. 27 shows an example events page for a registered group.

An events center can be accessed for each group by clicking on the 'Events' button on the toolbar 2240 on the landing page of the group. The example of FIG. 26 shows an example events center page for The Gateway, where upcoming events and past events are listed. If the event organizer provides further information, a link is provided for the event that provides more information. For example, FIG. 27 shows more information about the event, such as who has signed up to attend, the items needed for the event, and who has signed up to bring the items needed.

Collaboration

One embodiment of the host server 120 includes the collaboration module 155 which supports different tools to enable individuals and groups to interact and collaborate, such as discussion tools, scheduling tools, and polls/voting tools. In one embodiment, the discussion tools allow members of a group to have an online discussion; the scheduling tools allow members of a group to schedule meetings or other events involving multiple members; and the polls/voting tools allow a group to survey a member of the group or any user who visits the group's web page on the online platform.

In an example of how the collaboration tools can be used, one group can agree to let another group send a message to all of its members without releasing email addresses for its members. Essentially, the collaboration module 155 can act as an escrow agent.

Further, third party application developers can provide other tools for groups and/or individuals to use.

Marketing Tools

One embodiment of the host server 120 includes the marketing module 165 which supports advertisement campaigns within the online platform. In one embodiment, the online platform is directed toward individuals interested in volunteerism and philanthropy who are registered with the online platform and use the tools provided by the online platform. This group of people is an attractive audience segment, and groups such as United Way can target marketing campaigns directly at them using the online platform. For example, United Way can place advertisements on any or all of the pages of the sub-groups and supporter pages that use the tools offered by the United Way, the umbrella organization.

In one embodiment, the marketing module 165 accepts text, images, photos, and/or videos for advertisements from an advertiser along with target audience information and any other information associated with the ads, such as dates the campaign an advertisement campaign should run. The advertisement then stores the ads and associated information in the marketing database 184. The marketing module 165 places the ads on the appropriate pages with the online platform, such as group pages, individual pages, and supporter pages.

Gift Cards

The marketing module 165 also runs a gift card campaign that can be used by groups or individuals. The objective of the campaign is to make individuals aware that they can buy a gift card for their family and friends, for example, for birthdays, bar mitzvahs, weddings, anniversaries, etc. Individuals or groups can purchase gift cards to be donated toward a particular charity or a gift card that can be used to donate toward any group associated with the online platform.

Figure 29:
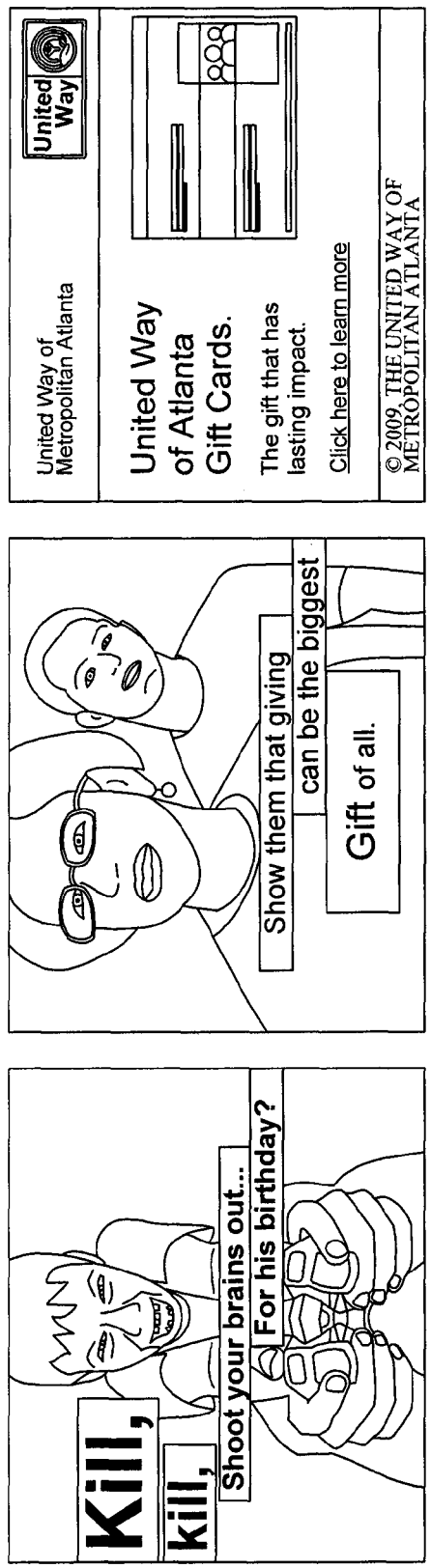
FIG. 29 shows three advertising panels that can be used for a gift card campaign.

In one embodiment, the three advertising panels shown in FIG. 29 can be animated to repeatedly cycle through the panels, to catch the eye of parents. The ad in FIG. 29 is directed toward teaching parents that there is an alternative to giving a violent video game as a birthday present to their son. A gift card can be purchased for the child that he can use to donate money towards one or more charities of his choice, thus teaching the child the gift of giving. When a user clicks on the ad, he will be prompted by the marketing module 165 to enter information, such as the buyer's name and email address, the recipient's name and email address, and a personalized message. The marketing module 165 stores the information in the marketing database 184 and sends an email to the recipient with information on the gift card donor, the amount of the gift card, the gift card code, and information on how to redeem the gift card.

The online platform offers umbrella organizations the use of an advertising platform distinct from traditional marketing channels. Properly placed ads targeted at people who have expressed interests in philanthropy and even more specifically, the particular charity's cause, are likely to have significantly high than average response rates. Moreover, if the ads are created properly, they can have an important impact on evolving an individual's sense of charity and help evolve peoples' mindset toward volunteerism and donations. Umbrella charities have an advertising platform that enables them to cement their brand identity online with the appropriate target audience. Additionally, online ad distribution has a relatively lower cost compared to traditional advertisement channels.

Community-Based Campaigns

In one embodiment, umbrella organizations can conduct community-based campaigns using the marketing module 165. For example, the United Way of Metropolitan Atlanta can conduct an Atlanta-wide community challenge. To heighten the prominence of this event and make it more fun, the United Way can solicit the involvement of celebrities, athletes, and musicians. These individuals can form groups and compete for points on their ability to successfully meet challenges. Other groups can set up to compete as well. This type of campaign is an effective way to involve individuals and groups on an ongoing basis, rather than having contact with contributors only once a year during a workplace campaign. Also once an individual signs up for a competition, he becomes a member of that umbrella organization and will become familiar with the online tools and applications. Finally, after the campaign is over, individuals will be accustomed to the functionality and the relationship with the umbrella organization and can spark ideas to start their own group. The community-based campaign can also be attractive to sponsors. For example, a sponsor like Coca-Cola can be integrated into the campaign which could result in substantial matching donations from the sponsor.

Donations and Payments

One embodiment of the host server 120 includes the donation/payment module 156 which facilitates donations or payments made by users of the online platform and stores information relating to donations and payments in a donations/payments database 188. On each group page there is a clickable button for donating money to the group, for example the 'donate' button 2255 in FIG. 22. An example of the screenshot shown to the user in the first step of the donation process is shown in FIG. 28. The user is requested to enter the amount of money to be donated to the group associated with the group page on which the user clicked the 'donate' button. The user is also asked whether the donation is a one-time donation or a recurring donation, for example, monthly or annually. There are also fees associated with making a donation so the user is asked if he wishes to cover the fees for the donation. The fees can include fees associated with processing the method of payment, such as PayPal or credit card fees. Additionally, fees can be charged by the online platform to cover supporting the software tools provided by the online platform to the groups.

In one embodiment, the user is also asked by the donation/payment module 156 if he has a gift card code for use toward the donation amount. Next, the user is asked how he would like to pay for the portion of the donation that is not covered by a gift card, such as using PayPal or a credit card. The user is prompted to provide the relevant information associated with the selected method of payment, and then the donation/payment module 156 summarizes the donation information and also asks the user to select if he wants to disclose the donation on his profile and the web page of the group donated to, disclose the donation but not the donation amount, or make the donation anonymously. The donor also can select the option to share information about the donation on social media websites, such as Facebook and Twitter. Once a donor has made a donation, the donor can also be asked whether he wishes to set up a "1-click" option to make donations easier in the future. If so, the donation/payment module 156 stores the relevant information in the donations/payments database 188.

When an individual makes a donation to an umbrella organization, there are several possible ways to distribute the donation. In one embodiment, the donation is divided among the umbrella organization and distributed among the sub-groups under the umbrella organization, where the distribution among the sub-groups may or may not be equal. The online platform also receives a fee that may be a percentage of the amount donated.

In one embodiment, the individual finds the sub-group listed on the umbrella organization's sub-group page and clicks the 'donate' button to directly give to the sub-group.

Then the donation goes to the sub-group, but the umbrella organization charges a processing fee because the sub-group receives the donation because it is listed under the umbrella organization. The online platform also receives a fee that may be a percentage of the amount donated.

In one embodiment, the individual finds out about the sub-group after researching on the umbrella organization site and then decides to donate to the sub-group directly. The umbrella organization may or may not deserve a processing fee, depending upon the extent to which is helped the sub-group get the donation. The online platform also receives a fee that may be a percentage of the amount donated.

In one embodiment, the individual donates directly to the sub-group without being aware of the umbrella organization. In this case, the umbrella organization does not earn a processing fee, but the online platform receives a fee that may be a percentage of the amount donated.

In one embodiment, the individual makes a donation to a professional fundraiser who is raising money on behalf of the umbrella organization. The donation is divided among the umbrella organization and distributed among the sub-groups under the umbrella organization, where the distribution among the sub-groups may or may not be equal. The online platform receives a fee that may be a percentage of the amount donated, and the fundraiser also receives a fee.

In each of these cases, the donation/payment module 156 calculates the fee due to each party and distributes the donation appropriately.

In one embodiment, the online platform can collect membership dues from individuals and/or groups.

In one embodiment, a group may prefer not to have banner advertising on its website and can pay an opt-out fee to the online platform.

In one embodiment, the online platform can levy a fee if a large amount of bandwidth is used by a group and/or its members.

In one embodiment, the online platform can reserve the right to some higher profile URL (Uniform Resource Locator) properties, e.g. www/OurGroup.Org/Coke. These URL properties can be either leased or purchased by a customer.

In one embodiment, outside parties and/or fundraisers can set up online tools for others and deduct their own processing fee.

Tribute Pages

Figure 54:
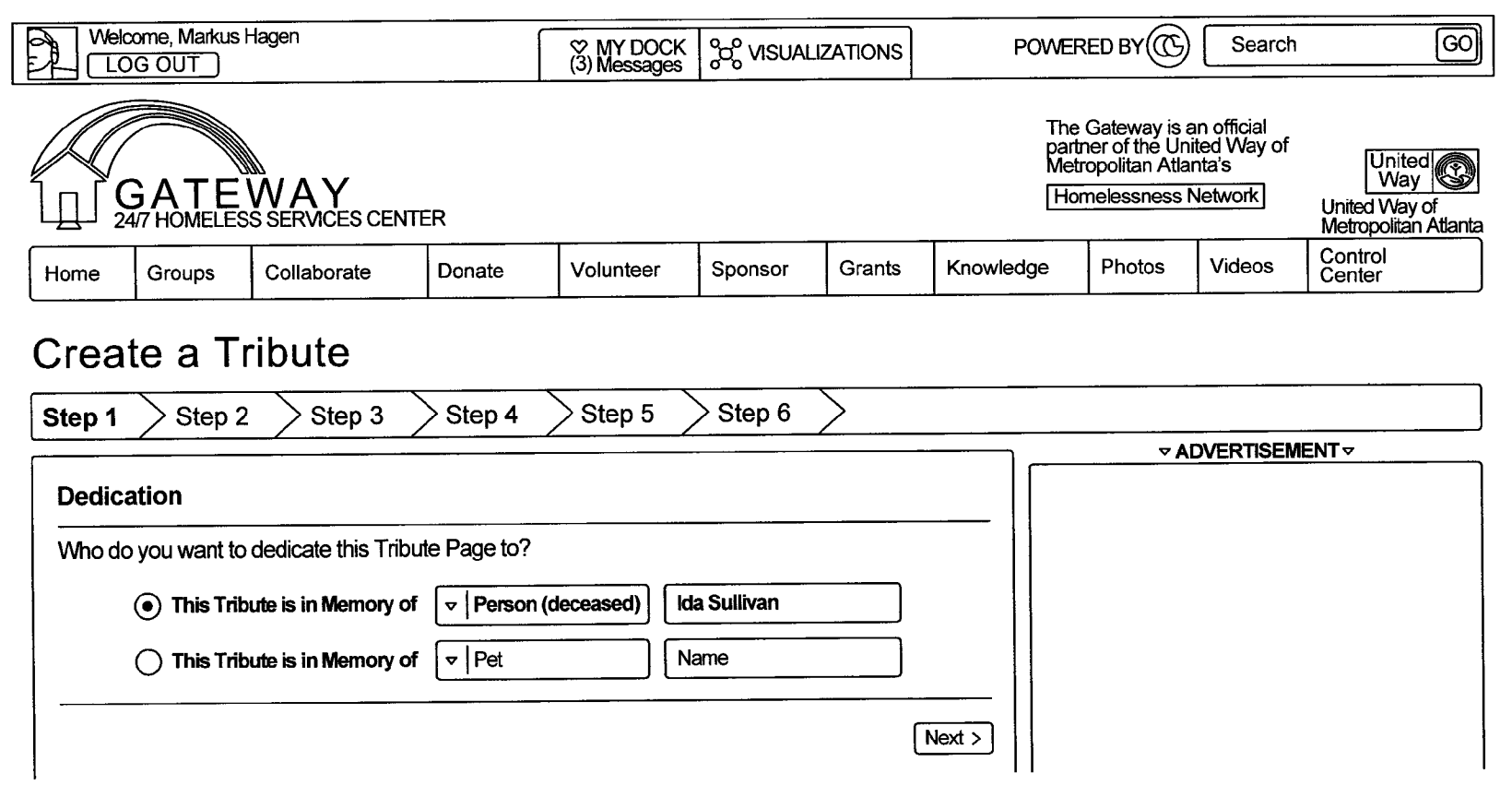

The donation/payment module 156 also prompts and receives information for and establishes tribute pages on the online platform. Tribute pages are a way of honoring somebody's memory while also encouraging philanthropy. A tribute page can be created on the online platform with a few steps, beginning by clicking on a 'create a tribute page' button on a landing page of a group. Initially, the donation/payment module 159 requests that the user provide information as to who the tribute page should be dedicated to. A screenshot of this step is shown in the example of FIG. 54. The user can select a category of the entity that the page will be dedicated to, for example a deceased person or a pet. The name of the honoree should also be provided. Next, the user is asked whether he wishes to make a contribution, and if so, how much, whether the contribution is a one time donation or a recurring donation, billing information, and confidentiality information regarding whether the user wants to publicly disclose the donation or the amount of the donation.

The user will then be prompted to design the tribute page by entering a message for the tribute page, uploading a photo of the honoree, and providing a description of the honoree. The user will be able to preview the tribute page prior to posting the page live on the online platform.

The next step is for the user to tell people about the tribute page by email. An example of the web page used to prompt the user for information, such as the email message and email addresses of people to send the message to, is shown in FIG. 55.

Figure 56:
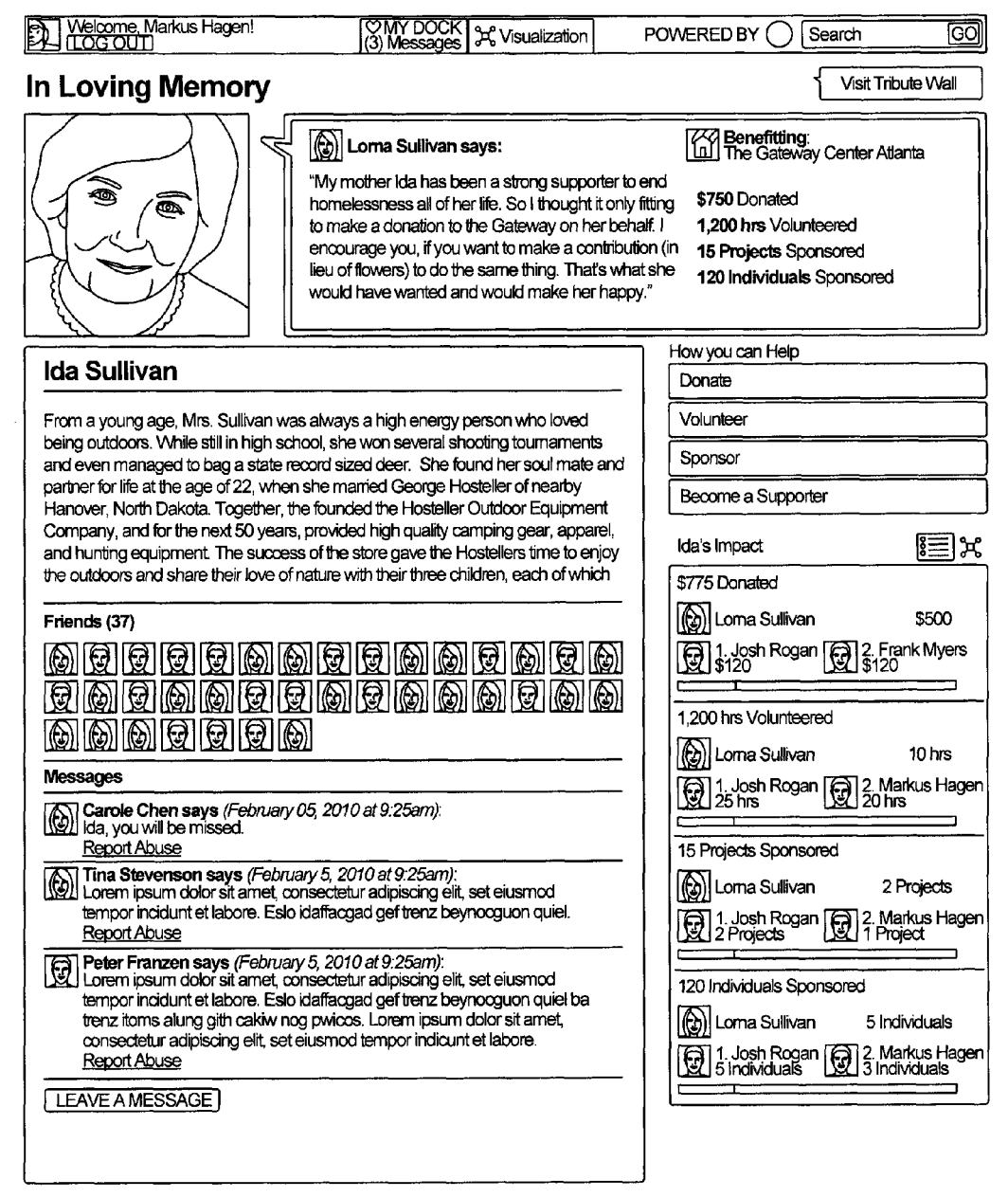

An example of a tribute page is shown in FIG. 56. The page can include the profile photos of people who donate to the memory of the honoree, comments from viewers of the tribute page, and a summary of statistics related to donations attributed to the tribute page, for example the total amount of money donated, the number of volunteer hours donated, the number of projects sponsored, and the number of individuals sponsored. All of the information uploaded to the tribute page is stored in a tributes database 187. Each individual tribute is automatically rolled up into the group's Tribute Wall, where all tributes are displayed. The Tribute Wall encourages healthy competition.

In one embodiment, tribute pages can also be used for other special events, such as birthdays, weddings, bar mitzvahs, etc.

In one embodiment, the donation/payment module 156 stores the information received about each donation and/or payment contributed toward a tribute page in the donations/payments database 188.

Donations Report Card

Figure 52:
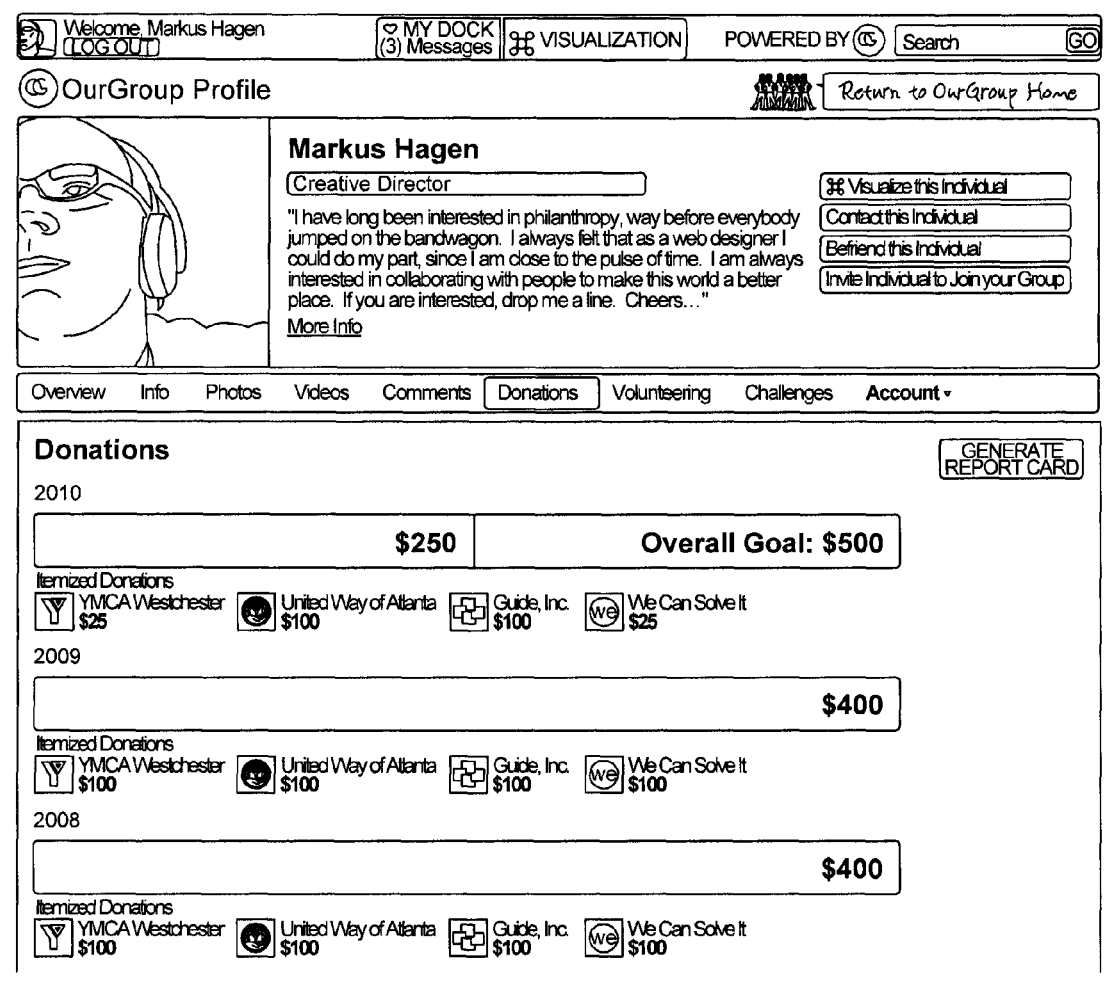

The toolbar 3510 on the user profile page includes a clickable 'donations' button. Clicking on this button takes the member to a page maintained by the donation/payment module 156 that lists the amount of the donations that the member has contributed, which groups those donations were given to, and the amount of the donations. The page can list the donation history of the member, year after year. An example donation listing page is shown in FIG. 52. The member can set donation goals that are tracked on this page. The user can also click on the button "generate report card" to get an itemization of the member's donations to the various groups and the date of the donations so that no receipts need to be kept, as shown in the example of FIG. 53. The report card is verified by the online platform.

Content Review

Figure 57:
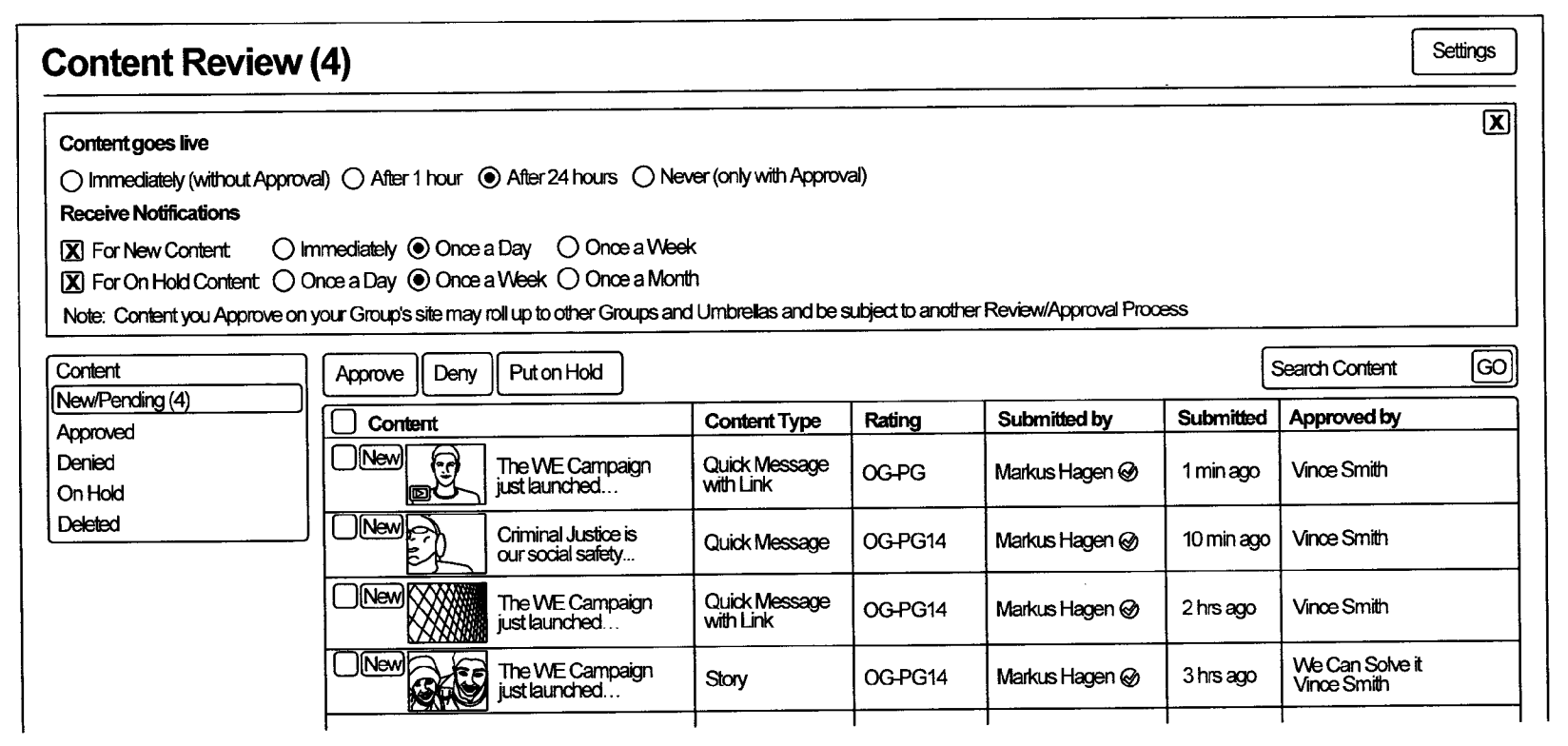

One embodiment of the host server 120 includes the content review module 157 which maintains a content review center that allows administrators of a group or an administrator of the online platform to review content submitted for posting before it goes live on the online platform. Review of submitted content to be posted on the online platform is a safety measure for providing an environment where users can safely interact with validated members. The example of FIG. 57 shows a content review webpage provided by the content review center. A group administrator can access the content review center to approve, deny, or put submitted content on hold after review. The administrator can also change the submitter's rating of submitted content, if the submitter's rating is not appropriate, and the administrator can optionally send a message to the submitter regarding the change in rating.

Also, the administrator can modify review settings. Examples of review settings that can be modified include the period of time submitted content goes live on the platform after submission, i.e., the amount of time the administrator is given to review the content prior to being published; how often the administrator receives notifications for new content; how often the administrator receives notifications for content put on hold; how long to keep approved content; how long to keep denied content; how long to keep content on hold; and how long to keep deleted content.

Volunteering

One embodiment of the host server 120 includes the volunteer module 159 which maintains information in the volunteer database 191 related to volunteering for each group on the online platform.

A group can provide its volunteer needs to the volunteer module 159, which then lists the volunteer needs in the group's volunteer center. Information that can be stored in the volunteer database 191 and listed in the volunteer center include the name of the opportunity, where and when the opportunity will be, who the opportunity is for, the number volunteers needed, and any other information the group wants to provide about the volunteer opportunity. Additionally, after volunteering, the individual can rate and/or review the organization on a number of different criteria, such as how efficient the organization is.

Figure 30:
FIG. 30 shows an example volunteer center page.

A volunteer center can be accessed for each group by clicking on the 'volunteer' button on the toolbar 2240 on the landing page of the group. The example of FIG. 30 shows an example volunteer center page for The Gateway, where volunteer opportunities are listed. Individuals can sort the volunteer opportunities using different criteria, review details about the opportunity, and apply to volunteer. If the group provides further information about the volunteer opportunity, a link is provided for the event that provides more information. When people visit the volunteer center, they can also access the reviews. The reviews provided by volunteers are an incentive for each group to be productive and effective. This information is also useful for individuals to determine if they would like to donate to a particular group. The example of FIG. 31 shows a listing with more information about a volunteer opportunity that includes a clickable button for applying to volunteer.

Figure 50:
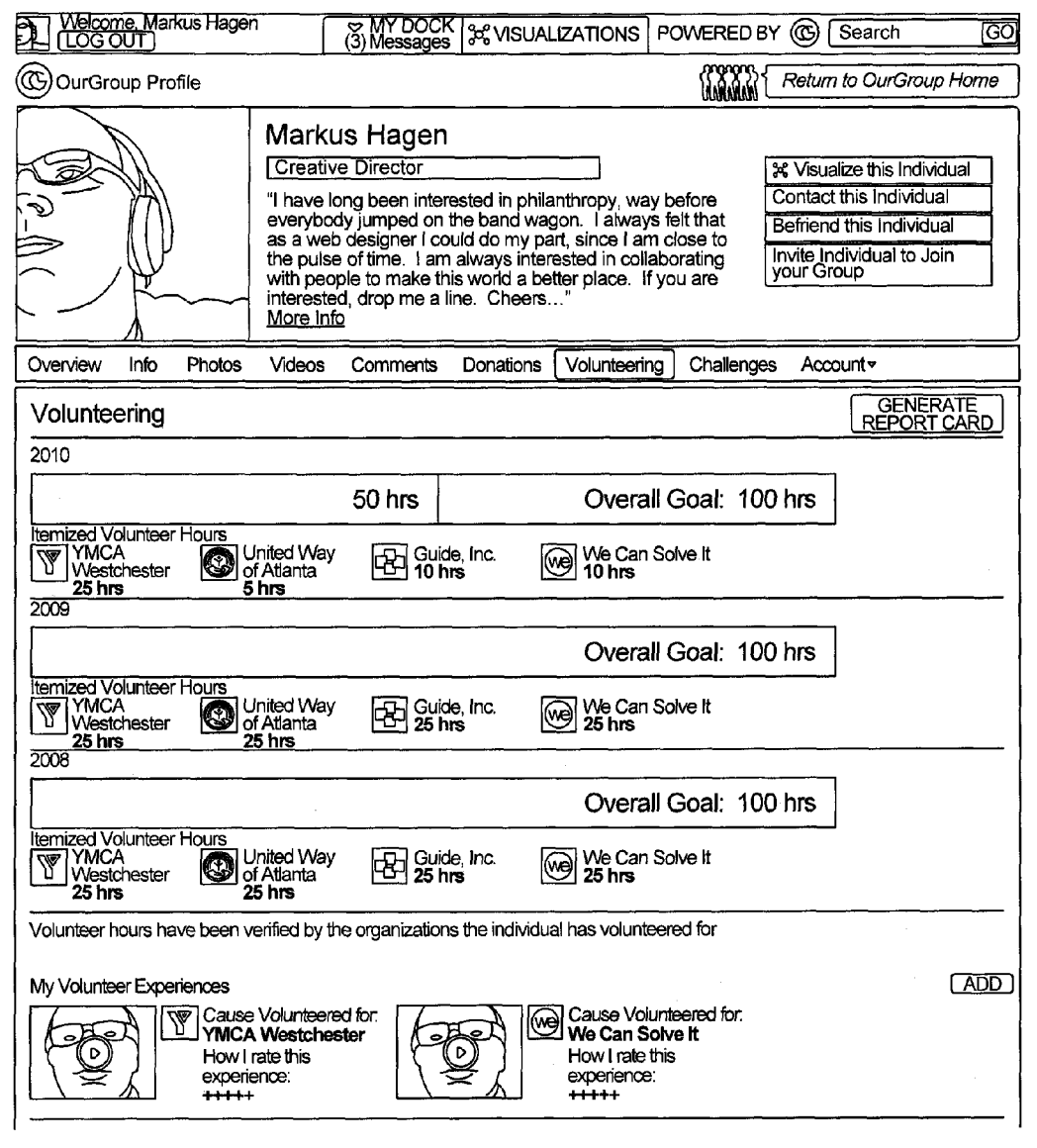

The toolbar 3510 on the user profile page includes a clickable 'volunteering' button. Clicking on this button takes the user to a page maintained by the volunteer module 159 that lists the volunteer work that the member has performed, which groups the member has volunteered with, and how many hours the member has volunteered with each group. The page can list the volunteer history of the member, year after year. An example volunteering summary page is shown in FIG. 50. The member can set volunteer goals that are tracked on this page. Then a person associated with the group that the member volunteers with will validate that the member has volunteered and the number of hours volunteered with the group. Validation information for volunteer hours is stored in the volunteer database 191. Once the volunteer hours are validated, they will automatically register in the user's profile. The user can also click on the button "generate report card" to get from the volunteer module 159 an authenticated verification of the hours volunteered that can be printed, as shown in the example of FIG. 51.

Sponsorships

One embodiment of the host server 120 includes the sponsor module 160 which maintains information in a sponsor database 192 related to sponsorships made via the online platform.

A group can provide information to the sponsor module 160 about an individual who is working to help the group or a project associated with the group. The sponsor module 160 then lists the available individuals and projects looking for sponsorship in a sponsor center for the group. Information that can be provided and stored in the sponsor database 192 include the name of the individual or project, the location of the individual or project, and information about the individual or project. Individuals, companies, and foundations can access the sponsor center for groups for individuals and projects that are seeking sponsorship.

Figure 33:
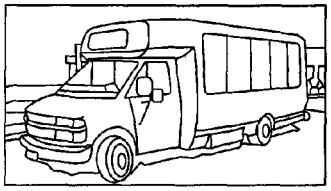
FIG. 33 shows an example web page with a project that can be sponsored.

A sponsor center can be accessed for each group by clicking on the 'sponsor' button on the toolbar 2240 on the landing page of the group. The example of FIG. 32 shows a sponsor center web page for The Gateway where individuals and projects that can be sponsored are listed along with the location of the individual or project and a link to sponsor the individual or project. Upon clicking the 'sponsor' button, more information can be obtained, as shown in the example of FIG. 33 which has information about a shuttle bus project that can be sponsored and includes an online form for entering information to sponsor the project. The link for sponsoring an individual is similar.

Sharing Knowledge

One embodiment of the host server 120 includes the knowledge module 161 which maintains information in a knowledge database 185, such as documents and other types of content, for sharing with others.

Figure 34:
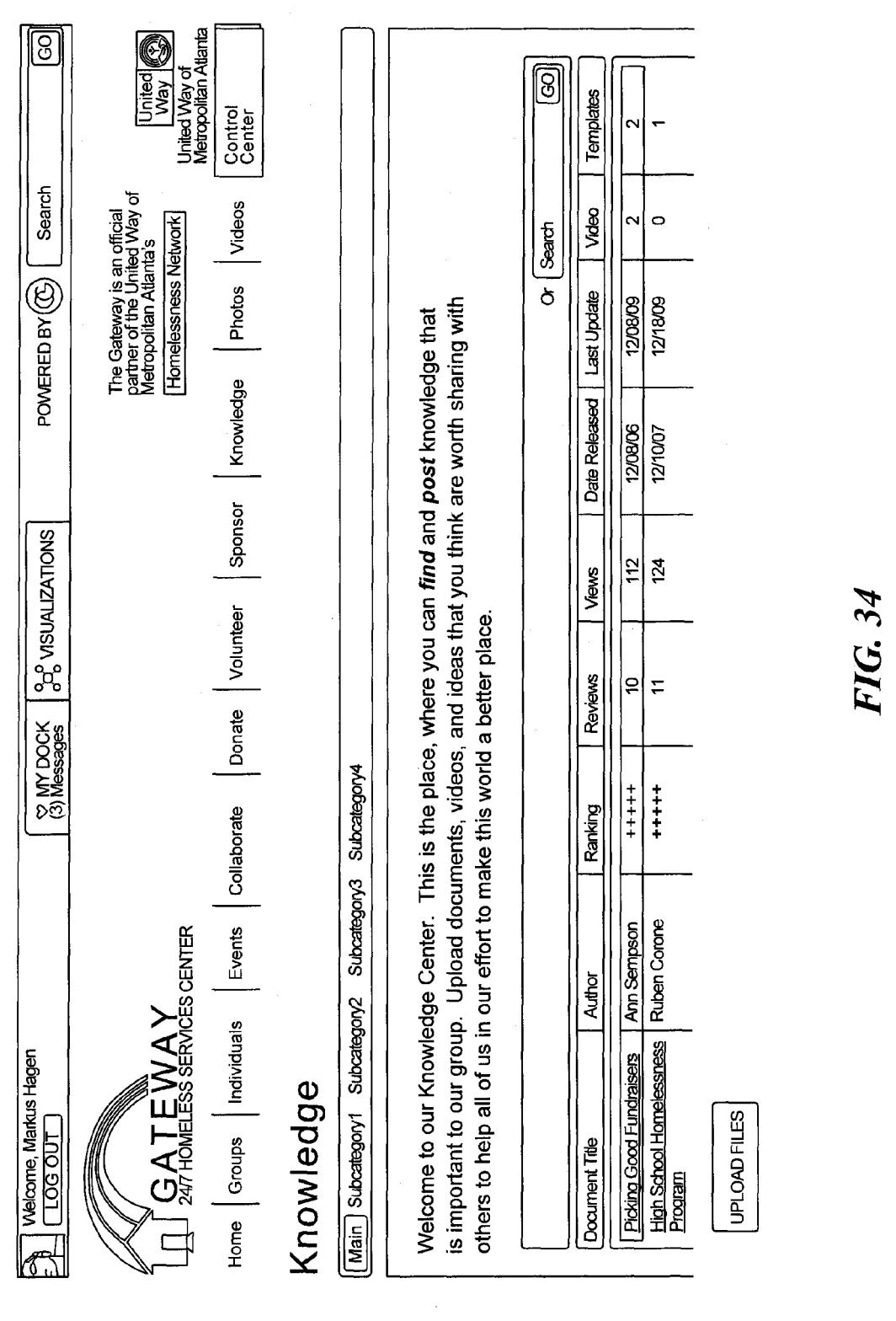

A group can provide the documents or other content to the knowledge module 161, and the knowledge module 161 then lists the available documents/content in a knowledge center for the group. For example, The Gateway has a very successful High School Homelessness program that it may want to share for use with other homeless shelters. In another example, the coaches at the YMCA can share lesson plans. Information deposited in the knowledge center can be made available to everyone, or limited to validated members of the group. FIG. 34 shows an example knowledge center page for The Gateway. Each document can list information such as author, ranking, number of reviews, number of views, date released, last update, number of videos and number of templates. A clickable button is provided for uploading files to the knowledge center via the knowledge module 161.

Photos and Videos

One embodiment of the host server 120 includes the photo/video module 166 which maintains photos and videos uploaded to the online platform and stores them in a photos/videos database 186. A photos center and a videos center can be accessed for each group by clicking on the 'photos' button and the 'videos' button, respectively, on the toolbar 2240 on the landing page of the group. Anyone with authority can upload photos to the group for sharing. The head or administrator of the group can decide who can upload photos and videos. For example, uploading of photos and videos may be limited to validated group members. In one scenario, a validated member may wish to post photos, videos, and/or stories from his experience volunteering with the group to share with others. The member will also be able to elect to post his photos, videos, and/or stories on other social networking sites, such as Facebook and Twitter.

Figure 36:
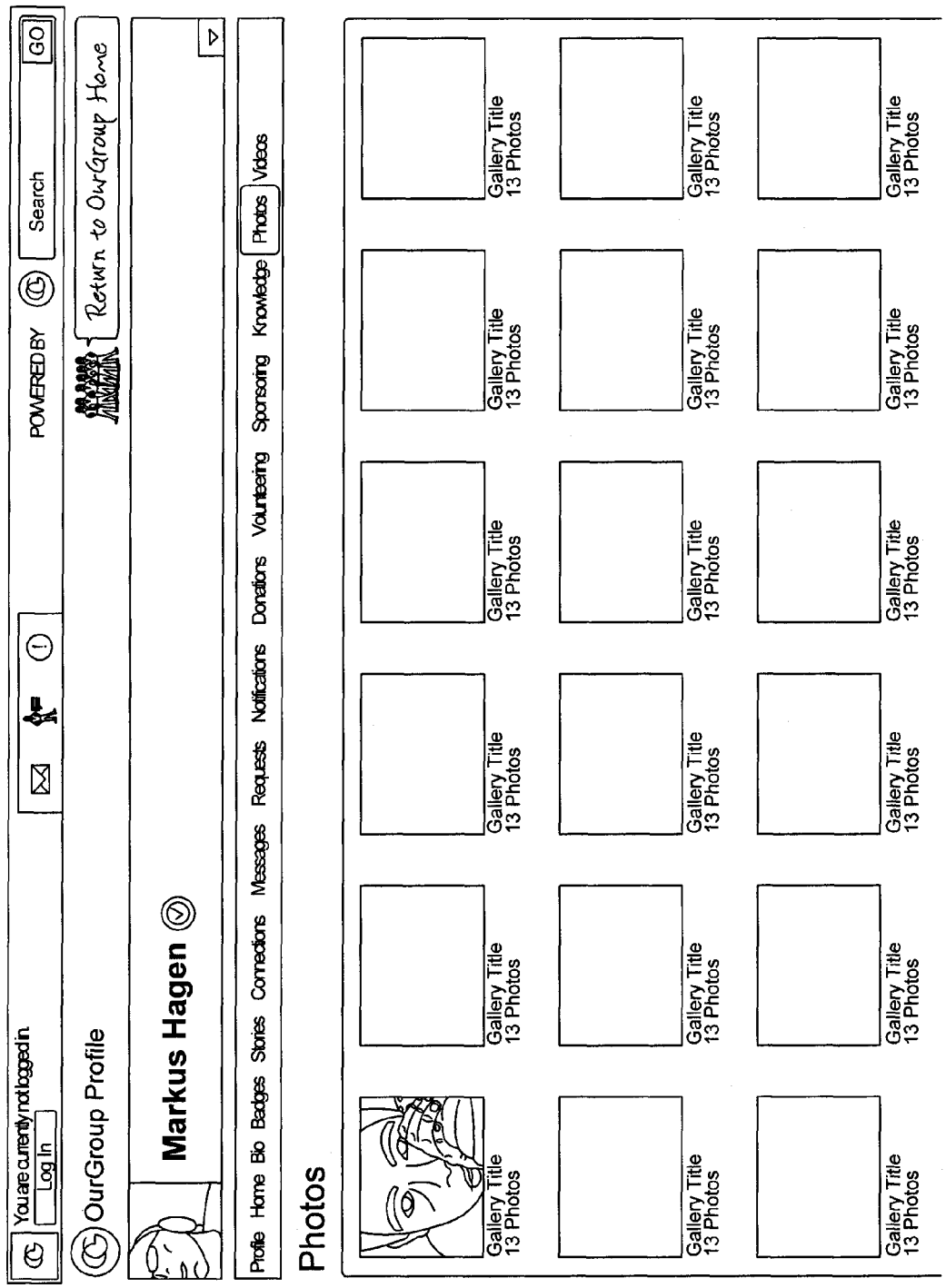
FIG. 36 shows an example of a photos center web page for a registered individual.

Additionally, a photos center and a videos center can be accessed on the landing page of a member by clicking on the 'photos' button 3515 or 'videos' button 3520 as shown in FIG. 35. The owner of the individual landing page can upload photos to his photos center page. The photos center web page of an individual in FIG. 36 shows a list of thumbnails of the different available photo galleries, provided the visitor to the photos center web page meets the privacy settings for viewing the galleries. The member can upload photos to the photos page by clicking on the 'upload photos' button 3630 shown in FIG. 36 to select photos stored on his computer for uploading. Along with uploading photos, the member can name the gallery, set privacy settings for the gallery, and rate the photos. Tags can also be added to each photo. The member can also delete any of the photo galleries by rolling over the gallery thumbnail and selecting the delete option.

Upon clicking the photo gallery thumbnail of a specific photo gallery on the photos center web page, the visitor is taken to the photo gallery page where he can navigate through the photo gallery. If the visitor is not a member of the online platform or is not logged in, he cannot comment, 'like' a photo, or report abuse, for example, the photo is not properly rated. However, the visitor can share the page even if he is not a member or is not logged in to virally spread information from the online platform. Moreover, if the visitor is not a member or is not logged in, only photos rated G and PG will be displayed to the visitor.

Control Center

Figure 37:
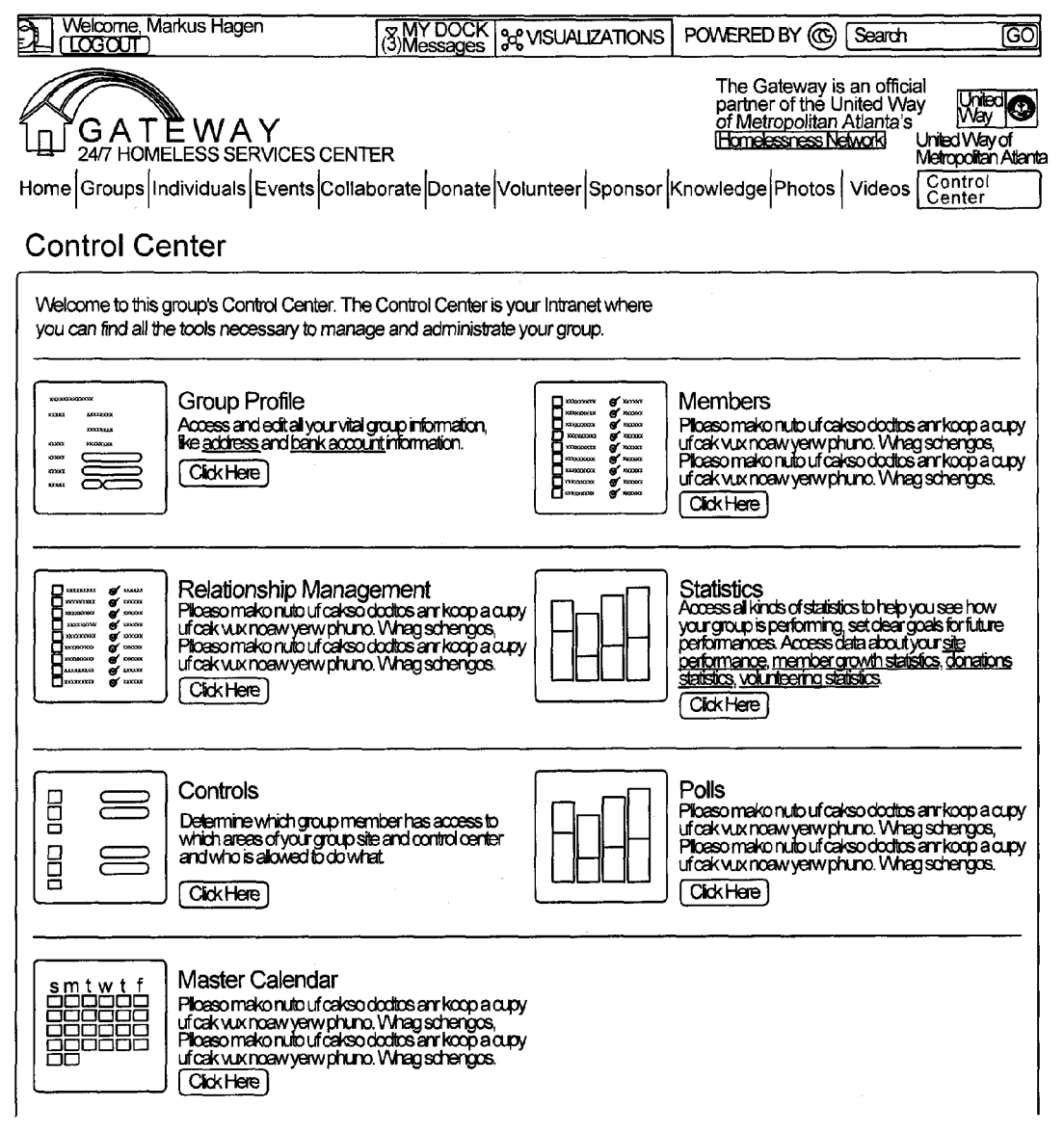

One embodiment of the host server 120 includes the control center module 162 which maintains information regarding each group in the groups database 181 and provides tools for managing and administrating a group in the control center for the group. A control center web page can be accessed for each group by clicking on the 'control center' button on the toolbar 2240 on the landing page of the group. Information maintained by the control center module 162 and accessible at the control center web page includes details on the group profile, members, member and donation statistics, access/viewing controls, etc. The information is used to enable professional management of the group. An example of a control center web page is shown in FIG. 37.

In one embodiment, the control center web page includes contact information for the group, such as physical address and phone number, and account information, such as bank name, routing number, and account number. The group administrator can edit the information.

In one embodiment, the control center web page includes membership information for the group. Members of the group and each sub-group can be listed with information such as status (group head, validated, not activated), the date that a member joined the group, the URL for a member's profile page, and a link to contact information for the member.

Figure 38:
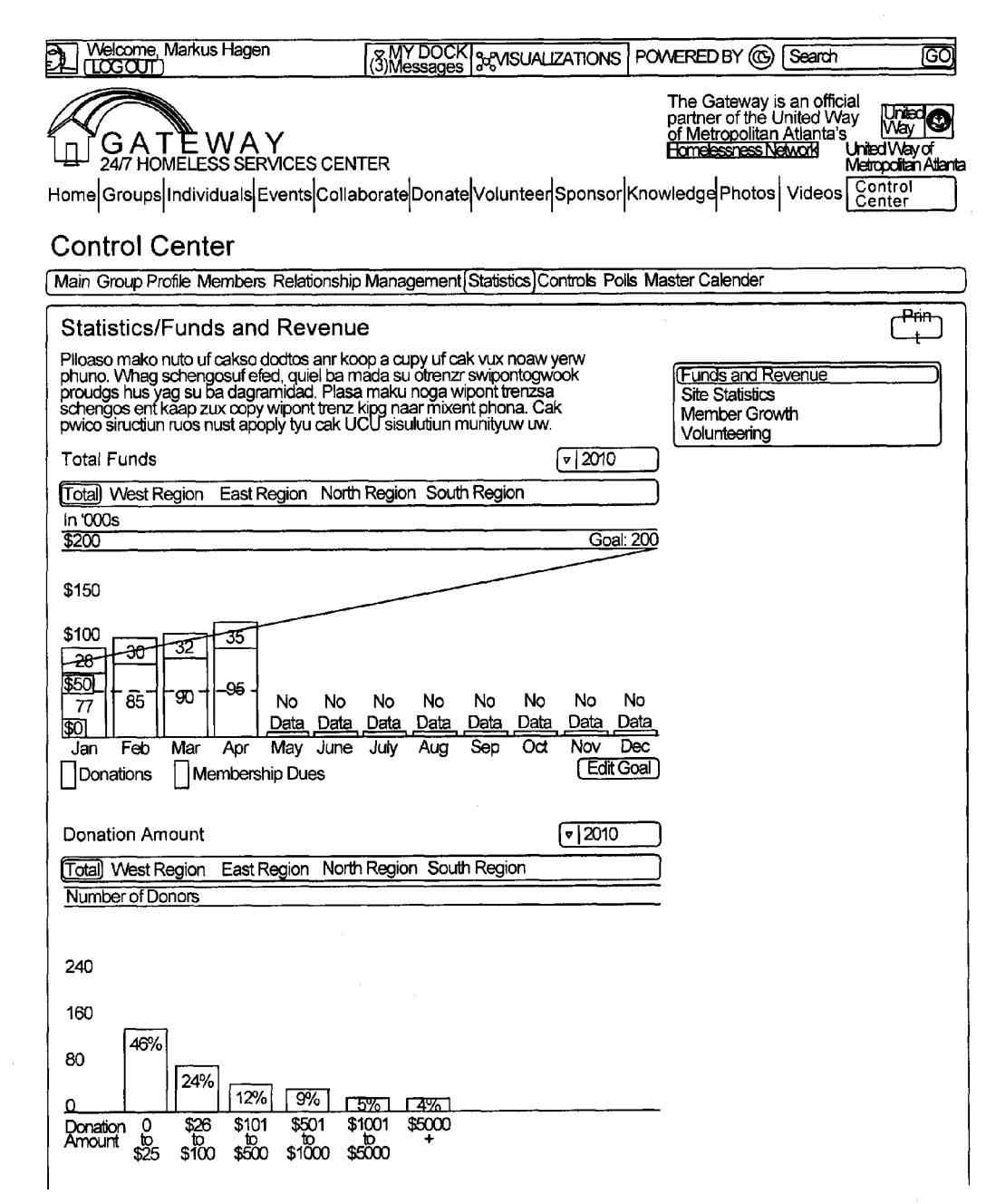

In one embodiment, the control center web page includes statistics pertaining to funds and revenue, as shown in the example of FIG. 38. For example, total funds broken out into donations and membership dues are plotted for each month. Additionally, the number of donors contributing certain donation amounts can be plotted. Each of the plots can be selected for different regions, such as west, east, north, and south. Different regions may be used for tracking members of a group, for example, within a particular swim team at a particular YMCA, individuals from different regions or areas can be set up to foster competition.

Figure 39:
FIG. 39 shows an example control center web page with permissions given to people managing a group.

In one embodiment, the control center web page includes access controls to determine who in the group has access to which information and who has the necessary privileges to do what, as shown in the example of FIG. 39. Access and permissions can be added and edited. Master controls permission allows a user with this permission to access all sections of the group's site. Other categories include control center access, comments, donation statistics, volunteer statistics, and member statistics. Permissions can include 'read only' and 'read and write'.

Figure 58:
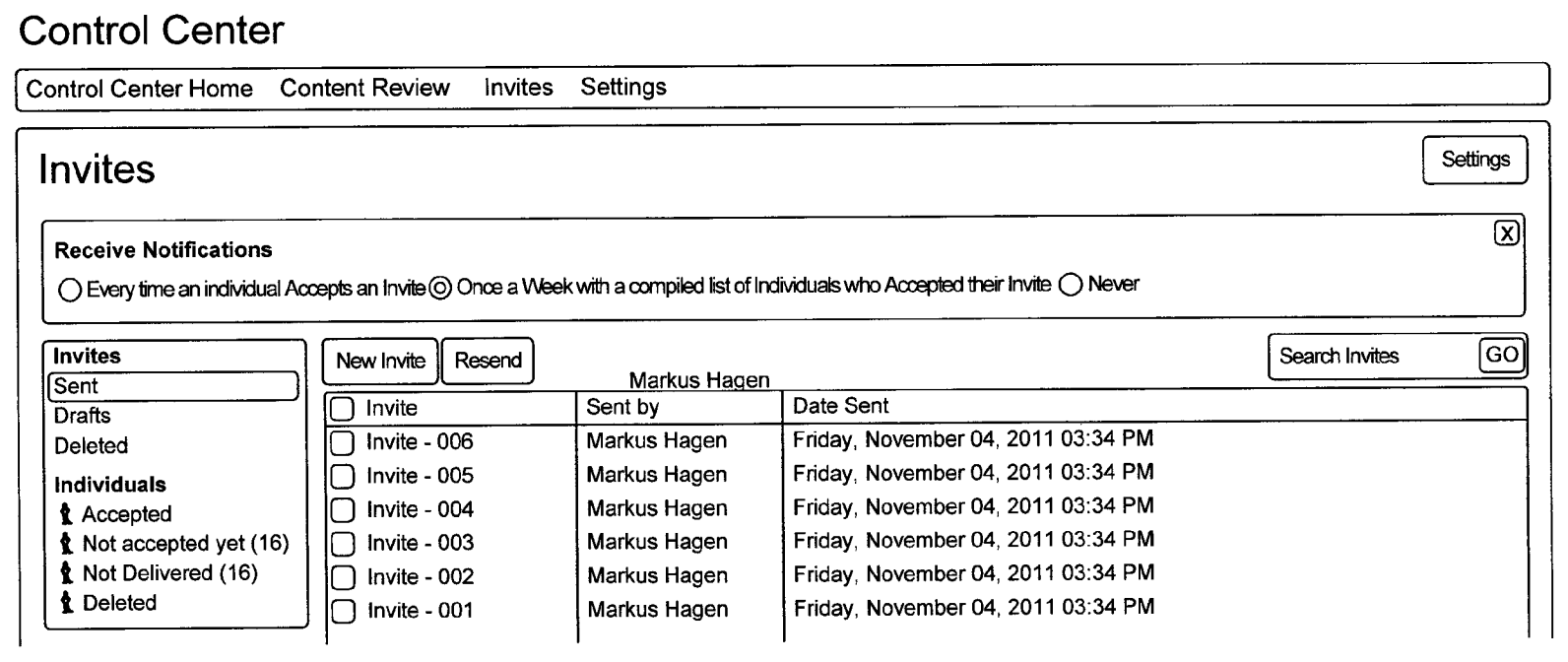

In one embodiment, the control center module 162 tracks invitations that have been sent from the online platform by the administrator of a group and who responded to the invitations. For example, invitations sent by a group administrator to individuals to join the group can be tracked, as shown in the example of FIG. 58. In this example, six invitations have been sent by the administrator on Nov. 4, 2011. The administrator can request a listing of recipients to whom a particular invitation was sent, and the control center module 162 can provide the listing along with information such as whether the invitation was delivered, whether the invitation was accepted by the recipient and if so, the date it was accepted, and the sender, as shown in the example of FIG. 59. In one embodiment, the administrator can select a listing of recipients according to whether the invitation was accepted, not accepted yet, not delivered, or deleted. For example, the administrator can re-send the invitation to the recipients who have not yet accepted the invitation and to the recipients to who the invitation was not delivered.

In one embodiment, the control center module 162 also tracks invitations that have been sent by members of the online platform, in a similar manner that invitations tracked by an administrator are tracked.

Feedback from Users

One embodiment of the host server 120 includes the feedback module 163 which maintains in a feedback database 190 that stores feedback from users, such as 'like', 'share', reporting abuse, and comments for content posted on the online platform, such as photos, videos, documents, stories, and messages. All content posted on the online platform have a feedback bar that includes links to 'like' 'share', report abuse, and provide comments regarding the content. An example of a feedback bar 4310 is shown for messages posted to a member's profile page in FIG. 43. A similar feedback bar can be used for content posted to the online platform. The feedback module 163 tracks the number of people who select the 'like' button for an uploaded content and indicates this number 4315 next to the 'like' button for the content, shown for example in FIG. 43.

Figure 40:
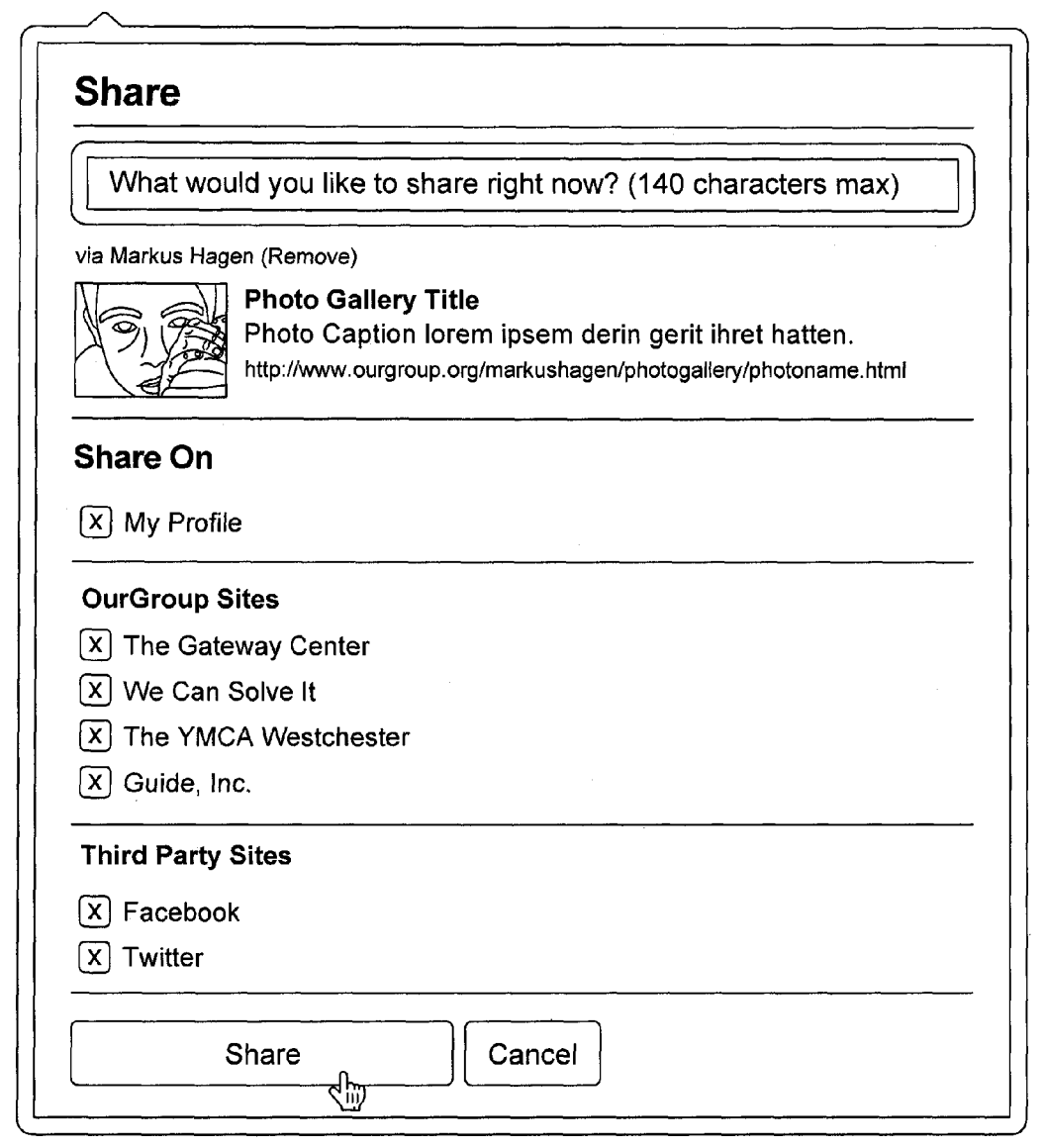

Upon clicking on the 'share' button, the user is presented with the option of sharing the content on the user's profile, on sites within the online platform that the user is a member of, and on sites external to the online platform that the user can select, for example, Facebook, MySpace, and Twitter. An example of the options presented to the user is shown in FIG. 40.

Figure 41:
FIG. 41 shows an example screen shot for reporting abuse.

Upon clicking the 'report abuse' button, the user is presented with queries. For example, if the user is reporting abuse regarding a posted photo, the user is asked whether the photo is about the user; if the photo gallery contains inappropriate content and what that inappropriate content is, for example, spam or scam, nudity or pornography, graphic violence, attacks individual or group, hate symbol, and illegal drug use; whether the photo is the user's intellectual property, and whether the photo gallery is rated inappropriately and what the rating should be. An example of the options presented to the user regarding a posted photo shown in FIG. 41.

Figure 43:
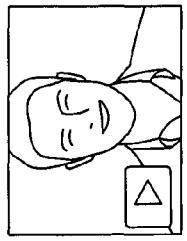
FIG. 43 shows part of an example newsfeed on a member's profile page with a feedback bar.

Upon clicking the 'comment' button, for example button 4310 in FIG. 43, a comment field 4320 is shown to the user where the user can enter his comment. Similar to other content posted to the online platform, the comments can also have a feedback bar that may include functions such as the 'like' and 'report abuse' button and a field to enter a comment to the first comment, shown in the example of FIG. 44.

Supporters

One embodiment of the host server 120 includes the supporter module 164 which queries and accepts information in about an individual who wishes to become a supporter. A supporter page is intended for individuals who feel strongly about an organization and want to support it without setting up a sub-group. The supporter page provides a quick way for an individual to tap into his pool of friends for philanthropic purposes. The supporter page can be personalized by the supporter, for example, the supporter can include a statement about why he is a supporter of the group and upload relevant videos and photos. The information is maintained in a supporter web page by the supporter module 164 and stored in the individuals database 182.

Figure 25:
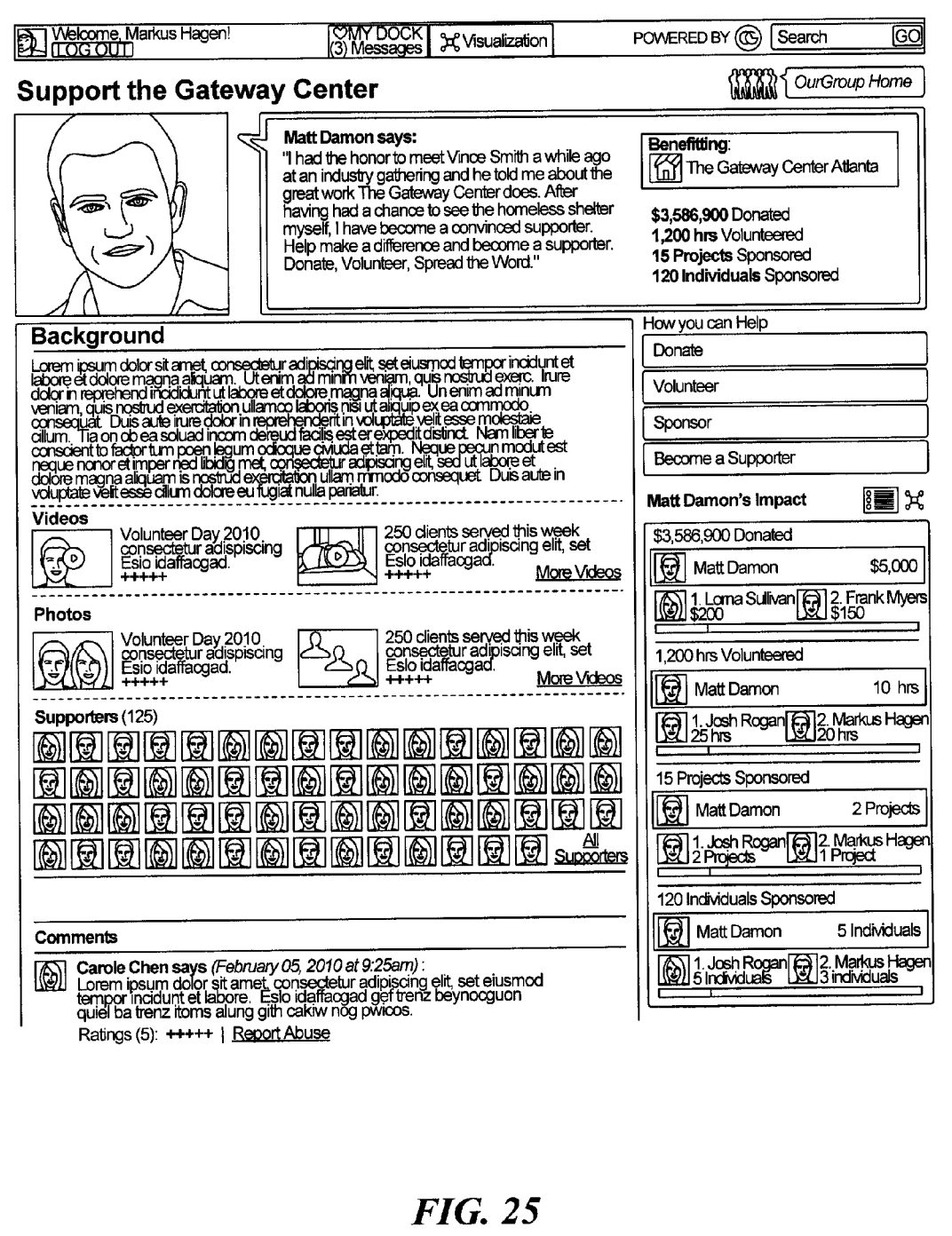

An example of a supporter page is shown in FIG. 25, where the supporter is Matt Damon. If Matt Damon publicizes, for example through a television or magazine advertisement, that he is a supporter of The Gateway, he can let people know that they can go to his supporter page at The Gateway to help the organization through him. Then people who go to his supporter page can donate, volunteer, sponsor, and become a supporter, and all of these activities are tracked through Matt Damon's supporter page. In one embodiment, statistics of Matt Damon's impact can be included on the supporter page, for example, total amount of donations contributed through the page, total number of volunteer hours provided through the page, total number of projects sponsored through the page, and number of individuals sponsored through the page. The supporter and others can closely monitor the impact that the supporter has generated, such as dollars donated, volunteered hours, and projects and people sponsored. This tool can be useful to enable friendly competitions between supporters as to who can raise the most money or encourage the largest number of volunteers for a given charity.

Thumbnail images of supporters of the main supporter (for example, Matt Damon) can be shown on the supporter page, and comments from people can also be listed on the page. Additionally, photos and/or videos can be uploaded to the supporter page by supporters and volunteers. The main supporter will be able to review the uploaded content and edit or delete any uploaded content.

The supporter page can also provide a button for the supporter to click to publish donations, volunteer hours generated or general affiliation with a cause and/or to recruit others to joining the cause by publishing the information on a social media networking site, such as Facebook, MySpace, and Twitter. By publishing the information, the supporter can virally grow the online platform's number of users.

The Dock

Figure 11:
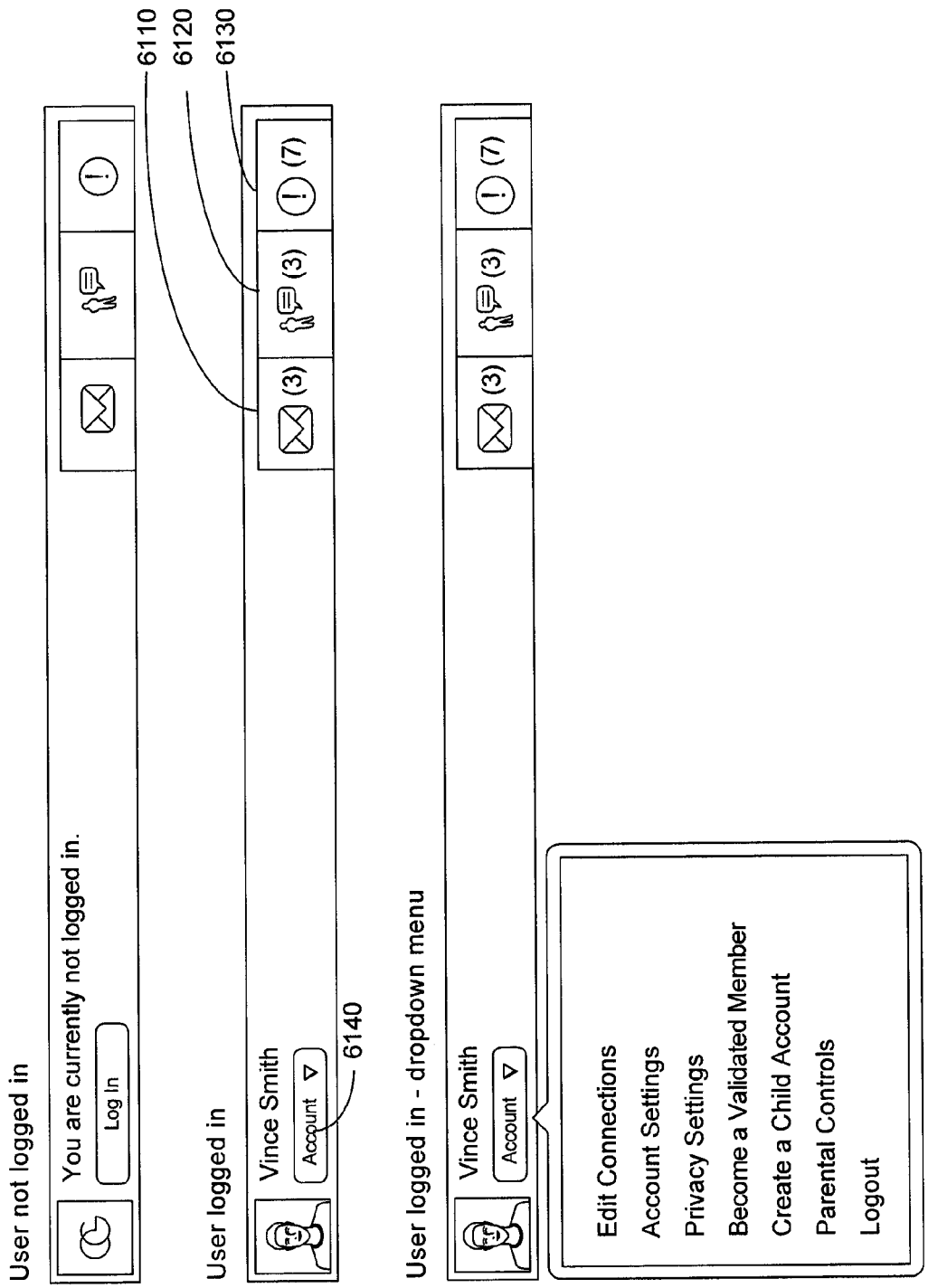
FIG. 11 shows example magnified views of a dock.
Figure 45:
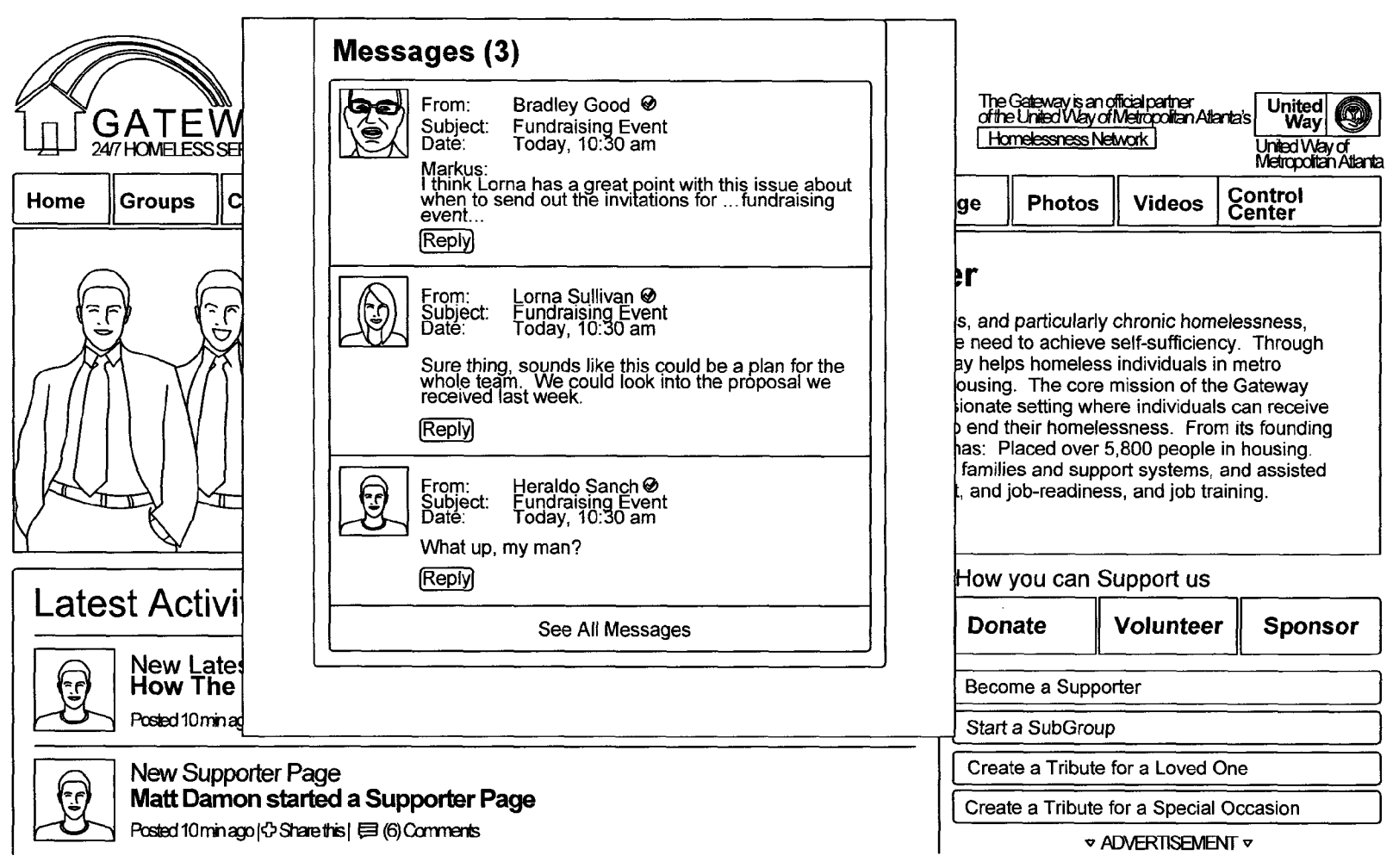

One embodiment of the host server 120 includes the dock module 167 which supports each member's personalized dock. When a member signs in to the online platform, a personalized dock appears at the top of the web page of the online platform that the member accesses. The personalized dock has useful functionality that the member can access without leaving the web page that he is viewing. A dock 111 is shown in the example of FIG. 2 at the top of the screenshot. Example magnified views of the dock are shown in FIG. 11. When the user is not logged in to the online platform, the dock is quiescent. When a user logs in to the online platform, the dock includes the profile photo of the member on the left and the member's name. Additionally, the dock can include a clickable email button 6110 that shows the number of unread email messages received from other members within the online platform. Upon clicking the email button 6110, the dock shows the messages in a dropdown format so that the member does not leave the web page that he is viewing. An example is shown in FIG. 45. Upon clicking on an email message, the member is provided with typical email options, for example, replying, replying to all, forwarding, deleting, and printing the message.

Figure 46:
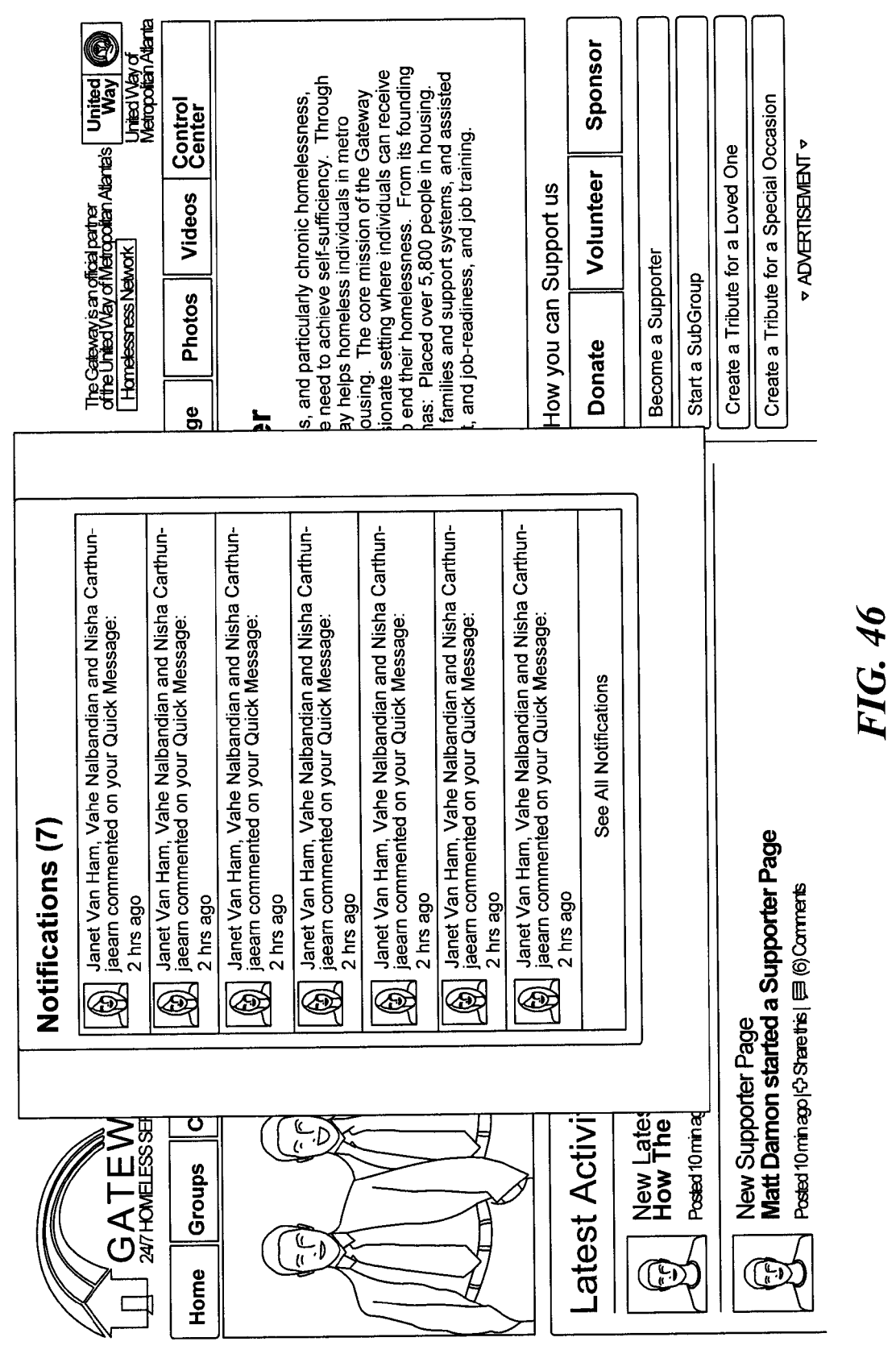
Figure 47:
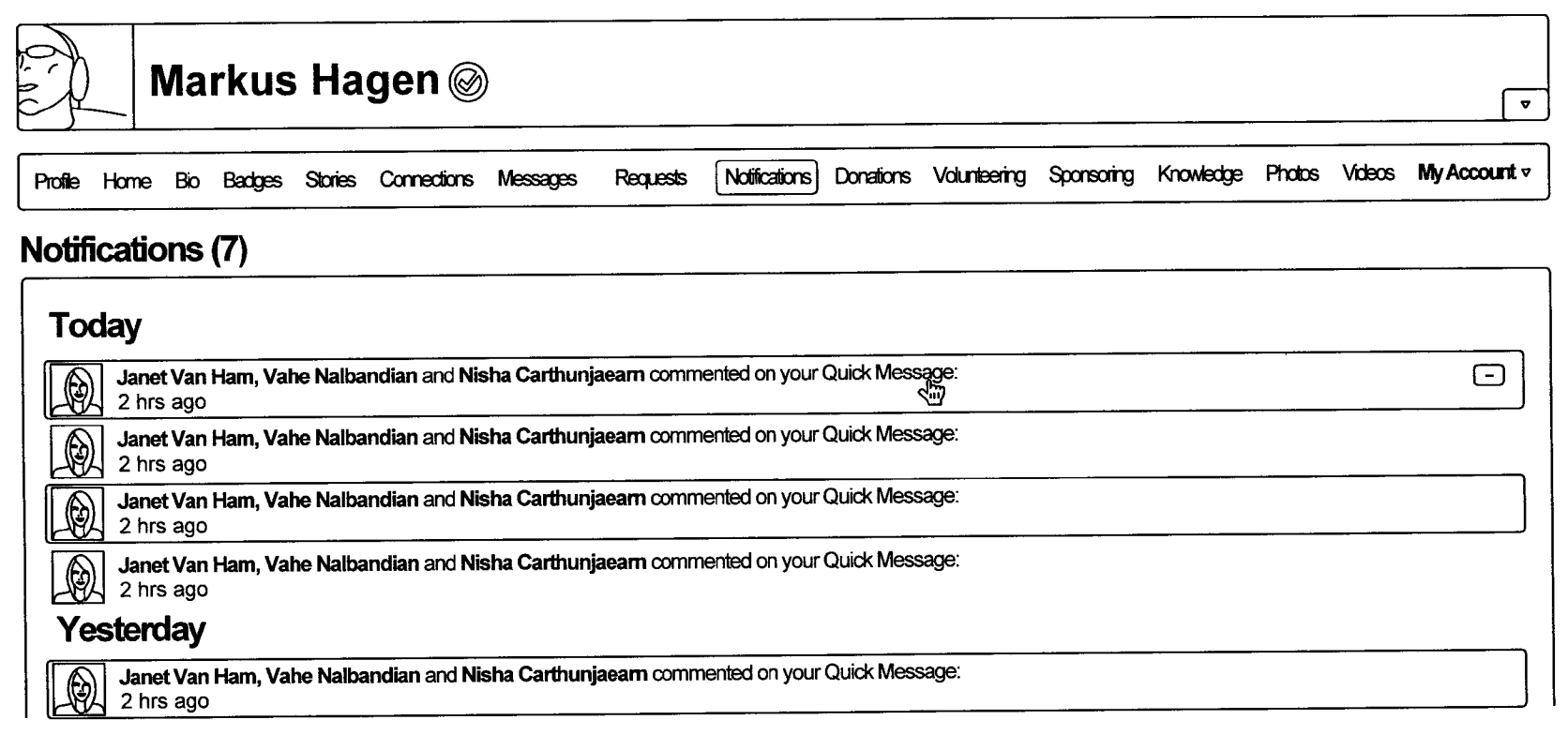
Figure 48:
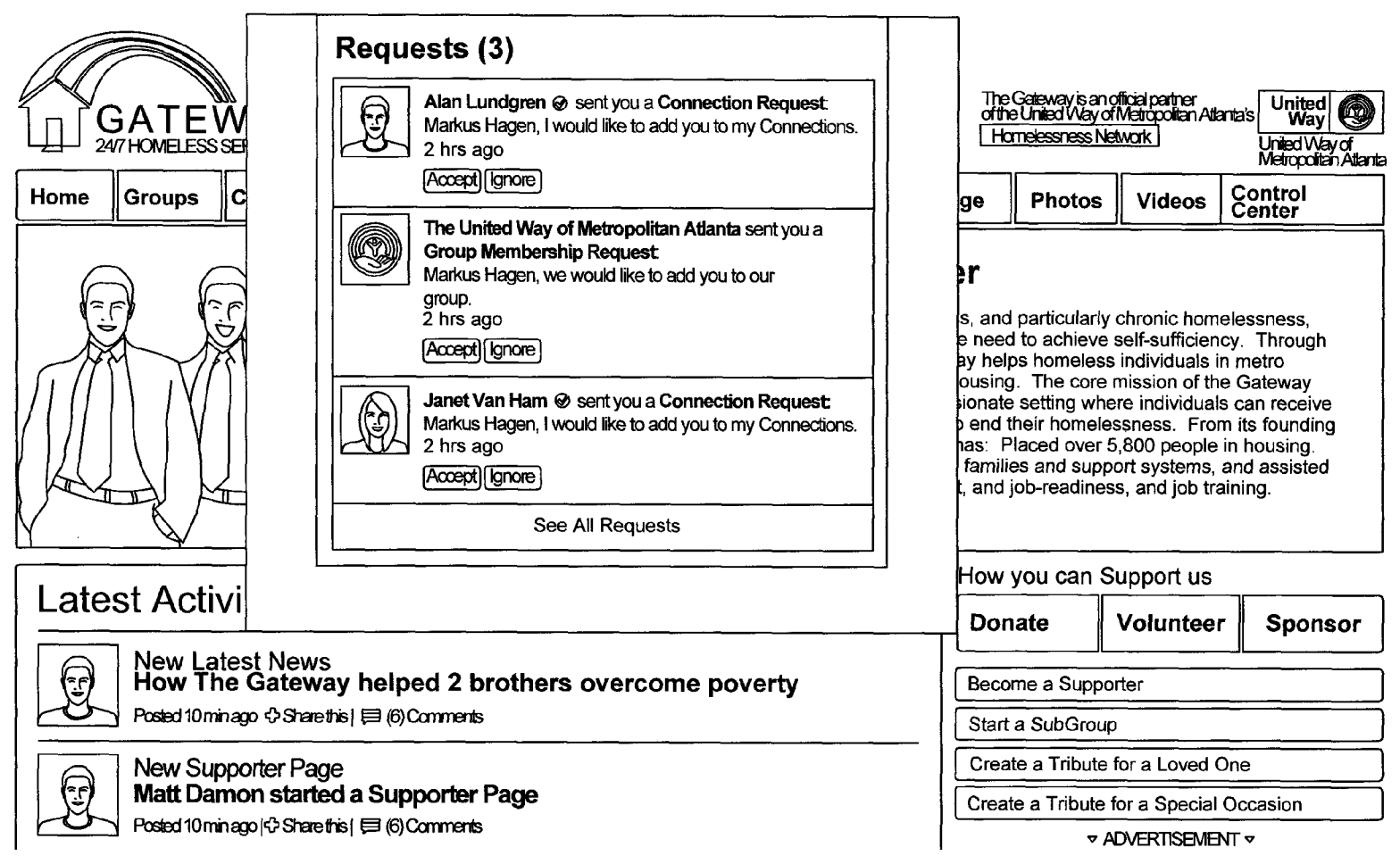
Figure 49:
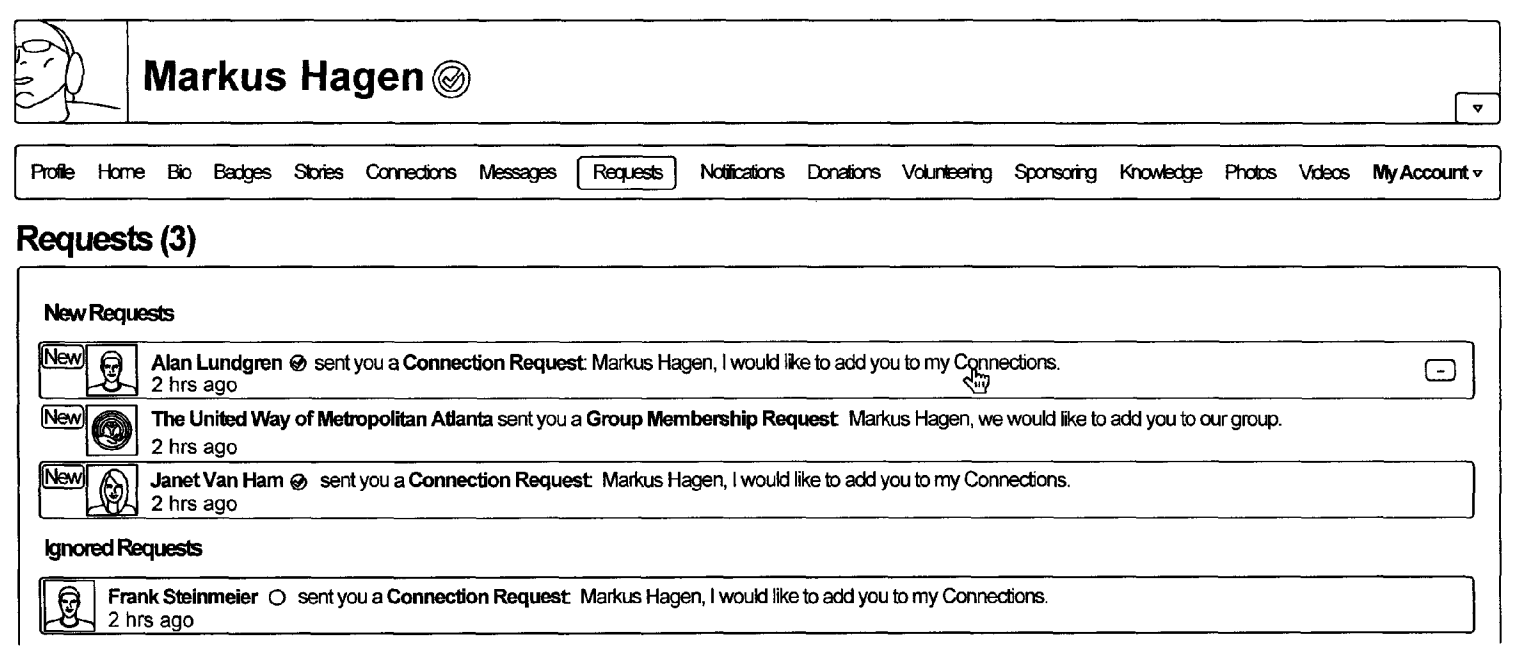

The dock can also include a clickable 'notifications' button 6130 that shows the number of new notifications received from within the online platform, such as another member commenting on a message or other content that the member posted to the online platform. Upon clicking the 'notifications' button 6130, the dock shows the notifications in a dropdown format. An example is shown in FIG. 46. By clicking on the button 'see all notifications' in the dropdown list, the user is taken to a web page with a listing of notifications that can be ordered by date, as shown in the example of FIG. 47. Similarly, the dock can include a clickable 'requests' button 6120 that shows the number of new requests, such as a connection request or a group membership request, in a dropdown format, as shown in FIG. 48. By clicking on the button 'see all requests' in the dropdown list, the user is taken to a web page with a listing of requests that can be categorized by new requests and ignored requests, as shown in the example of FIG. 49.

In one embodiment, the dock can include a clickable 'account' button 6140 that, upon clicking, shows a dropdown menu of account options that the member can select, for example, edit connections, account settings, privacy settings, become a validated member, create a child account, parental controls, and logout.

In one embodiment, by clicking on the dock 111, for example, on or near the profile photo, the member is taken to his own landing page or user profile page on the online platform. As shown in the example of FIG. 35, the landing page includes basic information about the member that other users may be interested in knowing, for example, the types of badges the member has earned, the groups the member has joined, the member's followers, who the member is following, the members connections, and people the member may know.

From the member's landing page, the member can access the toolbar 3510, shown in the example of FIG. 35. The toolbar 3510 includes clickable buttons for 'messages' which takes the member to a full page that shows the member's email messages, 'requests' which shows a full page with the member's requests from other members and groups of the online platform, and 'notifications' which shows a full page with notifications received by the member. An example of the requests page is shown in FIG. 49.

Using the Online Platform

All of the software tools of the online platform described above are available to any group or organization that registers with the online platform. For example, a company can use the online platform as an umbrella group, and employees can join as members of the company. Then the company can automatically track the employees' validated volunteering hours and donations. Additionally, when an employee shares a volunteering story, it can be posted to the company site as well, and the company can use it for public relations. Further, matching donations, commonly provided by companies can be captured using the online platform tools. Like all groups, the company can have a series of sub-groups, organized to meet the company's needs.

Schools and students can also use the same online platform. The school can be organized as an umbrella group for sub-groups such as sports teams, classes, and academic clubs.

Non-profit organizations, like the YMCA, can also make use of the same online platform. The umbrella feature operates in the same way as described above, but with an additional function. For example, within the YMCA Westchester, if a user clicks the 'groups' button on the landing page, all of the sub-groups that have been set up for different activities can be seen. As described above, all of the photos, videos, volunteer needs, etc. of the sub-groups will roll up to the umbrella organization. The function of the online platform is not just to raise money for philanthropy, it also serves as a utility that enables group members to collaborate to get things done.

Third-Party Support

In one embodiment, the online platform can develop close relationships with a few key vendors, such as IBM and Accenture, to provide consulting services to charities and foundations to help develop business initiatives that use the software tools provided by the online platform. Alternatively or additionally, the third-party vendors can perform system integration work requested by clients. Thus, the third-party vendors become distributors for applications associated with the online platform.

SUMMARY

The online platform and its tools are designed to help causes involve members, grow supporters, and conduct marketing campaigns. The security and confidentiality of member information can be guaranteed by a payment partner and audited by a major accounting firm. Further, the online platform provides a safe environment for people to interact with each other, and members can choose to have their identities validated by the platform.

Machine System

Figure 62:
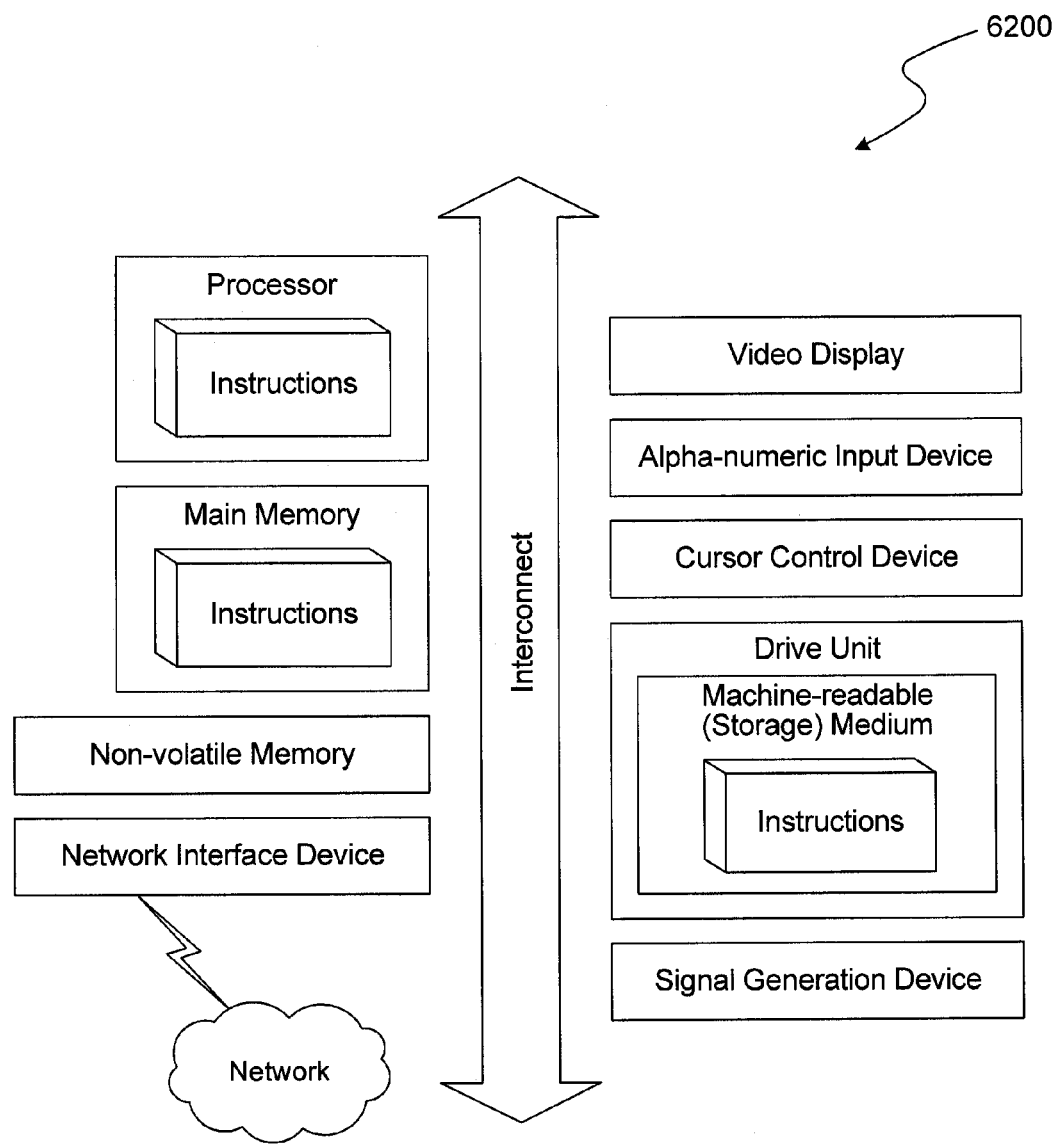
FIG. 62 shows a diagrammatic representation of a machine in the example form of a computer system within which a set of instructions, for causing the machine to perform any one or more of the methodologies discussed herein, may be executed.

FIG. 62 shows a diagrammatic representation of a machine 6200 in the example form of a computer system within which a set of instructions, for causing the machine to perform any one or more of the methodologies discussed herein, may be executed In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a user device, a tablet PC, a laptop computer, a set-top box (STB), a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

The network interface device enables the machine 6200 to mediate data in a network with an entity that is external to the host server, through any known and/or convenient communications protocol supported by the host and the external entity. The network interface device can include one or more of a network adaptor card, a wireless network interface card, a router, an access point, a wireless router, a switch, a multi-layer switch, a protocol converter, a gateway, a bridge, bridge router, a hub, a digital media receiver, and/or a repeater.

The network interface device can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, can be, for example, but are not limited to, intrusion-prevention, intrusion detection, next-generation firewall, personal firewall, etc. without deviating from the novel art of this disclosure.

CONCLUSION

Unless the context clearly requires otherwise, throughout the description and the claims, the words "comprise," "comprising," and the like are to be construed in an inclusive sense (i.e., to say, in the sense of "including, but not limited to"), as opposed to an exclusive or exhaustive sense. As used herein, the terms "connected," "coupled," or any variant thereof means any connection or coupling, either direct or indirect, between two or more elements. Such a coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. While processes or blocks are presented in a given order in this application, alternative implementations may perform routines having steps performed in a different order, or employ systems having blocks in a different order. Some processes or blocks may be deleted, moved, added, subdivided, combined, and/or modified to provide alternative or subcombinations. Also, while processes or blocks are at times shown as being performed in series, these processes or blocks may instead be performed or implemented in parallel, or may be performed at different times. Further any specific numbers noted herein are only examples. It is understood that alternative implementations may employ differing values or ranges.

The various illustrations and teachings provided herein can also be applied to systems other than the system described above. The elements and acts of the various examples described above can be combined to provide further implementations of the invention.

Any patents and applications and other references noted above, including any that may be listed in accompanying filing papers, are incorporated herein by reference. Aspects of the invention can be modified, if necessary, to employ the systems, functions, and concepts included in such references to provide further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

While certain aspects of the invention are presented below in certain claim forms, the applicant contemplates the various aspects of the invention in any number of claim forms. For example, while only one aspect of the invention is recited as a means-plus-function claim under 35 U.S.C. §112, sixth paragraph, other aspects may likewise be embodied as a means-plus-function claim, or in other forms, such as being embodied in a computer-readable medium. (Any claims intended to be treated under 35 U.S.C. §112, ¶ 6 will begin with the words "means for.") Accordingly, the applicant reserves the right to add additional claims after filing the application to pursue such additional claim forms for other aspects of the invention.

What is claimed is:

1. A computer-implemented method, comprising:
   receiving, by an index server of a computer system, via a user interface of a client device, a request for a standardized index of community contribution of an organization;
   retrieving, by the index server and from a database of the computer system, data for the organization, wherein the data includes a first monetary donation made by the organization, a second monetary donation made by members of the organization, a number of volunteer hours provided by the members of the organization, and a number of members of the organization;
   determining, by the index server, the standardized index of the community contribution of the organization as a first function of the received data, the determining including
   determining an organization donation value as a sum of (a) the first monetary donation and (b) the second monetary donation,
   determining an estimated value of volunteer hours of the organization as a product of (a) the number of volunteer hours performed by the members of the organization and (b) average hourly earnings,
   adjusting the estimated value of volunteer hours based on a weighted function compared to the organization donation value,
   determining an organization point value as a sum of (a) the organization donation value and (b) the estimated value of volunteer hours, and
   determining the standardized index of the community contribution of the organization by dividing (a) the organization point value by (b) the number of members of the organization; and
   storing, by the index server, the determined standardized index of the organization in the database.

2. The computer-implemented method of claim 1, wherein the average hourly earnings are for specific countries, the number of volunteer hours provided by the members of the organization is specified by country, and the standardized index is further based on the average hourly earnings for specific countries.

3. The computer-implemented method of claim 1, further comprising:
   receiving a request for a report comparing the standardized index of the community contribution of the organization to the standardized index for other organizations having the same industry classification or located in the same region;
   requesting and receiving industry classification or region location for the organization;
   identifying other organizations having the same industry classification or located in the same region;
   calculating the standardized index for the other organizations having the same industry classification or located in the same region; and
   preparing the report comparing the standardized index of the organization to the standardized index of the other organizations.

4. The computer-implemented method of claim 1, wherein the organization includes a company, and a member of the organization includes an employee of the company.

5. The computer-implemented method of claim 1, wherein the database is maintained by a server that tracks and verifies monetary donations of organizations, monetary donations of members of the organizations, and volunteer hours provided by the members of the organizations.

6. The computer-implemented method of claim 1, wherein determining an organization point value as a sum of (a) the organization donation value and (b) the estimated value of volunteer hours includes at least one of
  (i) determining each of the organization donation value and the estimated value of volunteer hours as a monetary value,
  (ii) determining each of the organization donation value and the estimated value of volunteer hours as a time value, or
  (iii) determining each of the organization donation value and the estimated value of volunteer hours as a value of a predefined unit.

7. The computer-implemented method of claim 1, further comprising:
  causing the standardized index of the community contribution of the organization to be displayed on the client device.

8. The computer-implemented method of claim 7, wherein the received data for the organization is verified.

9. The computer-implemented method of claim 7, wherein the standardized index displayed to the user is noted to be calculated using unverified data, if at least some of the received data for the organization is not verified.

10. A system for generating community contribution indices, the system comprising:
  a processor; and
  a memory configured to store a set of instructions, which, when executed by the processor causes
  a communications module to retrieve data for one or more organizations from a database in the system, wherein the data includes a first monetary donation made by each of the one or more organizations, a second monetary donation made by members of each of the one or more organizations, a number of volunteer hours provided by the members of each of the one or more organizations, and a number of members of each of the one or more organizations,
  an index server to determine a standardized index for community contribution of each of the one or more organizations, wherein the standardized index is determined as a first function of the received data, the determining including
  determining an organization donation value as a sum of (a) the first monetary donation and (b) the second monetary donation,
  determining an estimated value of volunteer hours of the organization as a product of (a) the number of volunteer hours performed by the members of the organization and (b) average hourly earnings,
  adjusting the estimated value of volunteer hours based on a weighted function compared to the organization donation value,
  determining an organization point value as a sum of (a) the organization donation value and (b) the estimated value of volunteer hours, and
  determining the standardized index of the community contribution of the organization by dividing (a) the organization point value by (b) the number of members of each of the one or more organizations, and
  the communications module to send the determined standardized index for each of the one or more organizations to a requesting user.

11. The system of claim 10, wherein the communications module is further configured to automatically and periodically request and receive updated data, the index server is further configured to automatically determine updates to the standardized index upon receiving the updated data, and the communications module is further configured to periodically send the updated standardized indices to the requesting user.

12. The system of claim 10, wherein the requesting user is a subscriber to a service that provides periodic updates to determined standardized indices for organizations.

13. The system of claim 10, wherein the communications module further obtains data on average hourly earnings for specific countries, wherein the number of volunteer hours provided by members of each of the one or more organizations is specified by country, and the standardized index is further based on the average hourly earnings for specific countries.

14. The system of claim 10, wherein determining an organization point value as a sum of (a) the organization donation value and (b) the estimated value of volunteer hours includes at least one of
  (i) determining each of the organization donation value and the estimated value of volunteer hours as a monetary value,
  (ii) determining each of the organization donation value and the estimated value of volunteer hours as a time value, or
  (iii) determining each of the organization donation value and the estimated value of volunteer hours as a value of a predefined unit.

15. A system comprising:
  means for receiving, by a server and from an user, a request for a standardized index of community contribution of an organization;
  means for requesting and receiving data for the organization, wherein the data includes a first monetary donation made by the organization, a second monetary donation made by members of the organization, a number of volunteer hours provided by the members of the organization, and a number of members of the organization;
  means for determining the standardized index of the community contribution of the organization as a first function of the received data, the determining including
  determining an organization donation value as a sum of (a) the first monetary donation and (b) the second monetary donation,
  determining an estimated value of volunteer hours of the organization as a product of (a) the number of volunteer hours performed by the members of the organization and (b) average hourly earnings,
  adjusting the estimated value of volunteer hours based on a weighted function compared to the organization donation value,
  determining an organization point value as a sum of (a) the organization donation value and (b) the estimated value of volunteer hours, and
  determining the standardized index of the community contribution of the organization by dividing (a) the organization point value by (b) the number of members of the organization; and
  means for causing the standardized index to be displayed to the user.

* * * * *